US008082225B2

(12) United States Patent
Jung et al.

(10) Patent No.: US 8,082,225 B2
(45) Date of Patent: Dec. 20, 2011

(54) USING DESTINATION-DEPENDENT CRITERIA TO GUIDE DATA TRANSMISSION DECISIONS

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
William Henry Mangione-Smith, Kirkland, WA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 381 days.

(21) Appl. No.: 11/899,013

(22) Filed: Aug. 31, 2007

(65) Prior Publication Data
US 2009/0063518 A1    Mar. 5, 2009

(51) Int. Cl.
*G06F 7/00*    (2006.01)
*G06F 17/30*   (2006.01)

(52) U.S. Cl. ......... 707/621; 707/636; 707/793; 707/809

(58) Field of Classification Search .................. 707/100, 707/103, 620, 621, 636, 793, 809
See application file for complete search history.

(56) References Cited

U.S. PATENT DOCUMENTS

| | | | |
|---|---|---|---|
| 5,128,938 A | 7/1992 | Borras | |
| 5,548,535 A | 8/1996 | Zvonar | |
| 5,596,750 A | 1/1997 | Li et al. | |
| 5,812,865 A | 9/1998 | Theimer et al. | |
| 5,892,909 A | 4/1999 | Grasso et al. | |
| 6,006,225 A * | 12/1999 | Bowman et al. | 1/1 |
| 6,009,433 A * | 12/1999 | Kurano et al. | 1/1 |
| 6,014,716 A | 1/2000 | Ohara | |
| 6,031,453 A | 2/2000 | Brinzer | |
| 6,074,787 A | 6/2000 | Takeuchi | |
| 6,081,816 A | 6/2000 | Agrawal | |
| 6,105,072 A | 8/2000 | Fischer | |
| 6,151,311 A | 11/2000 | Wheatley, III et al. | |
| 6,157,379 A | 12/2000 | Singh | |
| 6,192,396 B1 | 2/2001 | Kohler | |
| 6,208,965 B1 | 3/2001 | Brown et al. | |
| 6,212,553 B1 | 4/2001 | Lee et al. | |
| 6,219,731 B1 | 4/2001 | Gutowitz | |
| 6,237,141 B1 | 5/2001 | Holzle et al. | |
| 6,243,378 B1 | 6/2001 | Olnowich | |
| 6,263,311 B1 | 7/2001 | Dildy | |
| 6,266,675 B1 | 7/2001 | Evans et al. | |
| 6,287,125 B1 | 9/2001 | Dorcely | |
| 6,308,148 B1 | 10/2001 | Bruins et al. | |
| 6,320,112 B1 | 11/2001 | Lotze | |
| 6,341,359 B1 | 1/2002 | Aiken et al. | |
| 6,349,238 B1 | 2/2002 | Gabbita et al. | |

(Continued)

OTHER PUBLICATIONS

U.S. Appl. No. 11/821,077, Jung et al.

(Continued)

*Primary Examiner* — Rehana Perveen
*Assistant Examiner* — Mark Hershley

(57) ABSTRACT

A system, method, computer program product, and carrier are described for causing one or more destination-dependent criteria to be applied at least to a data object and indicating a decision whether to transmit the data object to a destination partly based on a default value and partly based on one or more results of the one or more destination-dependent criteria being applied at least to the data object.

20 Claims, 26 Drawing Sheets

U.S. PATENT DOCUMENTS

| | | | |
|---|---|---|---|
| 6,374,221 B1 | 4/2002 | Haimi-Cohen | |
| 6,377,953 B1 | 4/2002 | Gawlick et al. | |
| 6,378,128 B1 | 4/2002 | Edelstein et al. | |
| 6,389,475 B1 | 5/2002 | Speakman et al. | |
| 6,401,100 B1 | 6/2002 | Gladieux | |
| 6,418,136 B1 | 7/2002 | Naor et al. | |
| 6,418,424 B1 | 7/2002 | Hoffberg et al. | |
| 6,424,946 B1 | 7/2002 | Trischler et al. | |
| 6,425,128 B1 | 7/2002 | Krapf et al. | |
| 6,430,573 B1 | 8/2002 | Pachet et al. | |
| 6,452,607 B1 | 9/2002 | Livingston | |
| 6,480,885 B1 | 11/2002 | Olivier | |
| 6,496,600 B1 | 12/2002 | Huang | |
| 6,526,258 B2 | 2/2003 | Bejar et al. | |
| 6,539,050 B1 | 3/2003 | Lee et al. | |
| 6,539,376 B1 | 3/2003 | Sundaresan et al. | |
| 6,546,005 B1 | 4/2003 | Berkley et al. | |
| 6,549,950 B2 | 4/2003 | Lytle et al. | |
| 6,560,576 B1 | 5/2003 | Cohen et al. | |
| 6,564,321 B2 | 5/2003 | Bobo, II | |
| 6,565,610 B1 | 5/2003 | Wang et al. | |
| 6,570,850 B1 | 5/2003 | Gutierrez et al. | |
| 6,574,744 B1 | 6/2003 | Kantz et al. | |
| 6,594,630 B1 | 7/2003 | Zlokarnik et al. | |
| 6,594,654 B1 * | 7/2003 | Salam et al. | 1/1 |
| 6,594,672 B1 | 7/2003 | Lampson et al. | |
| 6,614,551 B1 | 9/2003 | Peek | |
| 6,621,892 B1 | 9/2003 | Banister et al. | |
| 6,629,635 B1 | 10/2003 | Akamine | |
| 6,633,868 B1 | 10/2003 | Min et al. | |
| 6,662,223 B1 | 12/2003 | Zhang et al. | |
| 6,678,360 B1 | 1/2004 | Katz | |
| 6,690,390 B1 | 2/2004 | Walters et al. | |
| 6,691,159 B1 | 2/2004 | Grewal et al. | |
| 6,700,591 B1 | 3/2004 | Sharpe | |
| 6,700,678 B1 | 3/2004 | Luman | |
| 6,704,905 B2 | 3/2004 | Fukushige et al. | |
| 6,711,291 B1 | 3/2004 | Stubler et al. | |
| 6,724,373 B1 | 4/2004 | O'Neill, Jr. et al. | |
| 6,725,229 B2 | 4/2004 | Majewski et al. | |
| 6,748,320 B2 | 6/2004 | Jones | |
| 6,751,593 B2 | 6/2004 | Tetsumoto | |
| 6,772,396 B1 | 8/2004 | Cronin et al. | |
| 6,775,358 B1 | 8/2004 | Breitenbach et al. | |
| 6,785,341 B2 | 8/2004 | Walton et al. | |
| 6,785,867 B2 * | 8/2004 | Shaffer et al. | 715/203 |
| 6,788,308 B2 | 9/2004 | Reavy et al. | |
| 6,804,224 B1 | 10/2004 | Schuster et al. | |
| 6,810,422 B1 | 10/2004 | Cross | |
| 6,813,043 B1 | 11/2004 | Mizuyama et al. | |
| 6,813,507 B1 | 11/2004 | Gress et al. | |
| 6,816,901 B1 | 11/2004 | Sitaraman et al. | |
| 6,820,079 B1 | 11/2004 | Evans | |
| 6,839,777 B1 | 1/2005 | Vrancic et al. | |
| 6,842,860 B1 | 1/2005 | Branstad et al. | |
| 6,850,988 B1 | 2/2005 | Reed | |
| 6,851,049 B1 | 2/2005 | Price, III | |
| 6,868,427 B2 | 3/2005 | Herzog et al. | |
| 6,892,330 B2 | 5/2005 | Lee | |
| 6,892,352 B1 | 5/2005 | Myers | |
| 6,895,426 B1 | 5/2005 | Cortright et al. | |
| 6,904,168 B1 | 6/2005 | Steinberg et al. | |
| 6,904,183 B2 | 6/2005 | Slatter | |
| 6,910,028 B2 | 6/2005 | Chan et al. | |
| 6,910,033 B2 | 6/2005 | Rosenblum | |
| 6,910,067 B1 | 6/2005 | Sitaraman et al. | |
| 6,925,458 B2 | 8/2005 | Scaturro et al. | |
| 6,934,889 B2 | 8/2005 | Owari | |
| 6,934,916 B1 | 8/2005 | Webb et al. | |
| 6,937,766 B1 | 8/2005 | Wilf et al. | |
| 6,938,196 B2 | 8/2005 | Richardson et al. | |
| 6,941,466 B2 | 9/2005 | Mastrianni | |
| 6,941,513 B2 | 9/2005 | Meystel et al. | |
| 6,947,068 B2 | 9/2005 | Forkner et al. | |
| 6,947,948 B2 | 9/2005 | Wang et al. | |
| 6,959,389 B1 | 10/2005 | Dunn et al. | |
| 6,961,766 B2 | 11/2005 | Janosik, Jr. et al. | |
| 6,981,023 B1 | 12/2005 | Hamilton et al. | |
| 6,985,172 B1 | 1/2006 | Rigney et al. | |
| 6,985,830 B2 | 1/2006 | Lee et al. | |
| 6,987,840 B1 | 1/2006 | Bosik et al. | |
| 6,990,525 B1 | 1/2006 | Ying et al. | |
| 6,993,563 B2 | 1/2006 | Lytle et al. | |
| 6,999,469 B1 | 2/2006 | Chu et al. | |
| 7,006,827 B2 | 2/2006 | Masuda et al. | |
| 7,010,616 B2 | 3/2006 | Carlson et al. | |
| 7,020,651 B2 | 3/2006 | Ripley | |
| 7,020,688 B2 | 3/2006 | Sykes, Jr. | |
| 7,027,645 B2 | 4/2006 | Swift | |
| 7,031,438 B1 | 4/2006 | Cheston, III et al. | |
| 7,038,680 B2 | 5/2006 | Pitkow | |
| 7,039,637 B2 | 5/2006 | Murray et al. | |
| 7,054,421 B2 | 5/2006 | Kandlur et al. | |
| 7,054,882 B2 | 5/2006 | Dockter et al. | |
| 7,058,688 B2 | 6/2006 | Lin | |
| 7,062,508 B2 | 6/2006 | Andreev et al. | |
| 7,062,535 B1 | 6/2006 | Stark et al. | |
| 7,072,901 B2 | 7/2006 | Teraguchi et al. | |
| 7,072,942 B1 | 7/2006 | Maller | |
| 7,076,485 B2 | 7/2006 | Bloedorn | |
| 7,076,533 B1 | 7/2006 | Knox et al. | |
| 7,080,384 B2 | 7/2006 | Wall et al. | |
| 7,089,256 B2 | 8/2006 | Smialek | |
| 7,089,497 B2 | 8/2006 | Abbott et al. | |
| 7,095,855 B1 | 8/2006 | Collins | |
| 7,103,154 B1 | 9/2006 | Cannon et al. | |
| 7,107,291 B2 * | 9/2006 | Nishikawa et al. | 709/224 |
| 7,110,664 B2 | 9/2006 | Yogeshwar et al. | |
| 7,110,890 B2 | 9/2006 | Birkett et al. | |
| 7,117,210 B2 | 10/2006 | DeSalvo | |
| 7,119,923 B1 | 10/2006 | Iwaki | |
| 7,120,628 B1 | 10/2006 | Conmy et al. | |
| 7,124,302 B2 | 10/2006 | Ginter et al. | |
| 7,130,887 B2 | 10/2006 | Goldberg | |
| 7,133,880 B1 | 11/2006 | Nori et al. | |
| 7,139,825 B2 | 11/2006 | Andaker et al. | |
| 7,143,083 B2 | 11/2006 | Carlbom et al. | |
| 7,143,140 B2 | 11/2006 | Dennis | |
| 7,146,134 B2 | 12/2006 | Moon et al. | |
| 7,146,234 B2 | 12/2006 | Woehler | |
| 7,149,649 B2 | 12/2006 | Haft et al. | |
| 7,149,780 B2 | 12/2006 | Quine et al. | |
| 7,159,029 B2 | 1/2007 | Laarhuis et al. | |
| 7,162,474 B1 | 1/2007 | Harker et al. | |
| 7,162,515 B2 | 1/2007 | Engstrom | |
| 7,164,921 B2 | 1/2007 | Owens et al. | |
| 7,177,816 B2 | 2/2007 | Ehlen et al. | |
| 7,181,694 B2 | 2/2007 | Reiss et al. | |
| 7,191,117 B2 | 3/2007 | Kirby et al. | |
| 7,191,252 B2 | 3/2007 | Redlich et al. | |
| 7,194,656 B2 | 3/2007 | Hayward | |
| 7,200,592 B2 * | 4/2007 | Goodwin et al. | 706/46 |
| 7,200,678 B1 | 4/2007 | Bettadahalli et al. | |
| 7,206,778 B2 | 4/2007 | Bode et al. | |
| 7,209,880 B1 | 4/2007 | Gajic et al. | |
| 7,212,807 B2 | 5/2007 | Laumen et | |
| 7,213,260 B2 | 5/2007 | Judge | |
| 7,224,778 B2 | 5/2007 | Aoki | |
| 7,228,134 B2 | 6/2007 | Gandhi et al. | |
| 7,228,334 B1 | 6/2007 | Jordan, Jr. | |
| 7,233,803 B2 | 6/2007 | Nielsen et al. | |
| 7,237,010 B2 | 6/2007 | Mora | |
| 7,239,985 B1 | 7/2007 | Hysom et al. | |
| 7,240,041 B2 | 7/2007 | Martin et al. | |
| 7,240,355 B1 | 7/2007 | Eldering et al. | |
| 7,242,421 B2 | 7/2007 | Center, Jr. et al. | |
| 7,242,493 B2 | 7/2007 | Hall et al. | |
| 7,242,988 B1 | 7/2007 | Hoffberg et al. | |
| 7,243,130 B2 | 7/2007 | Horvitz et al. | |
| 7,353,034 B2 * | 4/2008 | Haney | 455/457 |
| 2001/0037311 A1 | 11/2001 | McCoy et al. | |
| 2001/0039522 A1 | 11/2001 | Saxon | |
| 2002/0035536 A1 | 3/2002 | Gellman | |
| 2002/0069200 A1 | 6/2002 | Cooper et al. | |
| 2002/0083118 A1 | 6/2002 | Sim | |
| 2002/0147645 A1 | 10/2002 | Alao et al. | |
| 2002/0178086 A1 | 11/2002 | Margeson et al. | |

| | | | |
|---|---|---|---|
| 2002/0178224 A1 | 11/2002 | Kasajima | |
| 2003/0054839 A1 | 3/2003 | Ono | |
| 2003/0134616 A1 | 7/2003 | Thomsen et al. | |
| 2003/0140235 A1 | 7/2003 | Immega et al. | |
| 2003/0225850 A1 | 12/2003 | Teague | |
| 2003/0236729 A1 | 12/2003 | Epstein et al. | |
| 2004/0030550 A1 | 2/2004 | Liu et al. | |
| 2004/0117326 A1 | 6/2004 | Amato | |
| 2004/0117501 A1 | 6/2004 | Day et al. | |
| 2004/0139000 A1 | 7/2004 | Amos | |
| 2004/0139314 A1 | 7/2004 | Cook et al. | |
| 2004/0180668 A1 | 9/2004 | Owens et al. | |
| 2004/0220705 A1 | 11/2004 | Basir et al. | |
| 2004/0243844 A1 | 12/2004 | Adkins | |
| 2005/0136904 A1 | 6/2005 | Siddiqui | |
| 2005/0154636 A1 | 7/2005 | Hildinger et al. | |
| 2005/0177456 A1 | 8/2005 | Rossides | |
| 2005/0186968 A1 | 8/2005 | Durst et al. | |
| 2005/0188031 A1 | 8/2005 | Zandt | |
| 2005/0188043 A1 | 8/2005 | Cortright et al. | |
| 2005/0195076 A1 | 9/2005 | McCulloch et al. | |
| 2005/0198054 A1* | 9/2005 | Sankaran | 707/100 |
| 2005/0233757 A1 | 10/2005 | Choi | |
| 2005/0256769 A1 | 11/2005 | Rossides | |
| 2006/0013368 A1 | 1/2006 | LaBaw | |
| 2006/0018445 A1 | 1/2006 | Mittal | |
| 2006/0078122 A1 | 4/2006 | Dacosta | |
| 2006/0101514 A1 | 5/2006 | Milener et al. | |
| 2006/0161457 A1 | 7/2006 | Rapaport et al. | |
| 2006/0178949 A1 | 8/2006 | McGrath | |
| 2007/0070979 A1 | 3/2007 | Kim et al. | |
| 2007/0262861 A1* | 11/2007 | Anderson et al. | 340/539.13 |
| 2008/0010106 A1 | 1/2008 | Bourne et al. | |
| 2008/0030322 A1 | 2/2008 | Stauffer et al. | |
| 2008/0070593 A1* | 3/2008 | Altman et al. | 455/457 |
| 2008/0168074 A1* | 7/2008 | Inagaki | 707/100 |
| 2008/0214142 A1 | 9/2008 | Morin et al. | |
| 2009/0063518 A1* | 3/2009 | Jung et al. | 707/100 |

OTHER PUBLICATIONS

U.S. Appl. No. 11/821,101, Jung et al.
U.S. Appl. No. 11/821,122, Jung et al.
"Called-Party Camp-On"; Wikipedia, The Free Encyclopedia; bearing a date of Mar. 20, 2007; printed on Apr. 2, 2007; p. 1; located at: http://en.wikipedia.org/wiki/Called-party_camp-on.
FutureMe.org; bearing a date of Jan. 22, 2006; printed on Apr. 2, 2007; pp. 1-3; located at: http://futureme.org/public.php?id=218620.
Huang, Dawei; Liu, Fang; Shi, Xiangdong; Yang, Guangxin; Zheng, Ludi; Zhou, Zhiyu; "MapWeb: A Location-Based Converged Communications Platform"; Bell Labs Technical Journal; bearing a date of 2006; pp. 159-171; vol. 11, No. 1; Wiley Periodicals, Inc.; located at; www.interscience.wiley.com.
"Intro Writing Do's | Don'ts"; Happen Magazine—Match.com's advice center; printed on Apr. 4, 2007; pp. 1-2; located at: http://www.match.com/matchscene/tips.aspx?articleid=4511.
Khan, Omar; "Context and Context-Aware Computing"; Fall 2006; pp. 1-40; CS260.
McKinley, Philip K.; Padmanabhan, Udiyan I.; Ancha, Nandagopal; Sadjadi, Seyed Masoud; "Composable Proxy Services to Support Collaboration on the Mobile Internet"; IEEE Transactions on Computers; bearing a date of Jun. 2003; pp. 713-726; vol. 52, No. 6; IEEE Computer Society.
McKinley, Philip K.; Sadjadi, Seyed Masoud; Kasten, Eric P.; Cheng, Betty H.C.; "A Taxonomy of Compositional Adaptation"; Technical Report MSU-CSE-04/17; bearing a date of May 2004 and Jul. 2004; pp. 1-48; located at:http://www.cse.msu.edu/rapidware/survey.
Morris, John; Peterson, Jon; "Who's Watching You Now?"; IEEE Security & Privacy: Building Confidence in a Networked World; bearing a date of Jan.-Feb. 2007; pp. 76-79; vol. 5, No. 1; IEEE Computer Society.
"Oops!"; Match.com—Find Singles at the World's largest Online Dating Personals Service; printed on Apr. 4, 2007; pp. 1-3; located at: http://www.match.com/profile/myprofile.aspx?sect=6.
"Open Source Rule Engines Written In Java"; Manageability; printed on May 2, 2007; pp. 1-7; located at: http://www.manageability.org/blog/stuff/rule_engines/view.
*Star Wars IV: A New Hope*; Dir. George Lucas; Perf. Mark Hamill, Harrison Ford, Carrie Fisher, Peter Cushing, Alec Guinness; Twentieth Century Fox; 1977 (submitted via DVD).
Terdiman, Daniel; "A Cure for E-Mail Attention Disorder?"; CNET News.com; bearing a date of Feb. 28, 2007; pp. 1-3; located at: http://news.com/A+cure+for+e-mail+attention+disorder/2100-.
Van Grove, Jennifer; "Can a Gmail Tool Make Us More Considerate Email Senders?"; Mashable; printed on Jun. 8, 2011; pp. 1-3; located at: http://mashable.com/2011/06/07/courteously/.

* cited by examiner

US 8,082,225 B2

USING DESTINATION-DEPENDENT CRITERIA TO GUIDE DATA TRANSMISSION DECISIONS

SUMMARY

In one aspect, a method includes but is not limited to causing one or more destination-dependent criteria to be applied at least to a data object and indicating a decision whether to transmit the data object to a destination partly based on a default value and partly based on one or more results of the one or more destination-dependent criteria being applied at least to the data object. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to circuitry for causing one or more destination-dependent criteria to be applied at least to a data object and circuitry for indicating a decision whether to transmit the data object to a destination partly based on a default value and partly based on one or more results of the one or more destination-dependent criteria being applied at least to the data object. In addition to the foregoing, other system aspects are described in the claims, drawings, and text forming a part of the present disclosure.

In addition to the foregoing, various other method and/or system and/or program product and/or physical carrier aspects are set forth and described in the teachings such as text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

DETAILED DESCRIPTION

Figure 2:
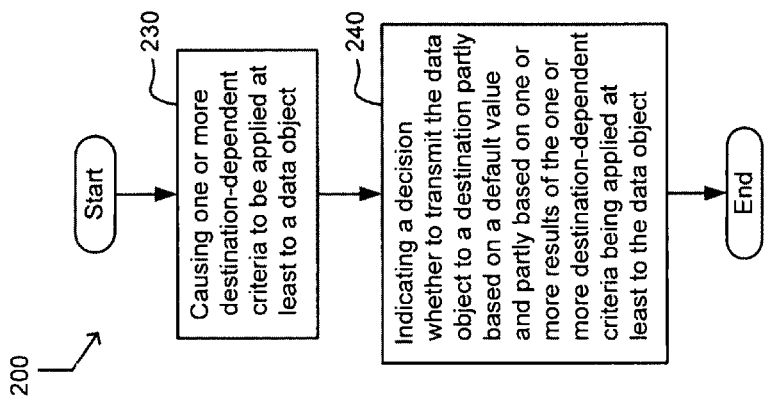
FIG. 2 depicts a high-level logic flow of an operational process.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In the following detailed description, reference is made to the accompanying drawings, which form a part hereof. The use of the same symbols in different drawings typically indicates similar or identical items. The illustrative embodiments described in the detailed description, drawings, and claims are not meant to be limiting. Other embodiments may be utilized, and other changes may be made, without departing from the spirit or scope of the subject matter presented here.

Following are a series of systems and flowcharts depicting implementations of processes. For ease of understanding, the flowcharts are organized such that the initial flowcharts present implementations via an initial "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 1:
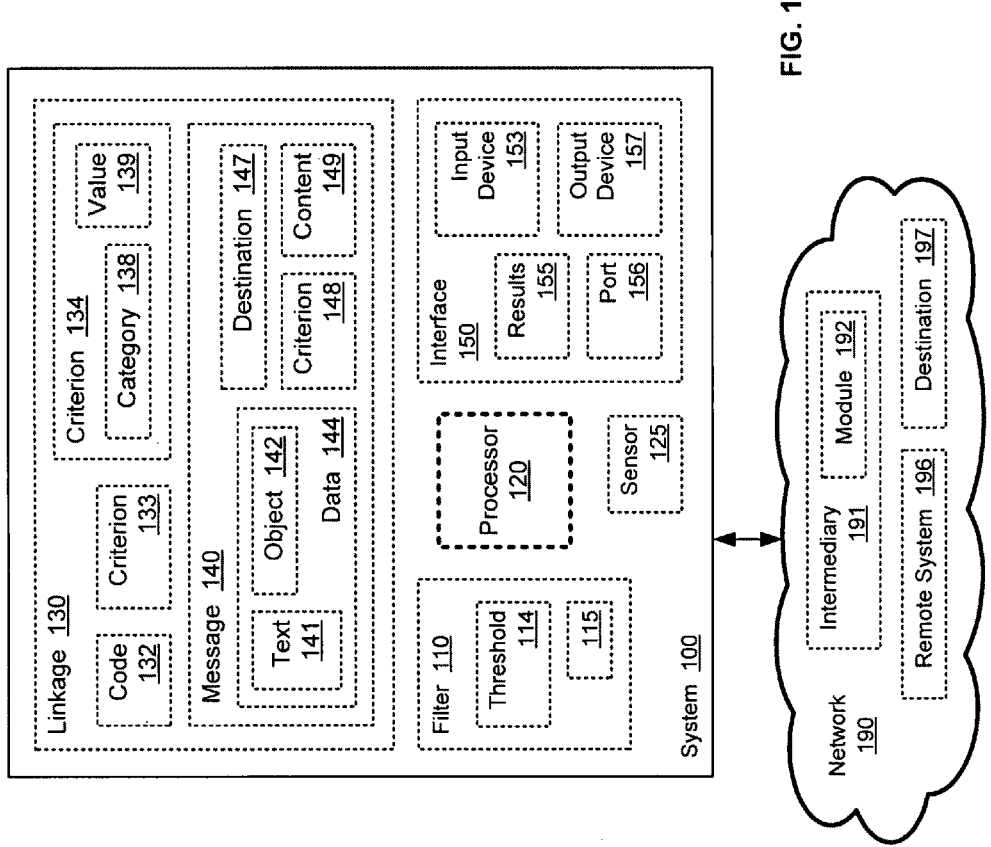
FIG. 1 depicts an exemplary environment in which one or more technologies may be implemented.

With reference now to FIG. 1, shown is an example of a system that may serve as a context for introducing one or more processes and/or devices described herein. As shown system 100 may operably interact with network 190, and comprises one or more instances of filters 110, processors 120, sensors 125, linkages 130, or interfaces 150. Linkage 130 may comprise one or more instances of code 132, criteria 133, 134 (optionally comprising one or more categories 138 and/or one or more values 139, or messages 140. Message 140 may comprise one or more instances of text 141, objects 142, or other data 144, destinations 147, criteria 148, or other content 149. Filter 110 may implement one or more instances of thresholds 114, 115. Interface 150 may comprise one or more instances of input devices 153, results 155, ports 156, or output devices 157. Network 190 may comprise one or more instances of (remote or local) modules 192 or other intermediaries 191, remote systems 196, or other destinations 197.

With reference now to FIG. 2, there is shown a high-level logic flow 200 of an operational process. Flow 200 includes operation 230—causing one or more destination-dependent criteria to be applied at least to a data object (e.g. processor 120 causing one or more filters 110 to evaluate to some or all of data 144 using one or more thresholds 114, 115 received or inferred from destination 197. Alternatively or additionally, one or more criteria 133, 134 may be used for implement latency thresholds or other timing specifications, size or density ranges, loading limitations, coding or security constraints, or other quantitative requirements relating to text 141 or other objects 142 of data 144.

In light of teachings herein, numerous existing techniques may be applied for defining, configuring, or otherwise indicating relationships between criteria and message content or other data as described herein without undue experimentation. See, e.g., U.S. Pat. No. 7,228,134 ("Method of minimizing reverse channel interference caused by an abnormally high number of access attempts in a wireless communications system"); U.S. Pat. No. 7,209,880 ("Systems and methods for dynamic re-configurable speech recognition"); U.S. Pat. No. 7,194,656 ("Systems and methods for implementing content sensitive routing over a wide area network (WAN)"); U.S. Pat. No. 7,080,384 ("Method and apparatus for providing access control for a decentralized or emergent model on a computer network"); U.S. Pat. No. 7,054,882 ("Method and system for improving a text search"); U.S. Pat. No. 6,904,183 ("Image capture systems"); U.S. Pat. No. 6,785,867 ("Automatic application loading for e-mail attachments"); U.S. Pat. No. 6,711,291 ("Method for automatic text placement in digital images"); U.S. Pat. No. 6,700,591 ("Variable visual indicators based on predetermined characteristics"); U.S. Pat. No. 6,633,868 ("System and method for context-based document retrieval"); U.S. Pat. No. 6,539,376 ("System and method for the automatic mining of new relationships"); U.S. Pat. No. 6,539,050 ("Method for transmitting wideband signals via a communication system adapted for narrow-band signal transmission"). Those skilled in the art will also recognize how to apply numerous existing techniques for taking provisional, alternate, overlapping, or completion actions relating to such decisions as exemplified herein without undue experimentation, in light of these teachings. Filter 114 may be configured to pass data 144 or message 140 only in response to an indication that content 149 or data 144 pass one or more criteria 133, 134, for example, or to implement the converse. Alternatively or additionally, such functionality may likewise depend upon one or more other determinants in substantially any desired combination: upon whether intermediary 191 or destination 197 satisfy criterion 148, upon how or whether text 141 is encoded, upon whether intermediary 191 currently performs module 192, upon other state or timing factors as described herein, or upon other determinants such as are known in the art. Such combinations may each be effectuated by comparative, arithmetic, conjunctive, or other operators relating each pairing of determinants described herein, for example.

In some variants, for example, operation 230 may include receiving criteria from a destination, such as by linkage 1549 or grid 1510 receiving one or more instances of values 1542, conditions 1544, or criteria 1461-1465 via one or more intermediaries 191, 1191 or destinations 197, 1198, 1411. This can occur, for example, in a context in which a destination for specific content is not yet identified. Alternatively or additionally, processor 1590 may be configured to invoke module 1553 for configuring linkage 1549 or some similar association between two or more of value 1542, condition 1544, text or other content 1548, or destination 1546. This can occur, for example, in embodiments in which each such linkage is held in a respective linkage record 1511 containing two or more fields 1512 each referring to or otherwise representing a respective one of such a value, condition, content object, or destination. One or more such linkage records 1511 may be arranged in a grid 1510 or similar structure, for example. In some variants, for example, a data manager 1555 may perform operation P+34 by receiving values into one or more such fields from some identified destination as described herein.

Alternatively or additionally, operation 230 may include invocation circuitry 1430 invoking module 1432 for generating a decision 1437 whether to transmit the data object to the destination (at least partly) in response to whether a content segment passes any of the criteria. In various embodiments, this may be performed by module 1432 being configured to determine one or more of whether picture 1471 satisfies criterion 1461, whether message 1472 satisfies criterion 1462, whether code segment 1473 satisfies criterion 1463, whether application data segment 1474 satisfies criterion 1464, whether sensor 1133 detects segment 1156, whether clip 1475 satisfies criterion 1465, or whether an evaluation-module-specific conjunctive relationship between any of these conditions exists. In various configurations and embodiments, for example, comparator 1445 may evaluate criterion 1461 by comparing threshold 1451 with a size or frequency attribute of picture 1471 and/or evaluate criterion 1462 by comparing threshold 1452 with a size or other quantifiable attribute of message 1472. Alternatively or additionally, comparator 1445 may be configured to apply one or more thresholds 1453, 1454, 1438 to one or more segments 1471, 1474 or clips 1475 to evaluate one or more respective criteria 1463, 1464, 1465.

Flow 200 further includes operation 240—indicating a decision whether to transmit the data object to a destination partly based on a default value and partly based on one or more results of the one or more destination-dependent criteria being applied at least to the data object (e.g. processor 120 or port 156 transmitting some or all of message 140 to remote system 196 or other destinations 197 in response to a user action detected via input device 153 or sensor 125. This can occur in a context in which output device 157 previously indicated whether some or all components of content 149 apparently comply with one or more criteria 148 as described above, for example. Alternatively, in some contexts, processor 120 may indicate such a decision or other results 155 without any such transmission, such as when the decision is in the negative.

In light of teachings herein, numerous existing techniques may be applied for defining, configuring, executing, or otherwise causing a selection or other decision about the acceptability of destinations or other data for specific uses as exemplified herein without undue experimentation. See, e.g., U.S. Pat. No. 7,240,041 ("Network message processing using inverse pattern matching"); U.S. Pat. No. 7,200,678 ("Selecting network address offered by a plurality of servers based on server identification information"); U.S. Pat. No. 7,120,668 ("Systems and methods for matching participants to a conversation"); U.S. Pat. No. 7,054,421 ("Enabling legacy interactive voice response units to accept multiple forms of input"); U.S. Pat. No. 6,990,525 ("System for selecting data communications service"); U.S. Pat. No. 6,961,766 ("Method for extracting personalization information from web activity"); U.S. Pat. No. 6,842,860 ("System and method for selectively authenticating data"); U.S. Pat. No. 6,425,128 ("Video system with a control device for displaying a menu listing viewing preferences having a high probability of acceptance by a viewer that include weighted premium content"); U.S. Pat. No. 6,341,359 ("Self-diagnosing and self correcting data entry components"). Those skilled in the art will also recognize how to apply numerous existing techniques for taking provisional, alternate, overlapping, or completion actions relating to such decisions as exemplified herein without undue experimentation, in light of these teachings. Processor 120 may be configured to cause, perform, or otherwise indicate the transmission(s) only in response to an indication that user 160 met a deadline, for example, or to implement the converse. Alternatively or additionally, such functionality may likewise depend upon one or more other determinants in substantially any desired combination: upon whether user 160 authorizes such transmissions, upon whether user 160 identified intermediary 191 or any other destinations 147, upon timing indications or data relating to intermediary 191 or remote system 196, upon other state or timing factors as described herein, or upon other determinants such as are known in the art. Such combinations may each be effectuated by comparative, arithmetic, conjunctive, or other operators relating each pairing of determinants described herein, for example.

Figure 3:
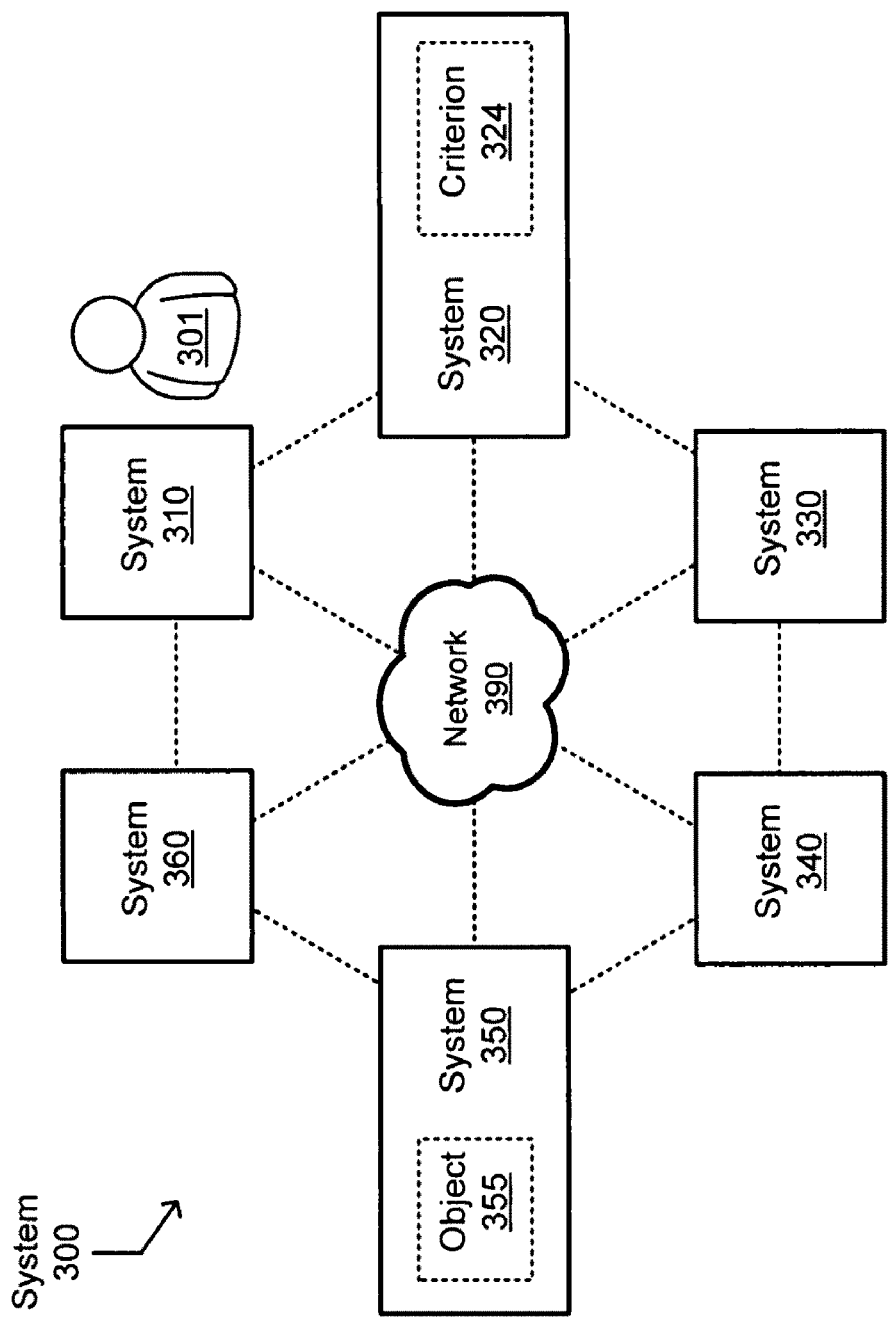
FIGS. 3-25 depict various environments in which one or more technologies may be implemented.

With reference now to FIG. 3, shown is another example of a system that may serve as a context for introducing one or more processes and/or devices described herein. As shown system 300 may include one or more systems 310, 320, 330, 340, 350, 360 of which at least some are operable to interact with each other or with a remote network 390 as shown in. In some embodiments, system 310 is configured to enable user 301 to perform operation 230 by requesting or otherwise causing system 320 to retrieve object 355 from system 350 and to apply one or more local criteria 324 to it. User 301 may likewise invoke one or more other systems 310, 330, 350 to request one or more instances of criteria 324 and/or objects as needed, such as by implementing one or more other modules or systems described herein.

Figure 4:
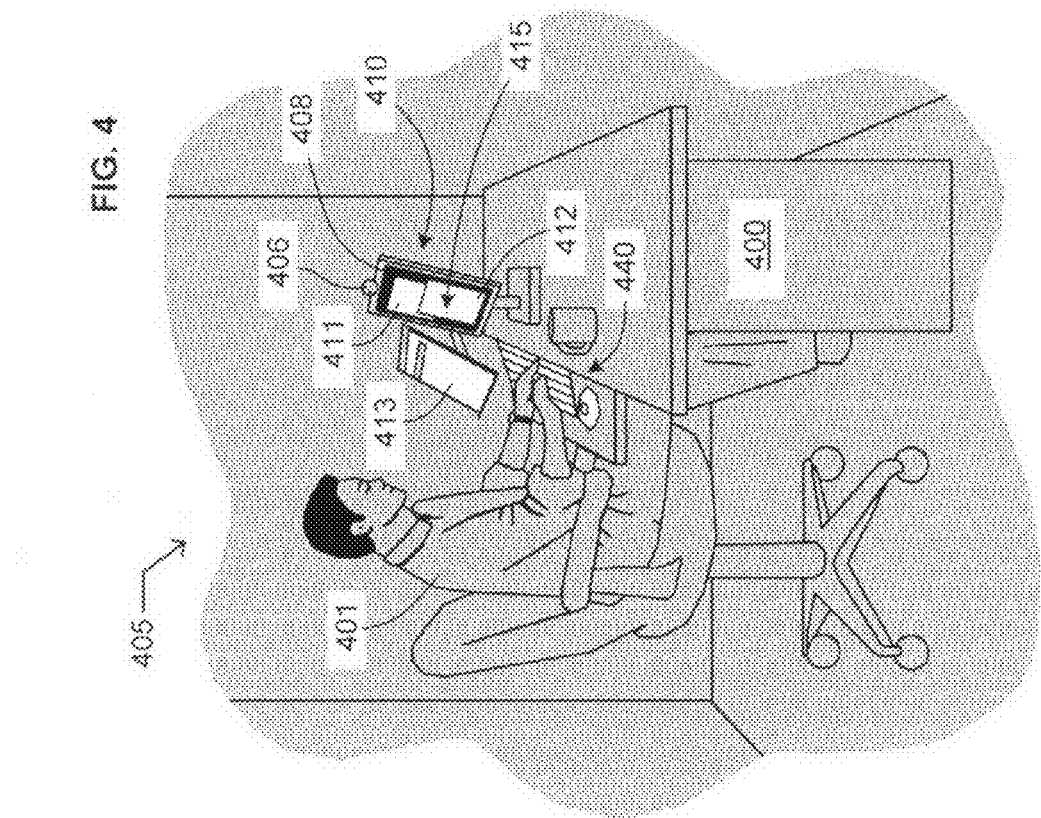

With reference now to FIG. 4, shown is another example of a system that may serve as a context for introducing one or more processes and/or devices described herein. User 401 is shown in an environment 405 of a workstation 400 comprising one or more instances of microphones, cameras, or other sensors 406; display images 408 comprising one or more shapes 415 in portions 411, 412; output devices 410; documents or other material 413; input devices 440; or the like.

Figure 5:
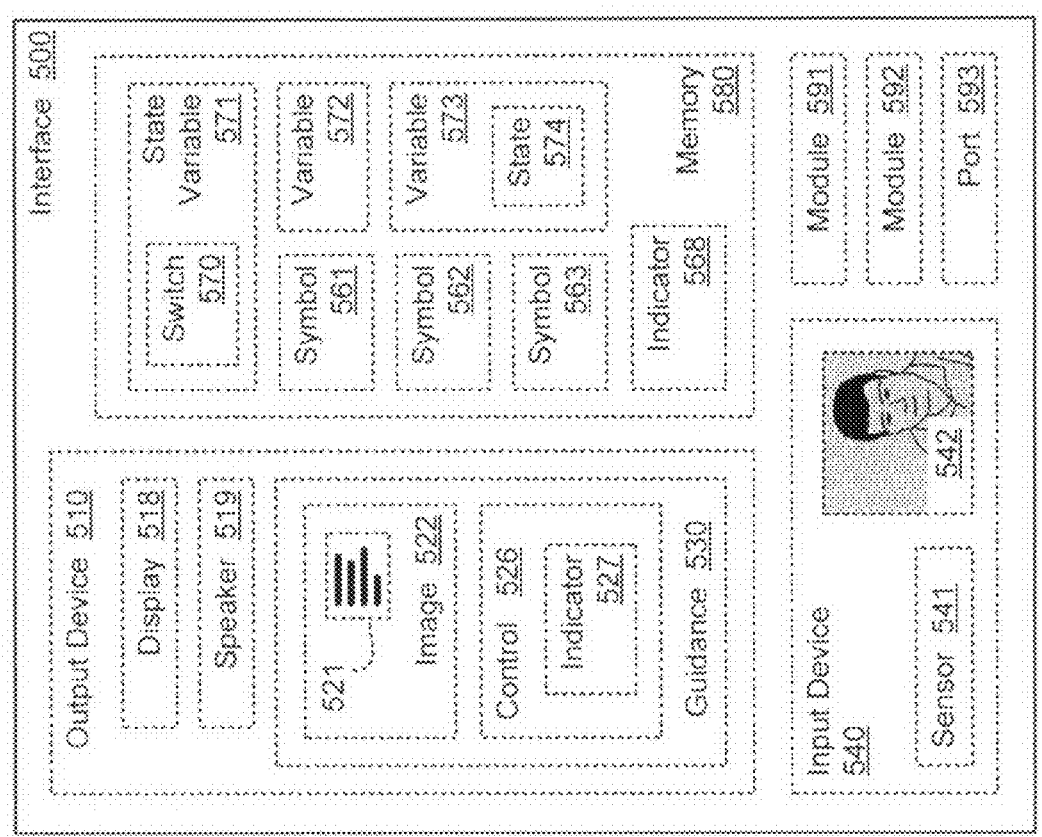

With reference now to FIG. 5, shown is another example of a system that may serve as a context for introducing one or more processes and/or devices described herein. Interface 500 may represent a portion of a workstation like that of FIG. 4 schematically, and may comprise one or more instances of output devices 510, input devices 540, memories 580, modules 591, 592, or port 593. Output device 510 may comprise one or more instances of displays 518, speakers 519, text 521 or other portions of image 522, indicators 527 or other controls 526, or other guidance 530. Input device 540 may comprise one or more cameras or other sensors 541, of which some may be operable for handling streaming video or other image data signals 542. Memory 580 may include one or more instances of switches 570 or other state variables 571; symbols 561, 562, 563; variables 572, 573 such as state 574; or other indicators 568.

Figure 6:
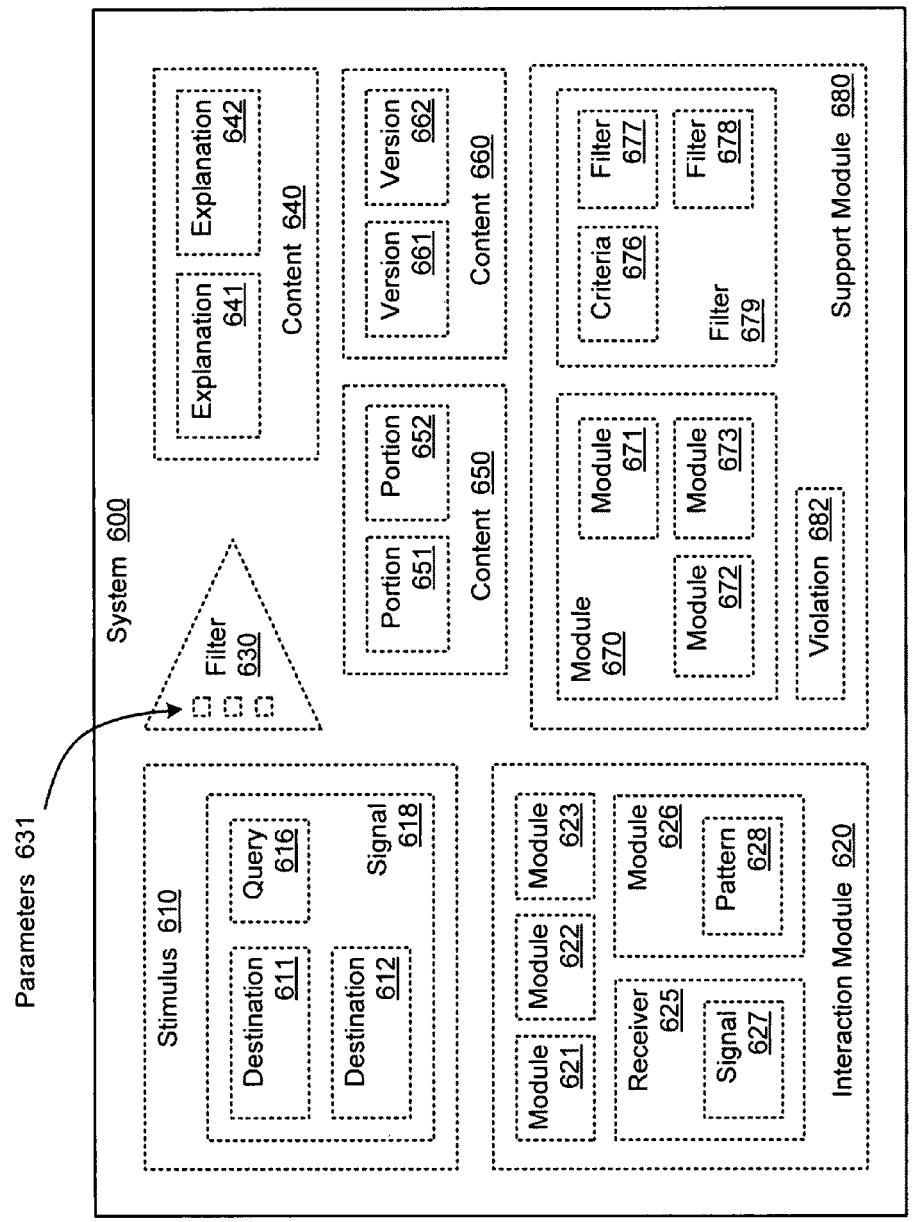

With reference now to FIG. 6, shown is another example of a system that may serve as a context for introducing one or more processes and/or devices described herein. System 600 may comprise one or more instances of stimuli 610, interaction modules 620, filters 630 (optionally with one or more parameters 631), content 640, 650, 660, or support modules 680. Stimulus 610 may comprise one or more instances of destinations 611, 612, queries 616, or other signals 618. Interaction module 620 may include one or more instances of receivers 625 (optionally operable for handling one or more signals 627) or other modules 621, 622, 623, 626 (optionally operable for handling one or more patterns 628). Content 640 may include one or more explanations 641, 642. Content 650 may include one or more portions 651, 652. Content 660 may include one or more versions 661, 662. Support module 680 may manifest or otherwise comprise one or more nested or other instances of modules 670, 671, 672, 673; implementations of one or more criteria 676 or filters 677, 678, 679; or apparent violations 682 of such criteria.

Figure 7:
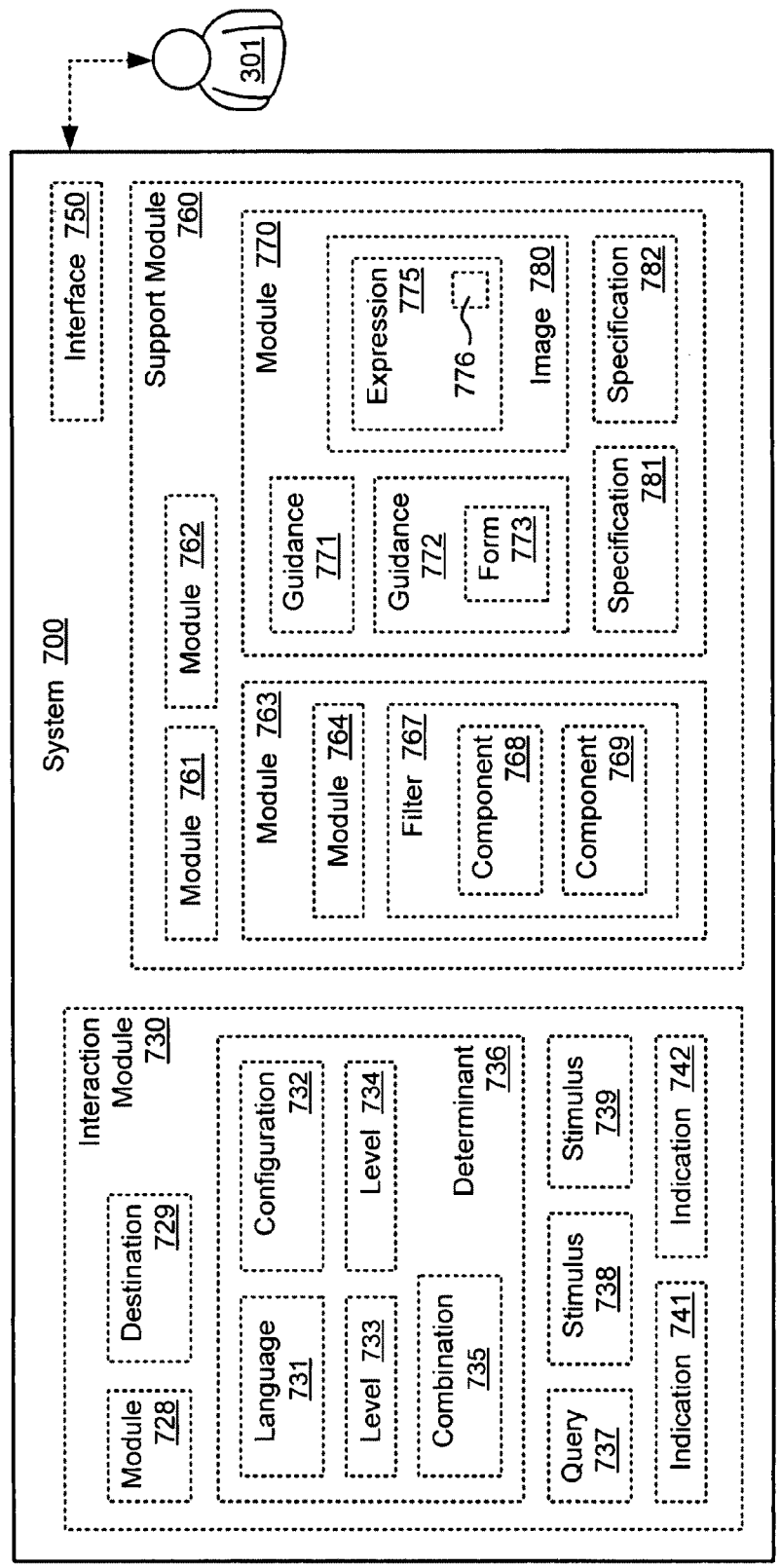

With reference now to FIG. 7, shown is another example of a system that may serve as a context for introducing one or more processes and/or devices described herein. System 700 may comprise one or more instances of interaction modules 730, interfaces 750 (accessible, for example, by user 301 of FIG. 3), or support modules 760. Interaction module 730 may comprise one or more instances of modules 728, destinations 729, determinants 736, queries 737, stimuli 738, 739 or indications 741, 742. Determinant 736 may optionally include one or more instances of (indicators of) languages 731, configurations 732, levels 733, 734, or combinations 735 of these. Support module 760 may comprise one or more instances of modules 761, 762, 763, 770. Module 763 may comprise one or more instances of nested modules 764 or filters 767 (optionally containing one or more components 768, 769). Module 770 may comprise one or more instances of guidance 771, 772 (optionally having one or more specific forms 773), images 780, or specifications 781, 782. Image 780 may comprise one or more instances of controls 776 or other expressions 775.

Figure 8:
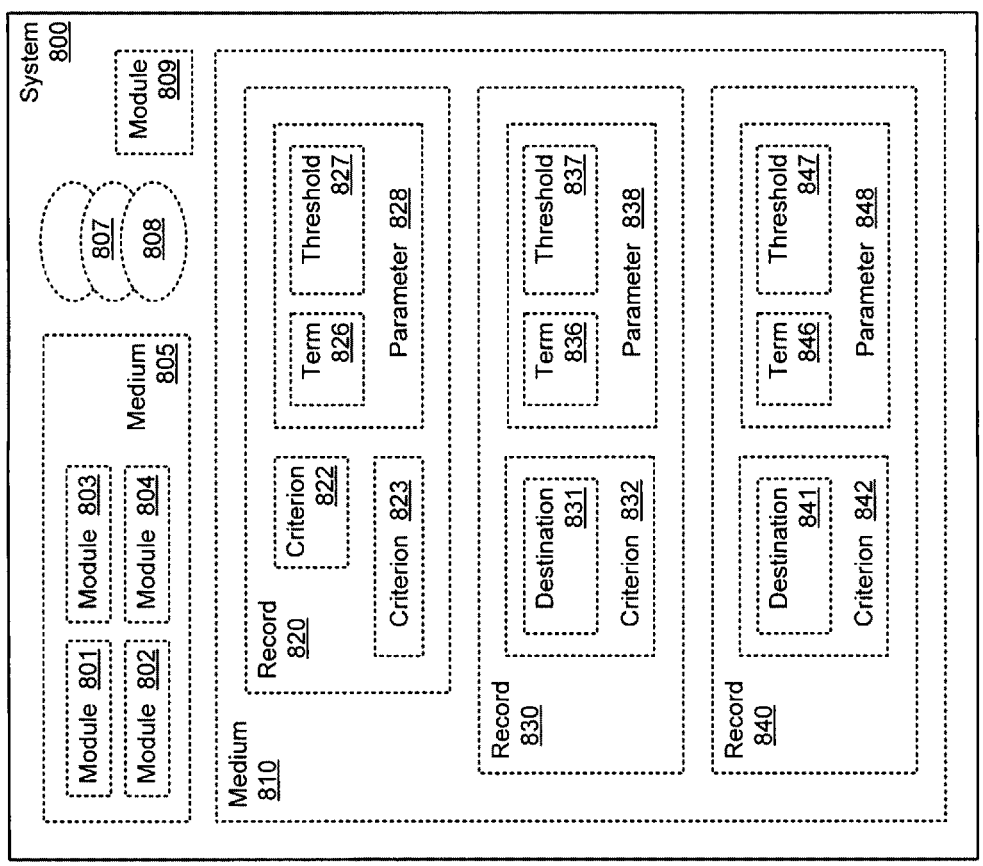

With reference now to FIG. 8, shown is another example of a system that may serve as a context for introducing one or more processes and/or devices described herein. System 800 may comprise one or more instances of content portions 807, 808 or modules 809 in various forms as well as semiconductor chips, waveguides, or storage or other media 805, 810. (In some embodiments, for example, such content or modules as described herein may include special-purpose software, special-purpose hardware, or some combination thereof, optionally in conjunction with writeable media, processors, or other general-purpose elements.) Medium 805 may, for example, comprise one or more instances of modules 801, 802, 803, 804. Medium 810 may likewise contain one or more records 820, 830, 840. Record 820 may include one or more instances of criteria 822, 823, terms 826, thresholds 827, or other parameters 828. Record 830 may similarly include one or more instances of destinations 831 or other criteria 832, terms 836, thresholds 837, or other parameters 838. Record 840 may likewise include one or more instances of destinations 841 or other criteria 842, terms 846, thresholds 847, or other parameters 848.

Figure 9:
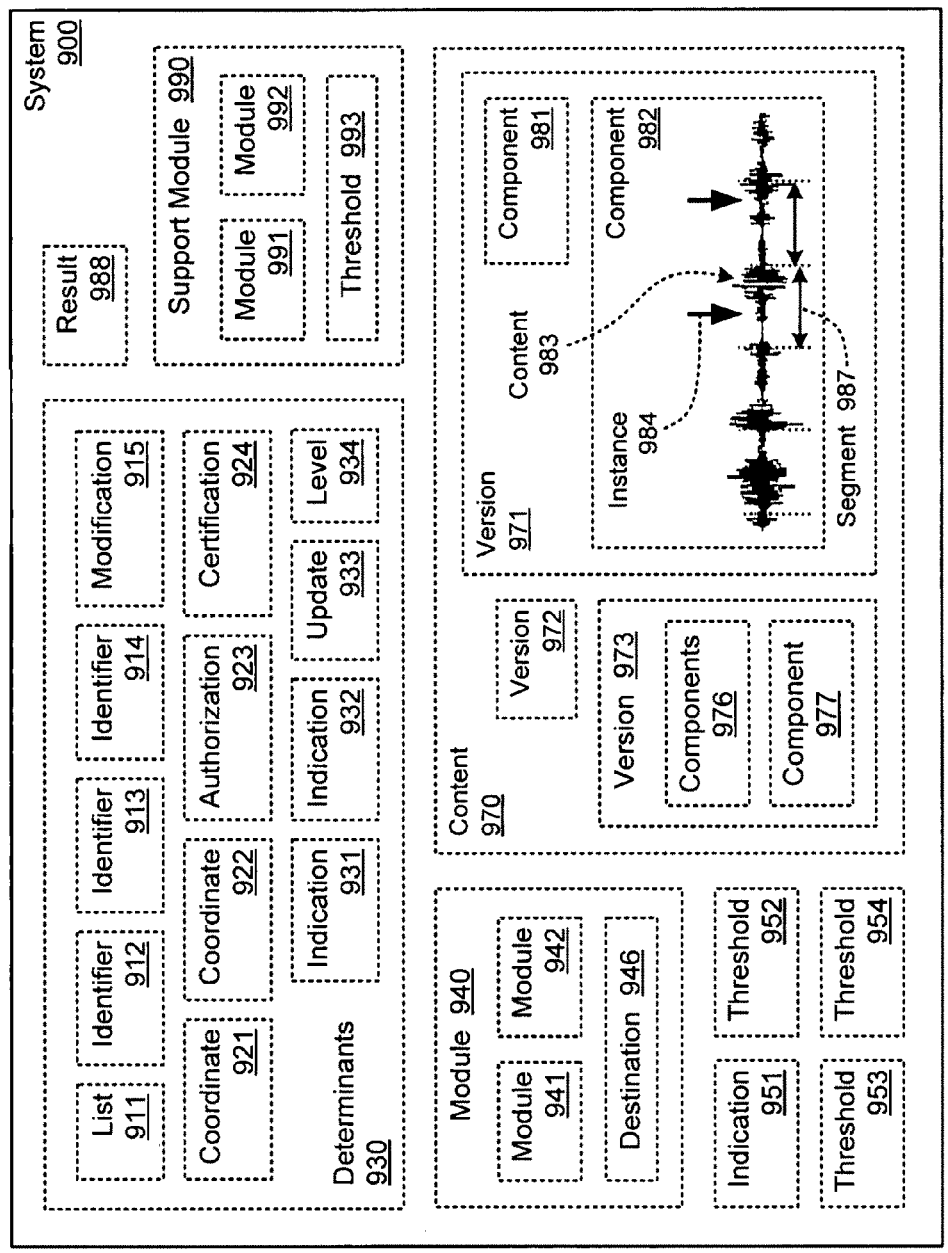

With reference now to FIG. 9, shown is another example of a system that may serve as a context for introducing one or more processes and/or devices described herein. System 900 may comprise one or more instances of determinants 930, modules 940, thresholds 952, 953, 954 or other indications 951, content 970, results 988, or support modules 990. The one or more determinants 930 may (if included) comprise one or more instances of lists 911 or other identifiers 912, 913, 914; modifications 915; coordinates 921, 922; authorizations 923; certifications 924; or updates 933, levels 934, or other indications 931, 932. Module 940 may (if included) comprise one or more instances of destinations 946 or other modules 941, 942. Content 970 may comprise one or more instances of versions 971, 972, 973 (of the same message or different messages, for example) that may each include one or more components 976, 977, 981, 982. Component 982, for example, may comprise auditory content 983 including one or more segments 987 including or overlapping one or more instances 984 of phrases or other patterns. Support module 990 may comprise one or more instances of thresholds 993 or other modules 991, 992.

Figure 10:
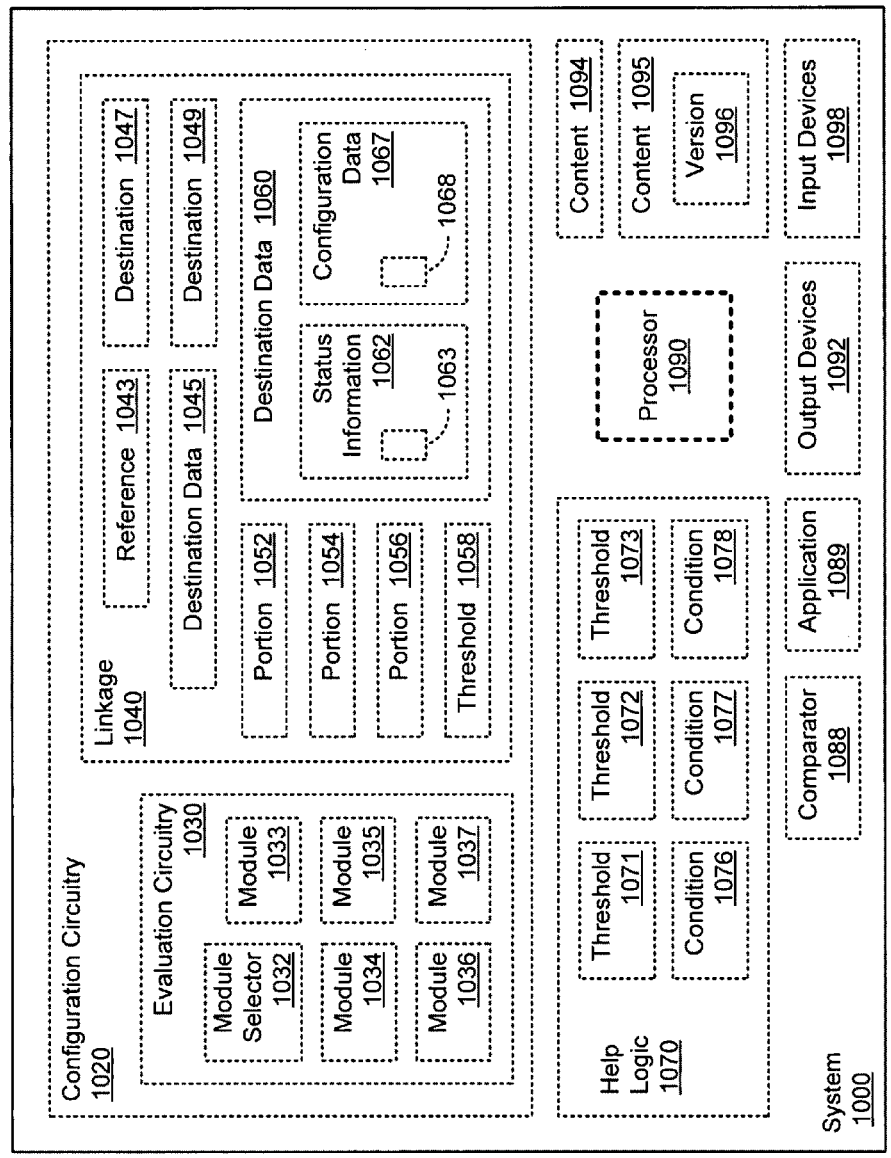

With reference now to FIG. 10, shown is another example of a system that may serve as a context for introducing one or more processes and/or devices described herein. System 1000 may comprise one or more instances of configuration circuitry 1020, help logic 1070, comparators 1088, applications 1089, processors 1090, output devices 1092, content 1094, 1095 (optionally with one or more versions 1096), or input devices 1098. Configuration circuitry 1020 may comprise one or more instances of evaluation circuitry 1030 or linkages 1040. Evaluation circuitry 1030 may comprise one or more instances of modules 1033, 1034, 1035, 1036, 1037 or module selectors 1032. Linkage 1040 may comprise one or more instances of references 1043; destination data 1045; destinations 1047, 1049; portions 1052, 1054, 1056; thresholds 1058; or destination data 1060. Destination data 1060 may comprise one or more instances of bits 1063 or other status information 1062 or of bits 1068 or other configuration data 1067. Help logic 1070 may comprise one or more thresholds 1071, 1072, 1073 or conditions 1076, 1077, 1078.

Figure 11:
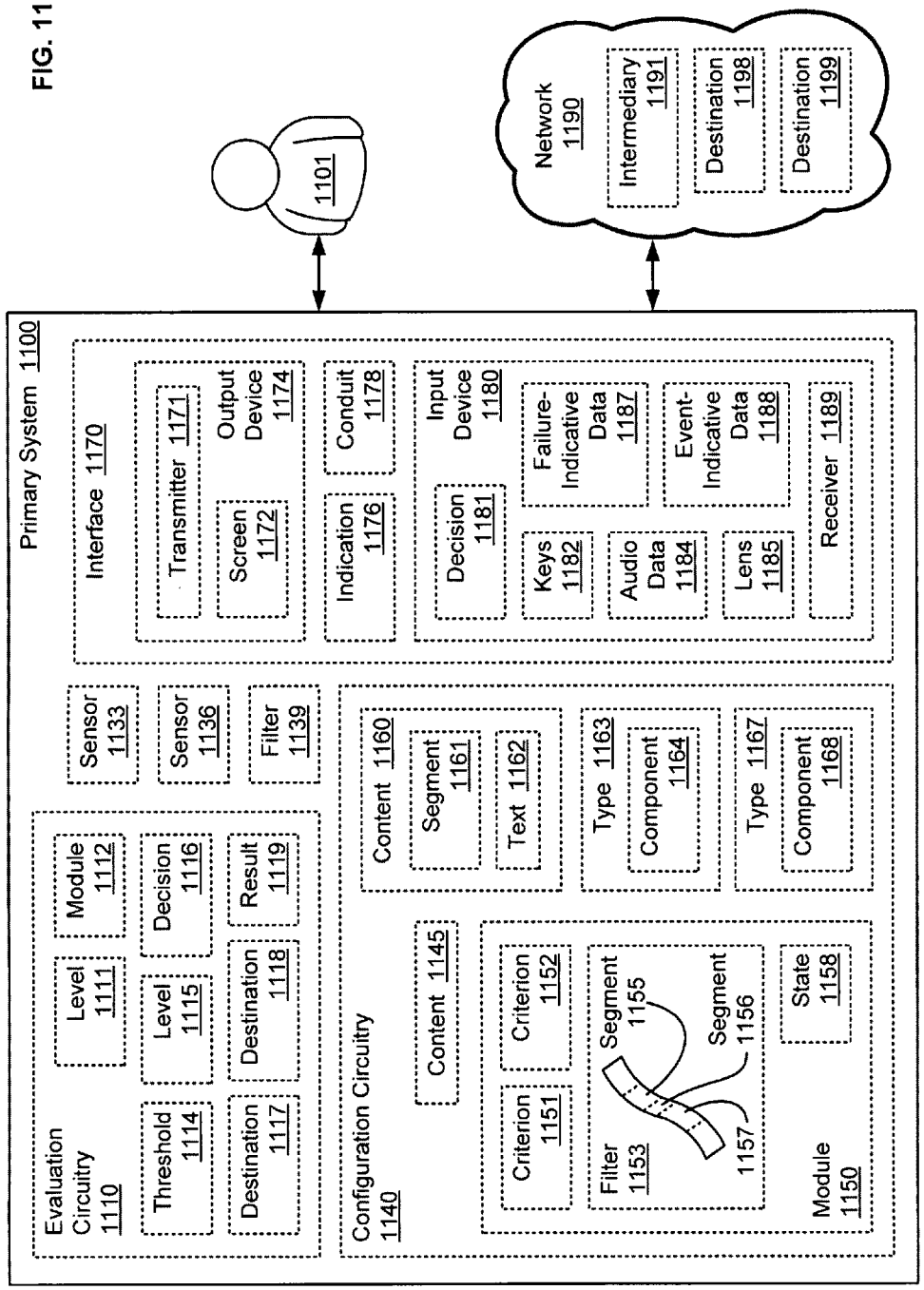

With reference now to FIG. 11, shown is another example of a system that may serve as a context for introducing one or more processes and/or devices described herein. Primary system 1100 may comprise one or more instances of evaluation circuitry 1110, sensors 1133, 1136, filters 1139, configuration circuitry 1140, or interfaces 1170 operable for interacting with one or more users 1101 or networks 1190. Evaluation circuitry 1110 may comprise one or more instances of hardware and/or software modules 1112, levels 1111, 1115, thresholds 1114, decisions 1116, destinations 1117, 1118, or results 1119. Configuration circuitry 1140 may comprise one or more instances of modules 1150; text 1162 and other segments 1161 of content 1145, 1160; and one or more components 1164, 1168 each of one or more respective types 1163, 1167. Module 1150 may comprise one or more instances of criteria 1151, 1152 such as may implement one or more filters 1153 operable on sequences of respective segments 1155, 1156, 1157 as shown, and states 1158. Interface 1170 may comprise one or more instances of output devices 1174, input devices 1180, or other conduits 1178 operable for bearing indications 1176 or the like. Output device 1174 may comprise one or more instances of transmitters 1171 or screens 1172. Input device 1180 may similarly bear or otherwise comprise one or more instances of decisions 1181, buttons or keys 1182 (of a mouse or keyboard, for example), audio data 1184, lens 1185, failure-indicative data 1187 or other event-indicative data 1188, or receivers 1189. Network 1190 may access or otherwise comprise one or more instances of intermediaries 1191 or destinations 1198, 1199.

Figure 12:
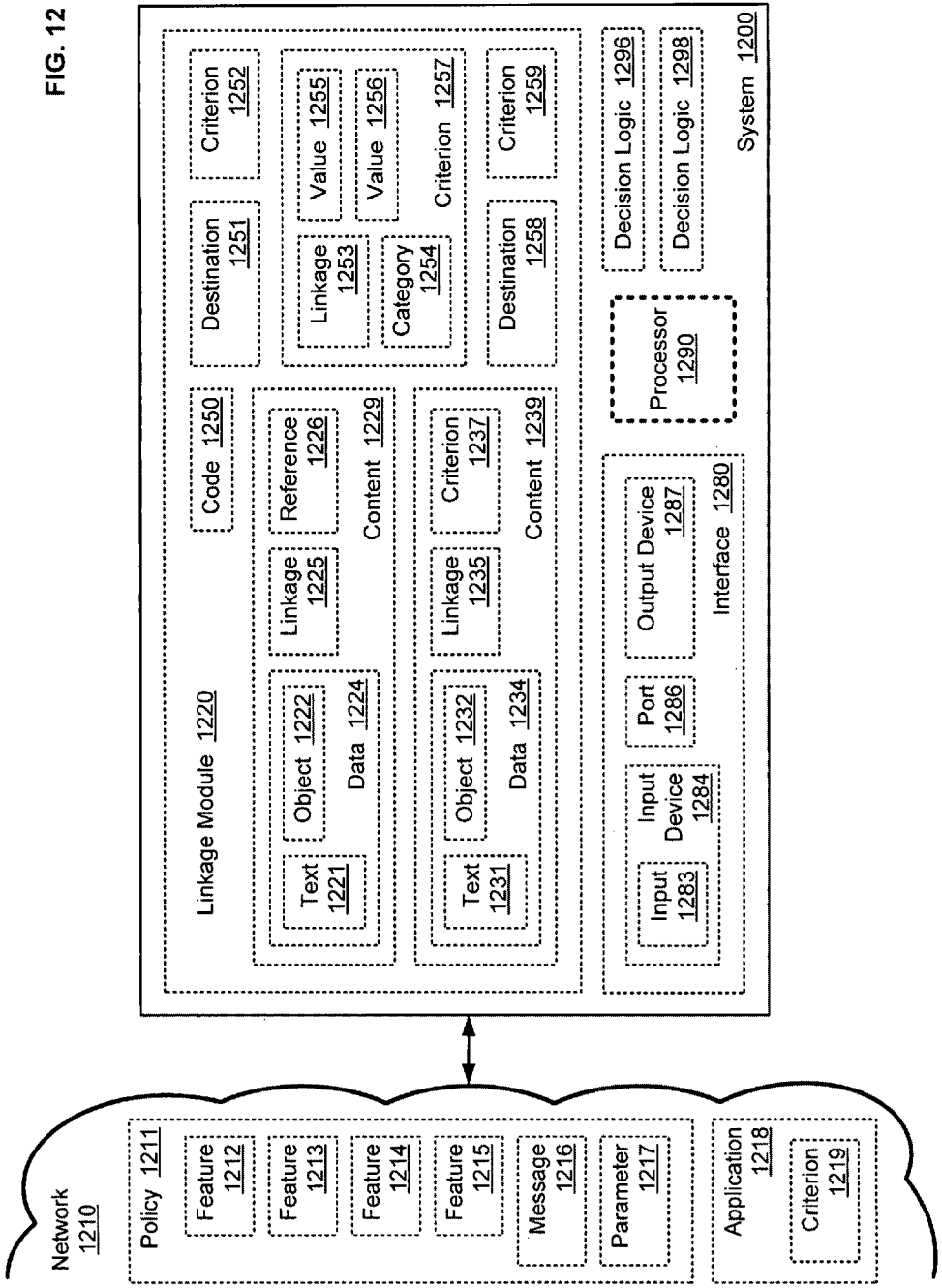

With reference now to FIG. 12, shown is another example of a system that may serve as a context for introducing one or more processes and/or devices described herein. System 1200 may operably couple with one or more networks 1210 as shown, and may comprise one or more instances of linkage modules 1220, interfaces 1280, processors 1290, or decision logic 1296, 1298. Network 1210 may comprise one or more instances of applications 1218 or other circuitry operable for implementing one or more criteria 1219 or other policies 1211. Policy 1211 may comprise one or more instances of features 1212, 1213, 1214, 1215; messages 1216; or other parameters 1217. Linkage module 1220 may comprise memory or special-purpose elements containing or otherwise comprising one or more instances of content 1229, 1239; codes 1250, destinations 1251, 1258; or criteria 1252, 1257, 1259. Content 1229 may comprise one or more instances of text 1221 or other objects 1222 of data 1224, linkages 1225, or other references 1226. Content 1239 may similarly comprise one or more instances of linkages 1235 or criteria 1237 as well as text 1231 or other objects 1232 of data 1234. Criterion 1257 may comprise one or more instances of linkages 1253, categories 1254, or other values 1255, 1256. Interface 1280 may comprise one or more instances of input 1283 (optionally borne by one or more input devices 1284), ports 1286, or output devices 1287.

Figure 13:
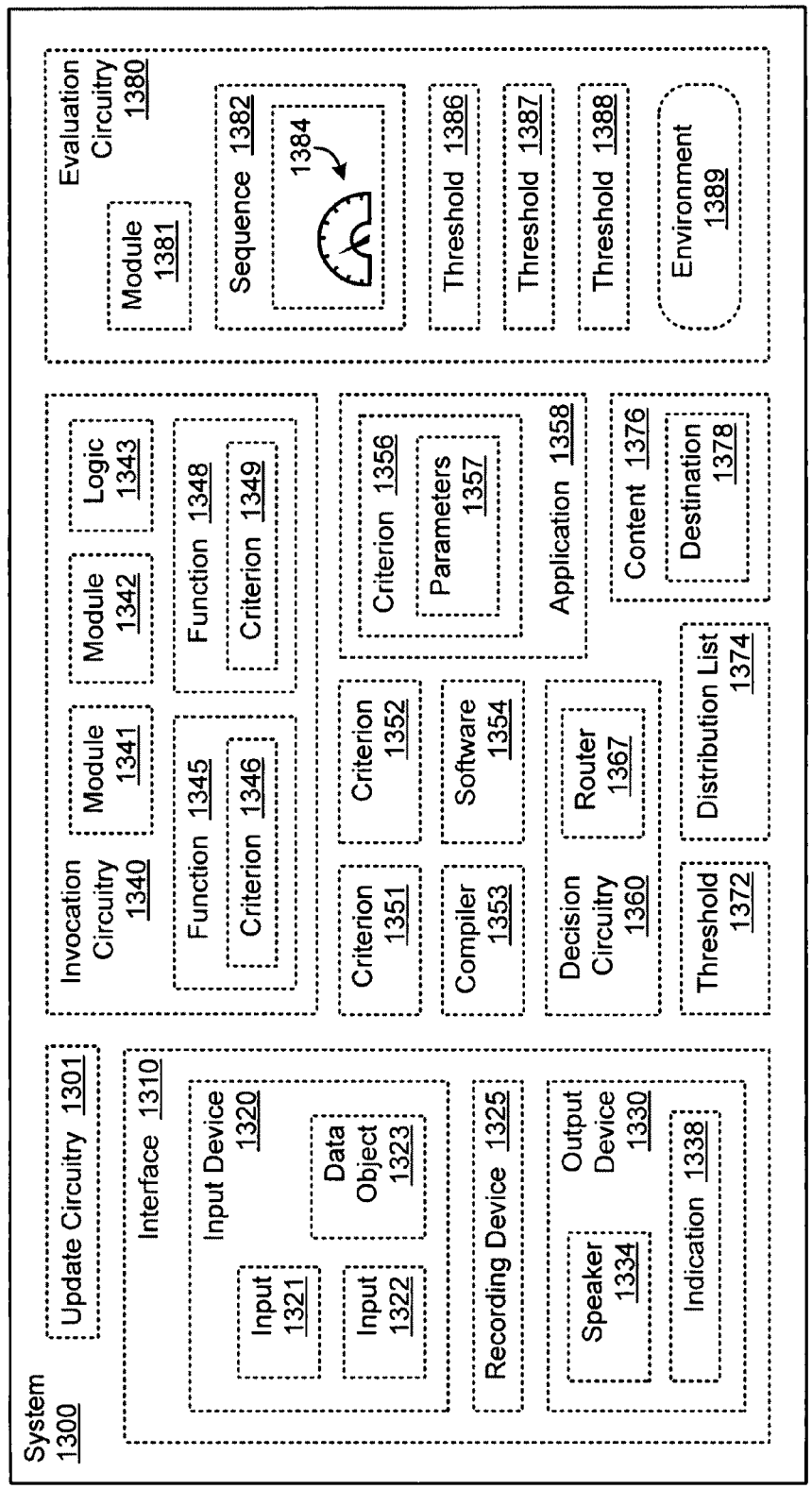

With reference now to FIG. 13, shown is another example of a system that may serve as a context for introducing one or more processes and/or devices described herein. System 1300 may comprise one or more instances of update circuitry 1301, interfaces 1310, invocation circuitry 1340, criteria 1351, 1352, compilers 1353, software 1354, applications 1358, routers 1367 or other decision circuitry 1360, thresholds 1372, distribution lists 1374, destinations 1378 or other content 1376, or evaluation circuitry 1380. Interface 1310 comprises one or more instances of input devices 1320, recording devices 1325, or output devices 1330. Input device 1320 may, for example, be operable for bearing one or more instances of inputs 1321, 1322 or other data objects 1323. One or more speakers 1334 or other output devices 1330 may similarly be operable for bearing one or more such data objects or other indications 1338. Invocation circuitry 1340 may comprise one or more instances of modules 1341, 1342, logic 1343, or functions 1345, 1348 each operable for applying one or more criteria 1346, 1349. Application 1358 may similarly comprise one or more instances of parameters 1357 operable for controlling the behavior of one or more criteria 1356. Evaluation circuitry 1380 may comprise one or more instances of modules 1381, sequences 1382 (optionally providing output 1384), thresholds 1386, 1387, 1388, or environments 1389.

Figure 14:
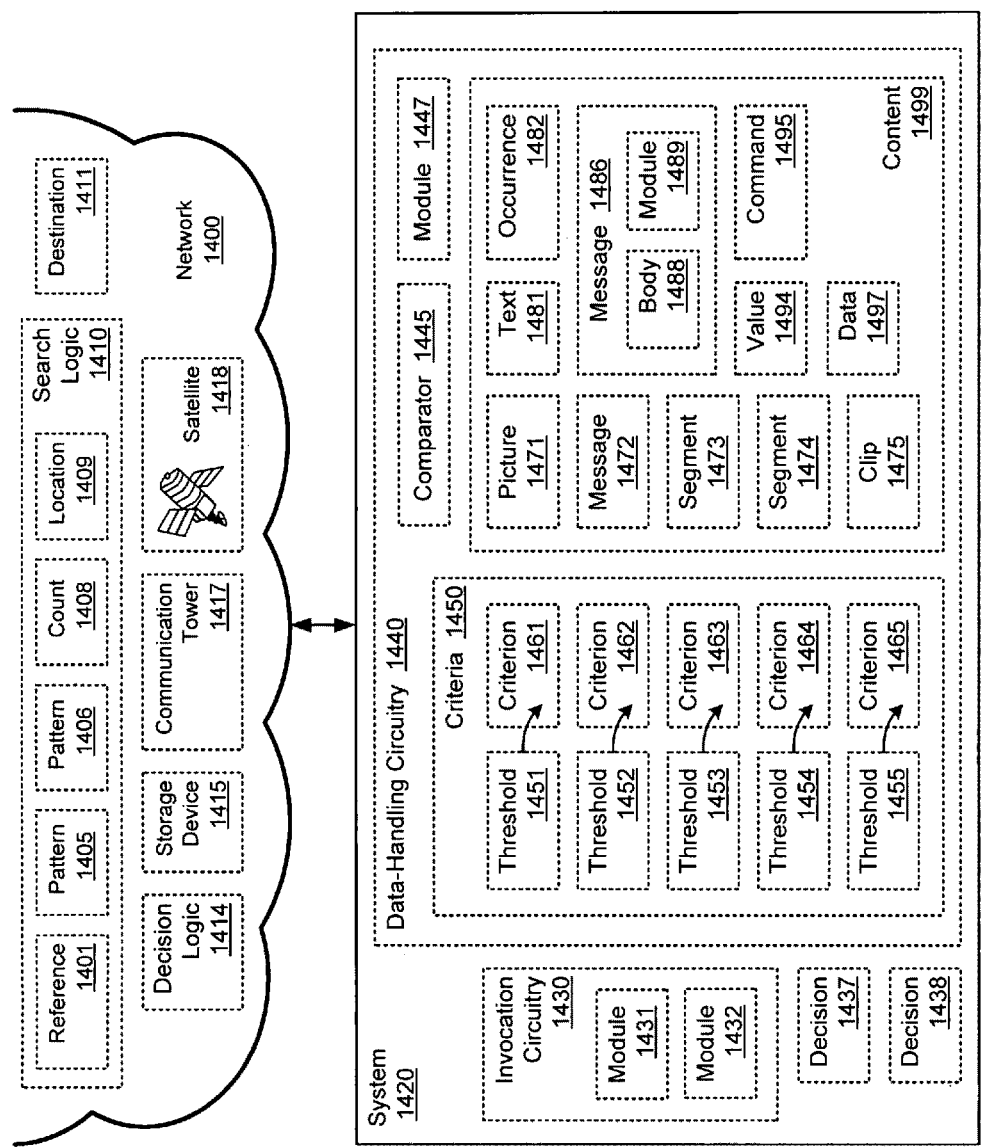

With reference now to FIG. 14, shown is another example of a system that may serve as a context for introducing one or more processes and/or devices described herein. Network 1400 may comprise one or more instances of search logic 1410, destinations 1411, decision logic 1414, storage devices 1415, communication towers 1417, or satellites 1418. Search logic 1410 may comprise one or more instances of references 1401, patterns 1405, 1406, counts 1408, or locations 1409. As shown, network 1400 may operably couple with one or more instances of system 1420, which comprises one or more instances of modules 1431, 1432 or other invocation circuitry 1430, decisions 1437, 1438, or data-handling circuitry 1440. Data-handling circuitry 1440 may comprise one or more instances of comparators 1445, modules 1447, criteria 1450, or content 1499. Such criteria 1450 may comprise one or more instances of thresholds 1451, 1452, 1453, 1454, 1455 each operable with a respective one or more criteria 1461, 1462, 1463, 1464, 1465. Content 1499 may comprise one or more instances of pictures 1471, messages 1472, segments 1473, 1474, clips 1475, text 1481 or other occurrences 1482, messages 1486, values 1494, commands 1495, or data 1497. The message(s) 1486 may comprise one or more instances of bodies 1488 or other modules 1489.

Figure 15:
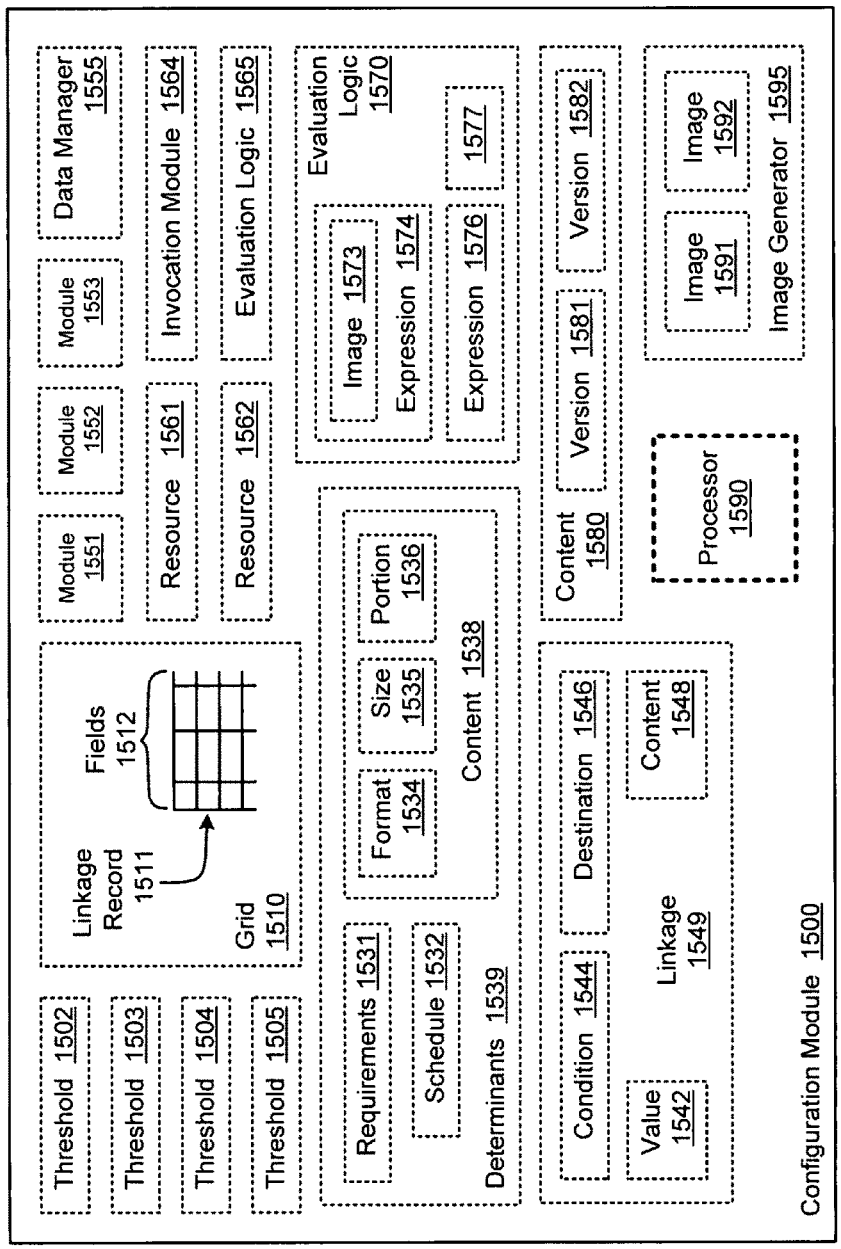

With reference now to FIG. 15, shown is another example of a system that may serve as a context for introducing one or more processes and/or devices described herein. Configuration module 1500 may include one or more instances of thresholds 1502, 1503, 1504, 1505 and/or grids 1510 or other data arrangements comprising linkage records 1511 having one or more fields 1512. Configuration module 1500 may further include one or more instances of requirements 1531, schedules 1532, content 1538, or other determinants 1539 or linkages 1549. Alternatively or additionally, configuration module 1500 may likewise include one or more instances of modules 1551, 1552, 1553; data managers 1555; resources 1561, 1562; invocation modules 1564; evaluation logic 1565, 1570; content 1580 comprising one or more versions 1581, 1582; processors 1590; or image generators 1595 operable for generating one or more images 1591, 1592. Content 1538 may comprise, implicitly or explicitly, one or more instances of formats 1534 or other portions 1536 or sizes 1535 or other aspects. Linkage 1549 may refer to or otherwise comprise one or more instances of values 1542, conditions 1544, destinations 1546, or content 1548. Evaluation logic 1570 may comprise one or more instances of images 1573 or other expressions 1574, 1576, 1577.

Figure 16:
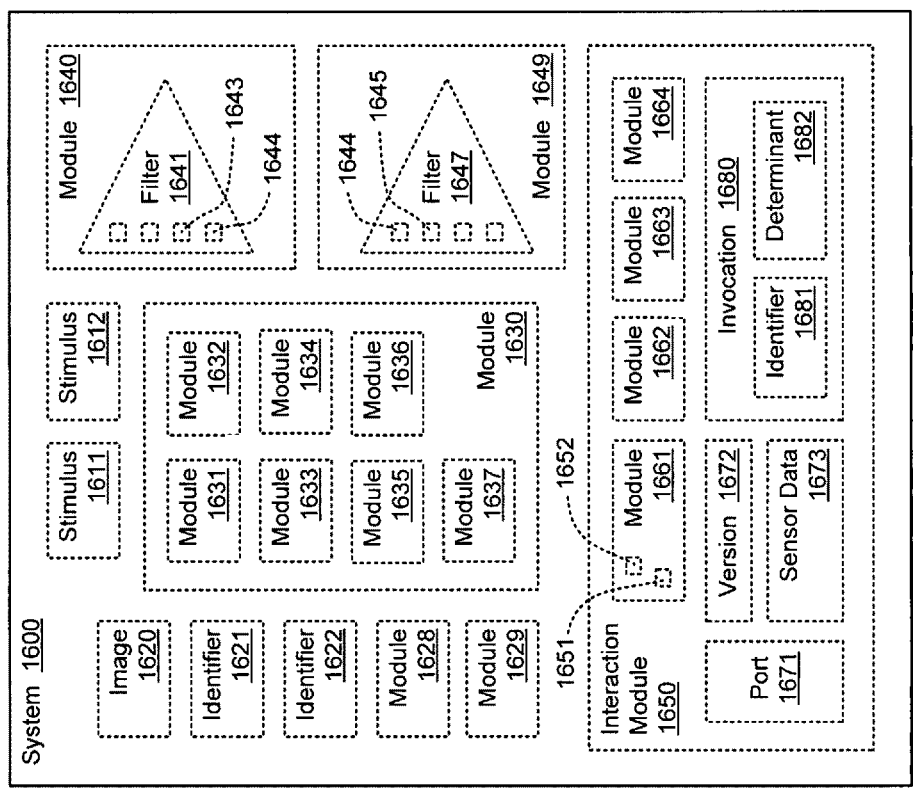

With reference now to FIG. 16, shown is another example of a system that may serve as a context for introducing one or more processes and/or devices described herein. System 1600 may include one or more instances of stimuli 1611, 1612; images 1620; identifiers 1621, 1622; or nested or other modules 1628, 1629, 1630, 1631, 1632, 1633, 1634, 1635, 1636, 1637, 1640, 1649 such as interaction module 1650. Modules 1640, 1649 may each comprise one or more instances of filters 1641, 1647 configured for applying one or more criteria 1643, 1644, 1645. Interaction module 1650 may comprise one or more instances of modules 1661, 1662, 1663, 1664 (each with one or more indications 1651, 1652, for example); ports 1671; versions 1672; sensor data 1673; or invocations 1680 (optionally comprising one or more identifiers 1681 or determinants 1682).

Figure 17:
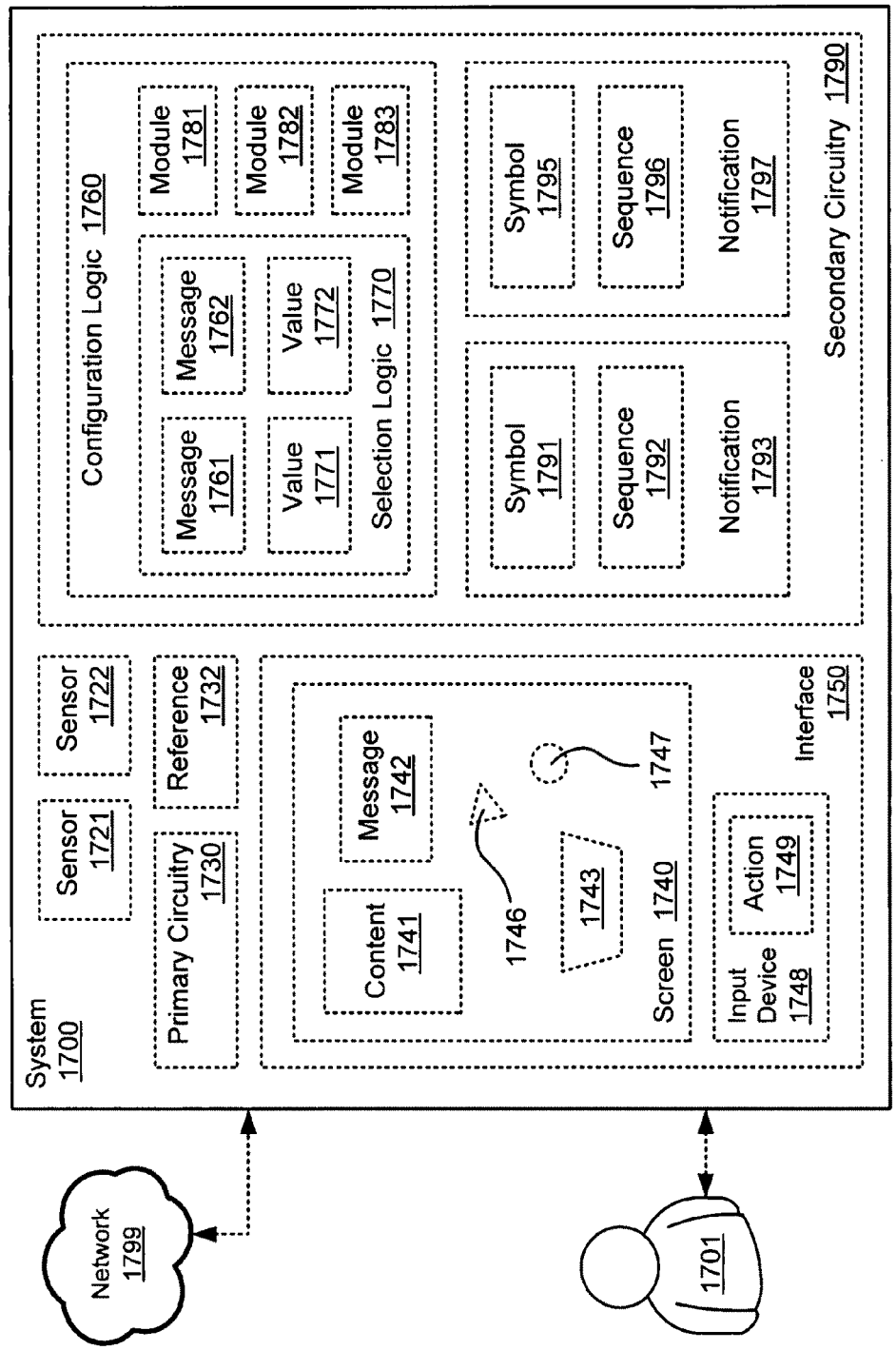

With reference now to FIG. 17, shown is another example of a system that may serve as a context for introducing one or more processes and/or devices described herein. System 1700 may include one or more instances of sensors 1721, 1722; primary circuitry 1730; references 1732; interfaces 1750; or secondary circuitry 1790; each of which may be operable for interacting with one or more users 1701 or networks 1799 as shown. Interface 1750 may include one or more instances of screens 1740, which may be operable for presenting or otherwise acting on one or more instances of messages 1742 or other content 1741, 1743 and/or on pointer 1746 or other control 1747. Alternatively or additionally, interface 1750 may include one or more input devices 1748 operable for detecting or otherwise indicating one or more user actions 1749. Secondary circuitry 1790 may comprise one or more instances of configuration logic 1760 such as selection logic 1770 or other modules 1781, 1782, 1783. Selection logic 1770 may comprise one or more instances of messages 1761, 1762 or other values 1771, 1772. Secondary circuitry may further comprise one or more notifications 1793, 1797 respectively comprising one or more symbols 1791, 1795 and/or sequences 1792, 1796.

Figure 18:
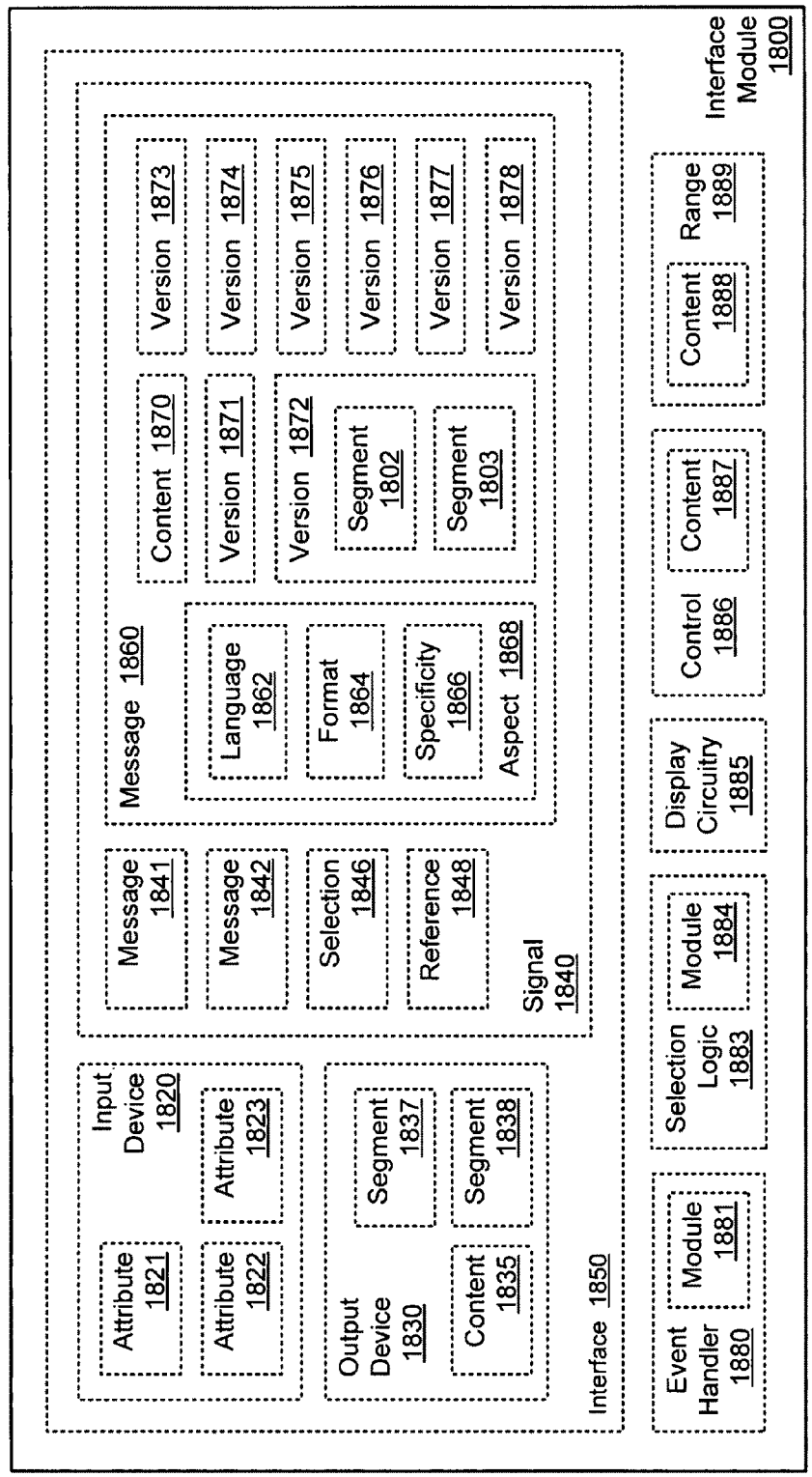

With reference now to FIG. 18, shown is another example of a system that may serve as a context for introducing one or more processes and/or devices described herein. Interface module 1800 may include one or more instances of interfaces 1850, modules 1881 of event handlers 1880, modules 1884 of selection logic 1883, display circuitry 1885, or controls 1886 or ranges 1889 that may include content 1887, 1888. Interface 1850 may include one or more instances of input devices 1820, output devices 1830, or signals 1840. Input device 1820 may detect or otherwise indicate one or more instances of attributes 1821, 1822, 1823. Output device 1830 may present or otherwise indicate one or more segments 1837, 1838 or other content 1835. Signal 1840 may comprise one or more instances of selections 1846, references 1848, or messages 1841, 1842, 1860. Message 1860 may, for example, comprise one or more instances of languages 1862, formats 1864, specificities 1866, or other aspects 1868; content 1870; or various versions 1871, 1872, 1873, 1874, 1875, 1876, 1877, 1878 each including one or more segments 1802, 1803.

Figure 19:
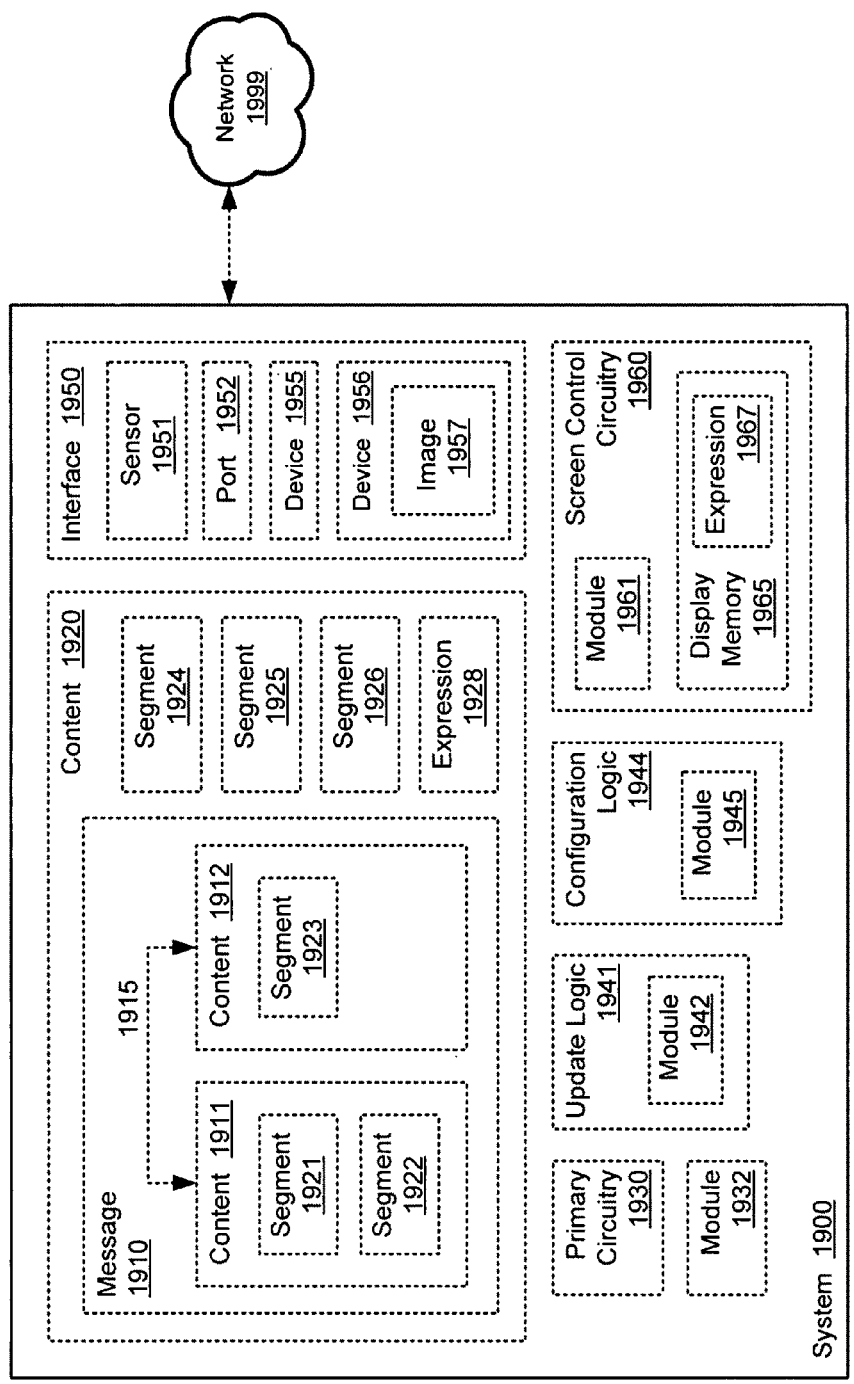

With reference now to FIG. 19, shown is another example of a system that may serve as a context for introducing one or more processes and/or devices described herein. System 1900 may be operable for interaction with network 1999, and may include one or more instances of content 1920, interfaces 1950, primary circuitry 1930, module 1932, one or more modules 1942 of update logic 1941, one or more modules 1945 of configuration logic 1944, or screen control circuitry 1960. Content 1920 may, for example, include one or more instances of messages 1910, segments 1924, 1925, 1926, or other expressions 1928. Message 1910 may comprise instances of content 1911, 1912 having a relationship 1915. As shown, for example, content 1911 may comprise segments 1921, 1922 and content 1912 may comprise 1923. Interface 1950 may comprise one or more instances of sensors 1951, ports 1952, or images 1957 or other data that may be indicated or otherwise handled by one or more interface devices 1955, 1956. Screen control circuitry 1960 may comprise one or more display memory 1965 operable for holding expression 1967 during presentation, or other modules 1961.

Figure 20:
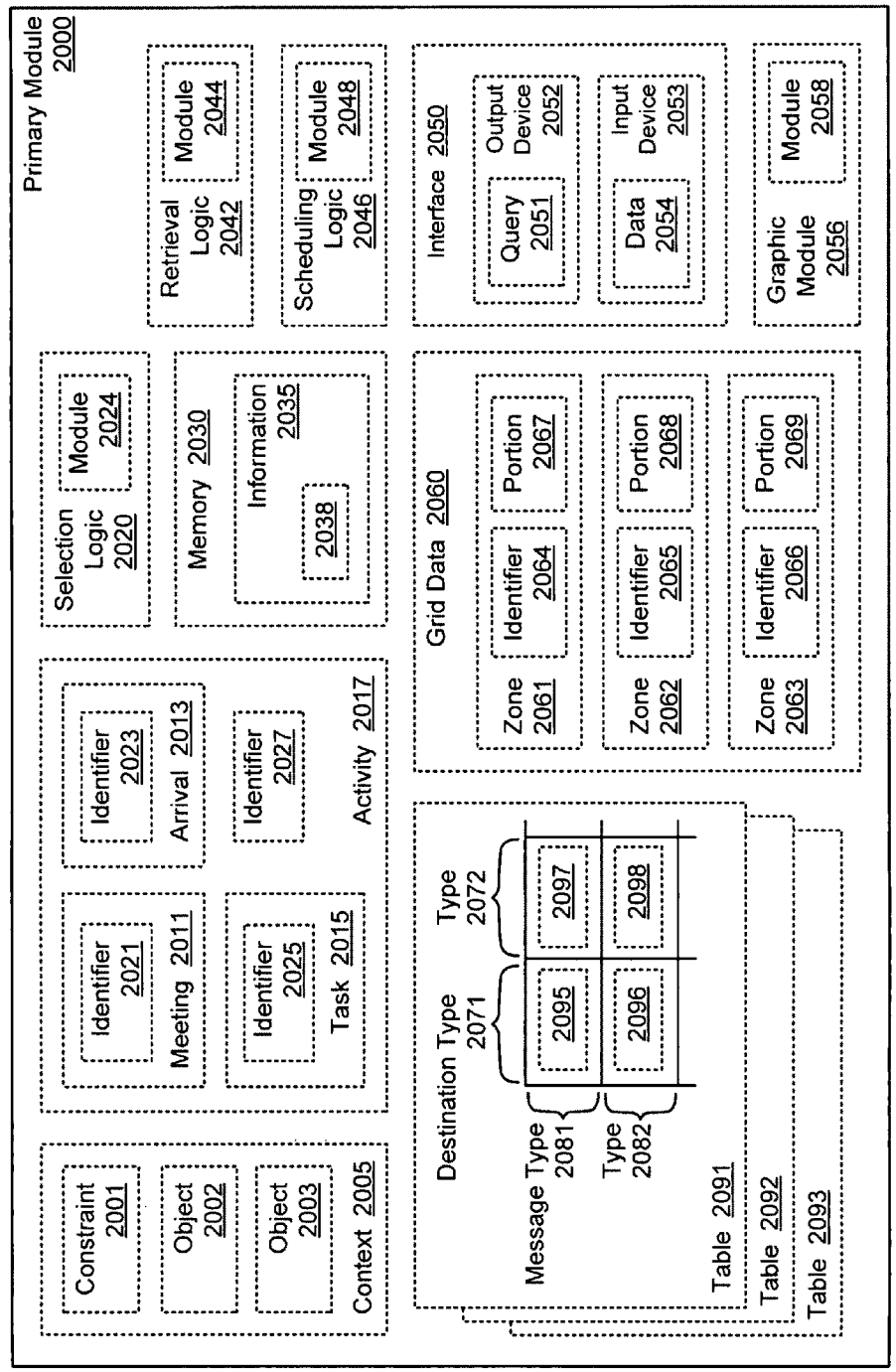

With reference now to FIG. 20, shown is another example of a system that may serve as a context for introducing one or more processes and/or devices described herein. Primary module 2000 may include one or more instances of constraints 2001 or other objects 2002, 2003 of respective contexts 2005 relating to one or more activities 2017. Primary module 2000 may further include one or more instances of modules 2024 of selection logic 2020, memories 2030, modules 2044 of retrieval logic 2042, modules 2048 of scheduling logic 2046, tables 2091, 2092, 2093 or similar grid data 2060, interfaces 2050, or other modules 2058 (of graphic modules 2056, for example). Memory 2030 may contain one or more instances of identifiers 2038 or other working data or other information 2035 for modules as described herein. Table 2091 may comprise one or more instances of segments 2095, 2096, 2097, 2098 each relating with one or more respective destination types 2071, 2072 and message types 2081, 2082 as shown. Grid data 2060 may comprise one or more instances of identifiers 2064, 2065, 2066 or other portions 2067, 2068, 2069 in each of respective zones 2061, 2062, 2063. Interface 2050 comprises one or more instances of output devices 2052 (operable for handling one or more queries 2051, for example) or input devices 2053 (operable for handling data 2054, for example).

Figure 21:
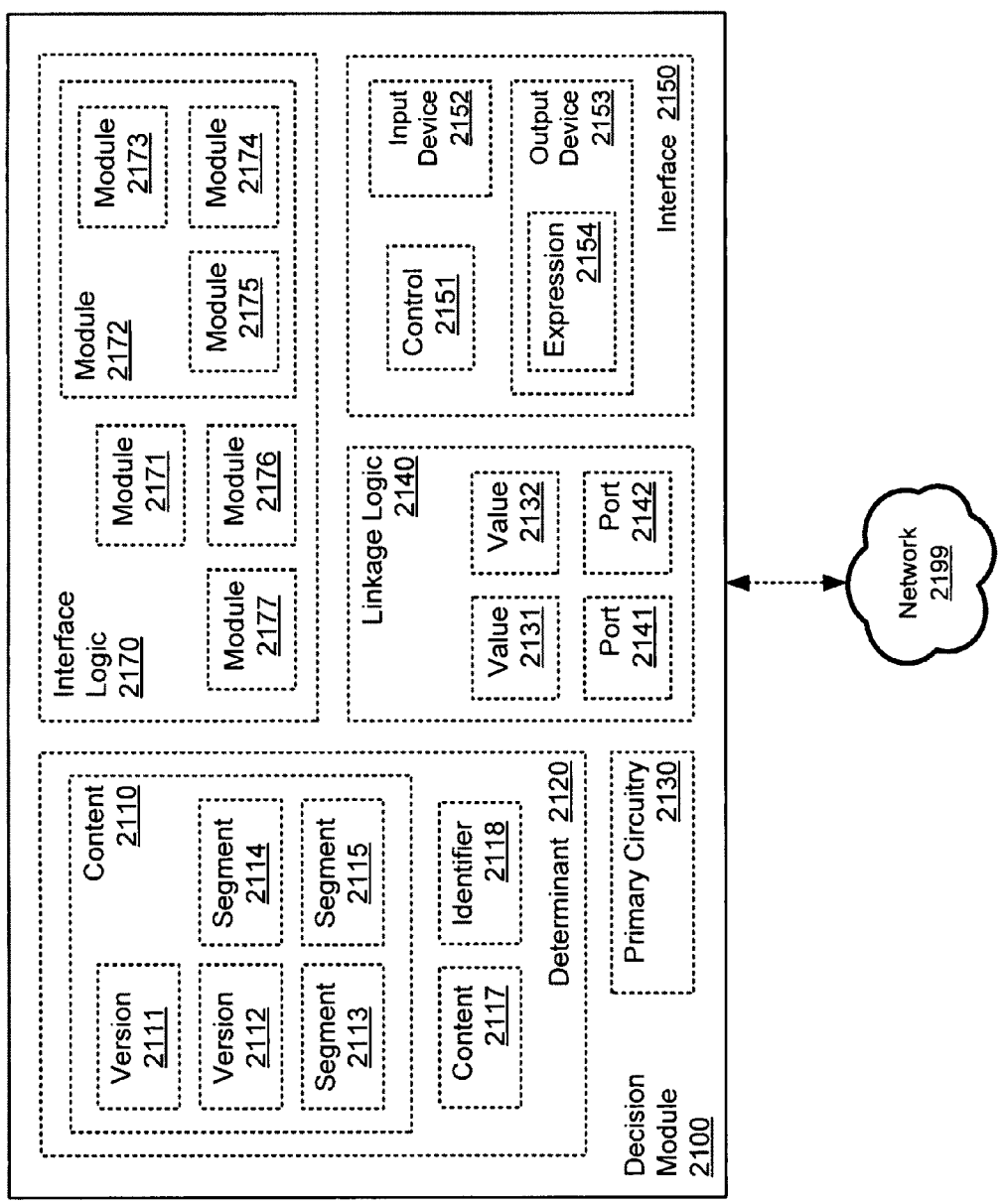

With reference now to FIG. 21, shown is another example of a system that may serve as a context for introducing one or more processes and/or devices described herein. Decision module 2100 may include one or more instances of content 2110, 2117, identifiers 2118, or other determinants 2120; primary circuitry 2130; linkage logic 2140; interface 2150; or interface logic 2170. Content 2110 may comprise one or more instances of versions 2111, 2112 and/or respective segments 2113, 2114, 2115. Linkage logic 2140 may incorporate or otherwise relate two or more values 2131, 2132, optionally via one or more ports 2141, 2142. Interface 2150 may comprise one or more instances of controls 2151, input devices 2152, or output devices 2153 operable for presenting expressions 2154 as described herein. Interface logic 2170 may likewise comprise one or more nested or other modules 2171, 2172, 2173, 2174, 2175, 2176, 2177 as described herein.

Figure 22:
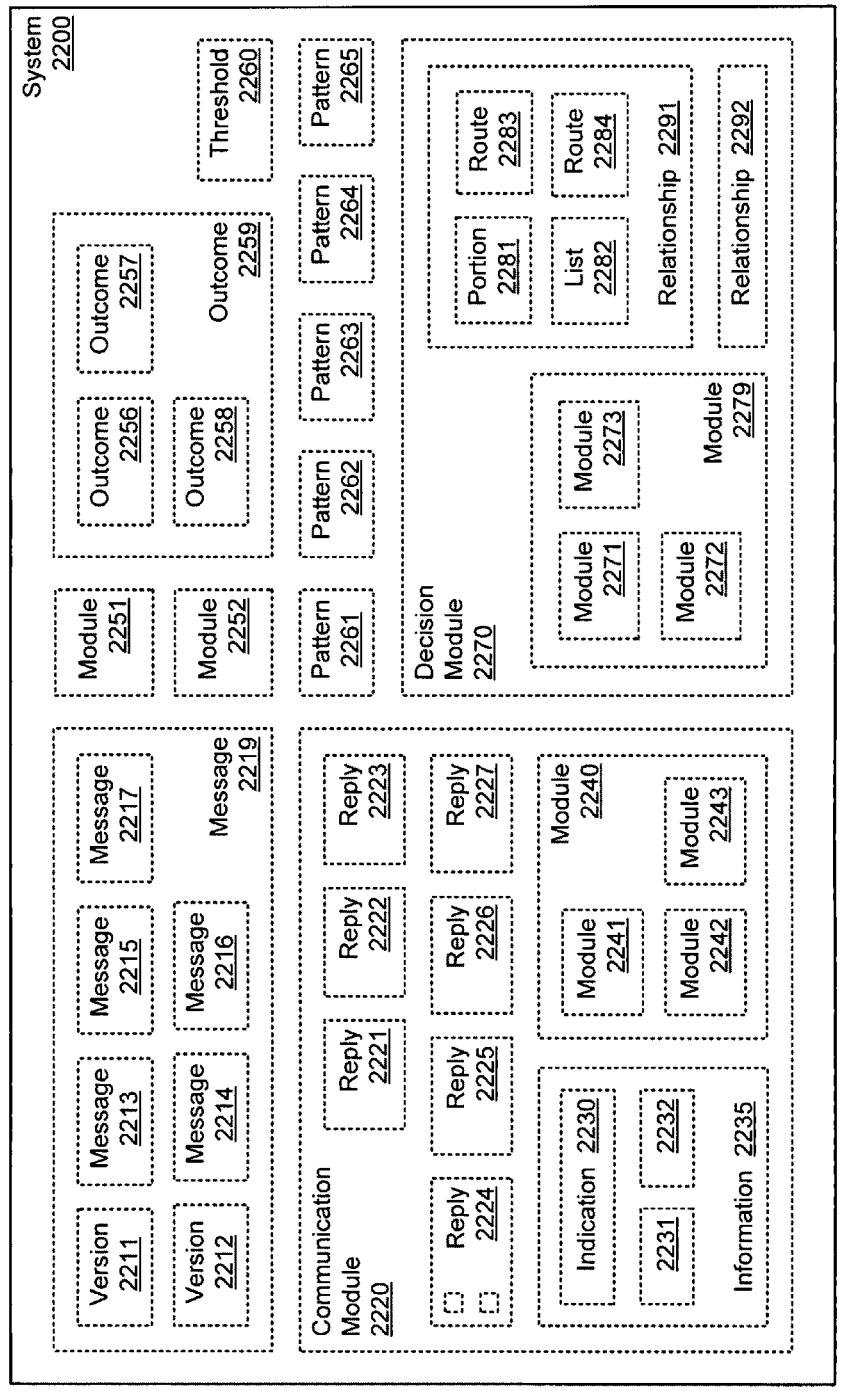

With reference now to FIG. 22, shown is another example of a system that may serve as a context for introducing one or more processes and/or devices described herein. System 2200 may comprise one or more instances of (respective versions 2211, 2212 or other) messages 2213, 2214, 2215, 2216, 2217, 2219. System 2200 may further comprise one or more instances of outcomes 2256, 2257, 2258, 2259; thresholds 2260; patterns 2261, 2262, 2263, 2264, 2265; or communication modules 2220, decision modules 2270, or other modules 2251, 2252. Communication module 2220 may comprise one or more replies 2221, 2222, 2223, 2224, 2225, 2226, 2227 or other information 2235, as well as one or more modules 2240, 2241, 2242, 2243. Information 2235 may, for example, comprise one or more instances of pattern instances 2231, 2232 or other indications 2230. Decision module 2270 may comprise one or more instances of nested or other modules 2271, 2272, 2273, 2279 or relationships 2291, 2292, which may include one or more distribution lists 2282, routes 2283, 2284, or other portions 2281 as described herein.

Figure 23:
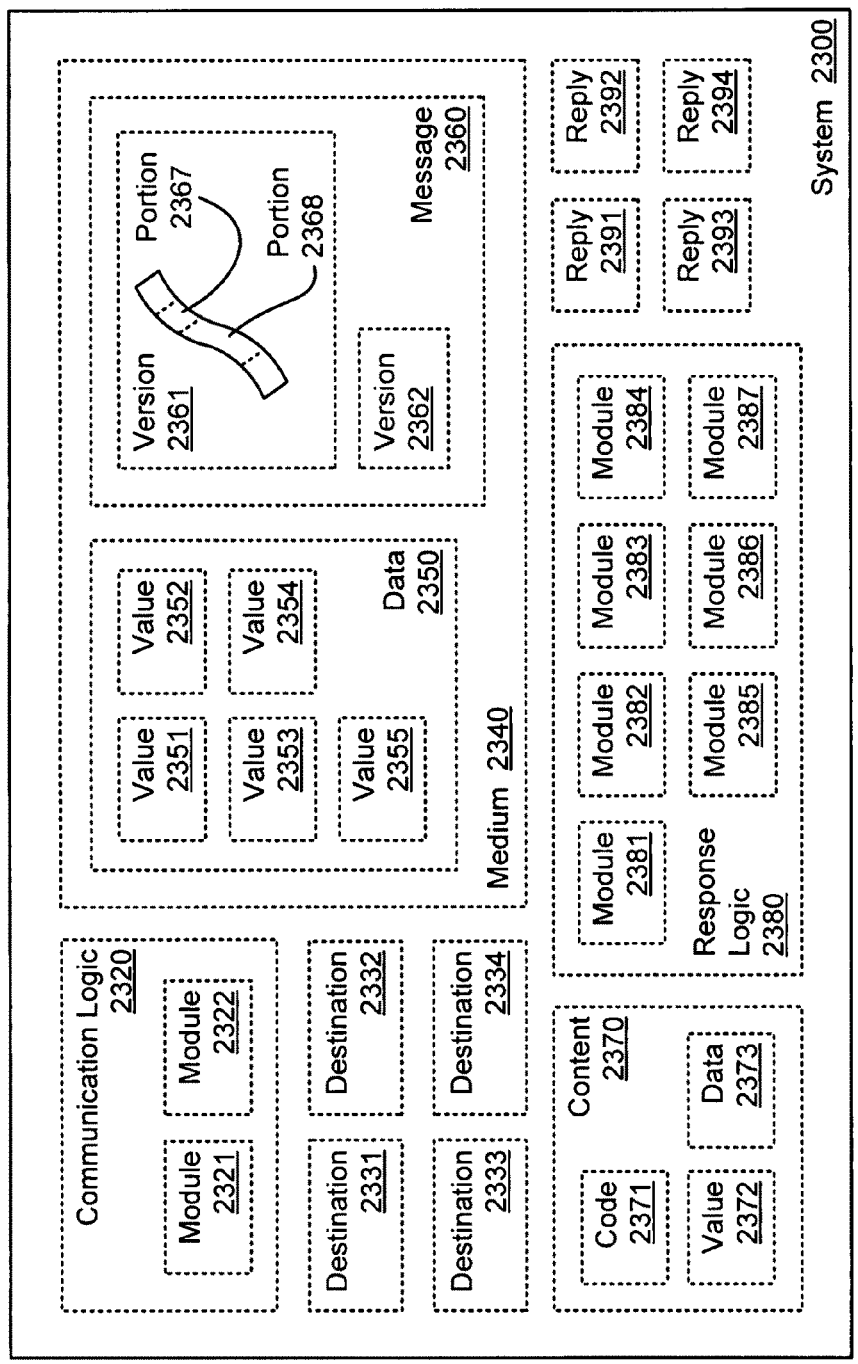

With reference now to FIG. 23, shown is another example of a system that may serve as a context for introducing one or more processes and/or devices described herein. System 2300 may include one or more instances of module 2321, 2322 of communication logic 2320; destinations 2331, 2332, 2333, 2334; media 2340; code 2371, values 2372, data 2373 or other content 2370; modules 2381, 2382, 2383, 2384, 2385, 2386, 2387 of response logic 2380; or replies 2391, 2392, 2393, 2394. Medium 2340, for example, may comprise one or more instances of values 2351, 2352, 2353, 2354, 2355 or other data 2350 as well as respective portions 2367, 2368 (e.g. of one or more versions 2361, 2362) of message 2360.

Some systems above illustrate elements provided without explicit operational illustrations, particularly with regard to FIGS. 4-23. For further information about such elements and related technology, the following patent applications filed on even date herewith are incorporated by reference to the extent not inconsistent herewith: application Ser. No. 11/897,988 ("Layering Destination-Dependent Content Handling Guidance"); application Ser. No. 11/899,016 ("Using Party Classifiability to Inform Message Versioning"); application Ser. No. 11/899,014 ("Message-Reply-Dependent Update Decisions"); and application Ser. No. 11/899,015 ("Layering Prospective Activity Information").

Figure 24:
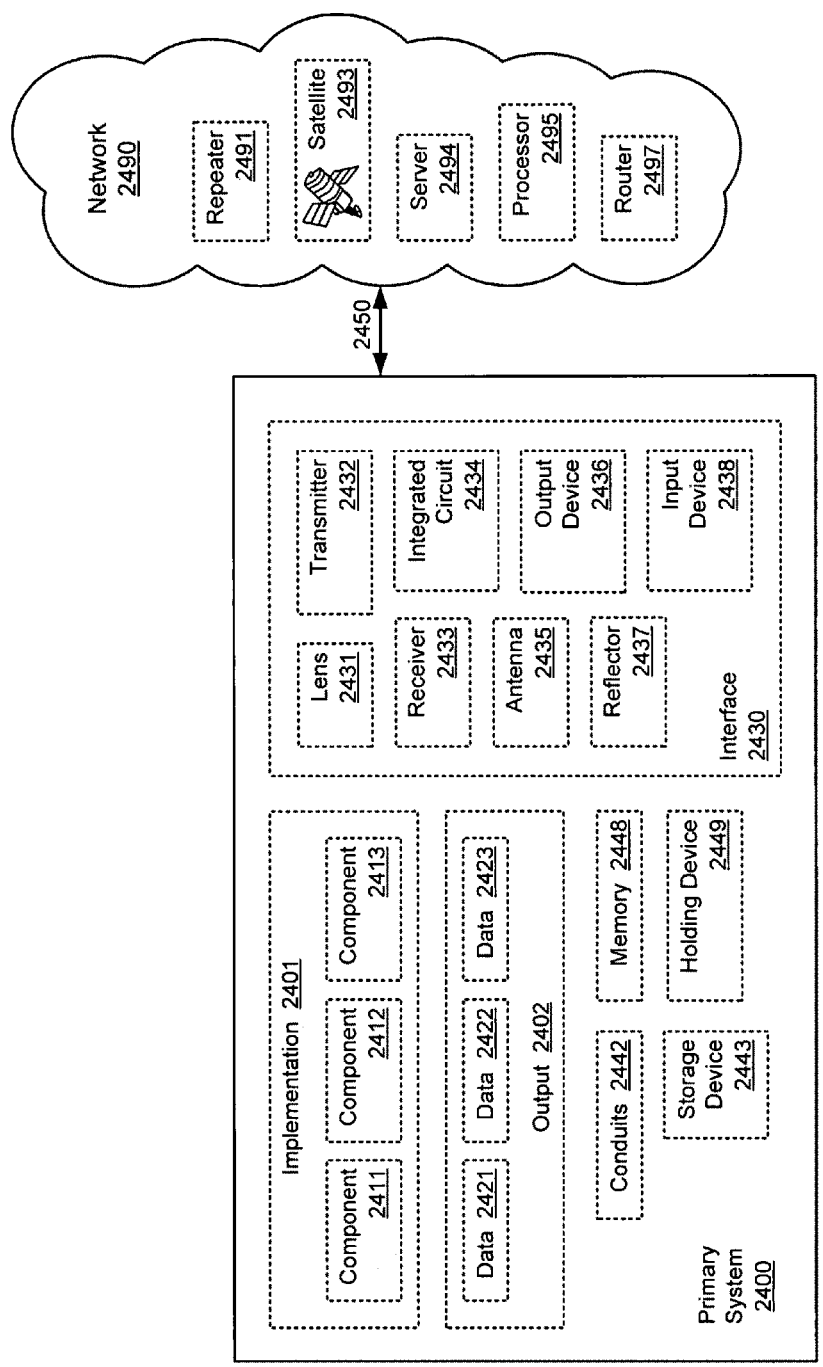

With reference now to FIG. 24, shown is an example of a system that may serve as a context for introducing one or more processes, systems or other articles described herein. Primary system 2400 may include one or more instances of implementations 2401 or outputs 2402 that may be held or transmitted by interfaces 2430, conduits 2442, storage devices 2443, memories 2448, or other holding devices 2449 or the like. In various embodiments as described herein, for example, one or more instances of implementation components 2411, 2412, 2413 or implementation output data 2421, 2422, 2423 may each be expressed in any aspect or combination of software, firmware, or hardware as signals, data, designs, logic, instructions, or the like. The interface(s) 2430 may include one or more instances of lenses 2431, transmitters 2432, receivers 2433, integrated circuits 2434, antennas 2435, output devices 2436, reflectors 2437, input devices 2438, or the like for handling data or communicating with local users or with network 2490 via linkage 2450, for example. Several variants of FIG. 24 are described below with reference to one or more instances of repeaters 2491, communication satellites 2493, servers 2494, processors 2495, routers 2497, or other elements of network 2490.

Those skilled in the art will recognize that some list items may also function as other list items. In the above-listed types of media, for example, some instances of interface(s) 2430 may include conduits 2442, or may also function as storage devices that are also holding devices 2449. One or more transmitters 2432 may likewise include input devices or bidirectional user interfaces, in many implementations of interface(s) 2430. Each such listed term should not be narrowed by any implication from other terms in the same list but should instead be understood in its broadest reasonable interpretation as understood by those skilled in the art.

Several variants described herein refer to device-detectable "implementations" such as one or more instances of computer-readable code, transistor or latch connectivity layouts or other geometric expressions of logical elements, firmware or software expressions of transfer functions implementing computational specifications, digital expressions of truth tables, or the like. Such instances can, in some implementations, include source code or other human-readable portions. Alternatively or additionally, functions of implementations described herein may constitute one or more device-detectable outputs such as decisions, manifestations, side effects, results, coding or other expressions, displayable images, data files, data associations, statistical correlations, streaming signals, intensity levels, frequencies or other measurable attributes, packets or other encoded expressions, or the like from invoking or monitoring the implementation as described herein.

Referring again to FIG. 2, flow 200 may be performed by one or more instances of server 2494 remote from primary system 2400, for example, but operable to cause output device(s) 2436 to receive and present results via linkage 2450. Alternatively or additionally, device-detectable data 2422 may be borne by one or more instances of signal-bearing conduits 2442, holding devices 2449, integrated circuits 2434, or the like as described herein. Such data may optionally be configured for transmission by a semiconductor chip or other embodiment of integrated circuit 2434 that contains or is otherwise operatively coupled with antenna 2435 (in a radio-frequency identification tag, for example).

In some variants, some instances of flow 200 may be implemented entirely within primary system 2400, optionally configured as a stand-alone system. Operation 250 may be implemented by configuring component 2411 as logic for causing one or more destination-dependent criteria to be applied at least to a data object, for example. This may be accomplished by including special-purpose instruction sequences or special-purpose-circuit designs for this function, for example, in optical or other known circuit fabrication operations, in programming by various known voltage modulation techniques, or otherwise as described herein or known by those skilled in the art. Output data 2421 from such a component in primary system 2400 or network 2490 may be recorded by writing to or otherwise configuring available portions of storage device(s) 2443.

Alternatively or additionally, such specific output data may be transmitted by configuring transistors, relays, or other drivers or conduits 2442 of primary system 2400 to transfer it to component 2412, for example. Component 2412 may perform operation 280 via implementation as logic for indicating a decision whether to transmit the data object to a destination partly based on a default value and partly based on one or more results of the one or more destination-dependent criteria being applied at least to the data object, for example. Implementation output data 2422 from such a component in primary system 2400 or network 2490 may be recorded into available portions of storage device(s) 2443 or sent to component 2413, for example. Output 2402 from flow 200 may likewise include other data 2423 as described herein. Each portion of implementation 2401 may likewise include one or more instances of software, hardware, or the like implementing logic that may be expressed in several respective forms as described herein or otherwise understood by those skilled in the art.

In some embodiments, output device 2436 may indicate an occurrence of flow 200 concisely as a decision, an evaluation, an effect, a hypothesis, a probability, a notification, or some other useful technical result. For example, such "indicating" may comprise such modes as showing, signifying, acknowledging, updating, explaining, associating, or the like in relation to any past or ongoing performance of such actions upon the common item(s) as recited. Such indicating may also provide one or more specifics about the occurrence: the parties or device(s) involved, a description of the method or performance modes used, any sequencing or other temporal aspects involved, indications of resources used, location(s) of the occurrence, implementation version indications or other update-indicative information, or any other such contextual information that may be worthwhile to provide at potential output destinations.

Concise indication may occur, for example, in a context in which at least some items of data 2421-2423 do not matter, or in which a recipient may understand or access portions of data 2421-2423 without receiving a preemptive explanation of how it was obtained. By distilling at least some output 2402 at an "upstream" stage (which may comprise integrated circuit 2434, for example, in some arrangements), downstream-stage media (such as other elements of network 2490, for example) may indicate occurrences of various methods described herein more effectively. Variants of flow 200, for example, may be enhanced by distillations described herein, especially in bandwidth-limited transmissions, security-encoded messages, long-distance transmissions, complex images, or compositions of matter bearing other such expressions.

In some variants, a local implementation comprises a service operable for accessing a remote system running a remote implementation. In some embodiments, such "accessing" may include one or more instances of establishing or permitting an interaction between the server and a local embodiment such that the local embodiment causes or uses another implementation or output of one or more herein-described functions at the server. Functioning as a web browser, remote terminal session, or other remote activation or control device, for example, interface(s) 2430 may interact with one or more primary system users via input and output devices 2436, 2438 so as to manifest an implementation in primary system 2400 via an interaction with server 2494, for example, running a secondary implementation of flow 200. Such local implementations may comprise a visual display supporting a local internet service to the remote server, for example. Such a remote server may control or otherwise enable one or more instances of hardware or software operating the secondary implementation outside a system, network, or physical proximity of primary system 2400. For a building implementing primary system 2400, for example, "remote" devices may include those in other countries, in orbit, or in adjacent buildings. In some embodiments, "running an implementation" may include invoking one or more instances of software, hardware, firmware, or the like atypically constituted or adapted to facilitate methods or functions as described herein. For example, primary system 2400 running an implementation of flow 200 may be a remote activation of a special-purpose computer program resident on server 2494 via an internet browser session interaction through linkage 2450, mediated by input device 2438 and output device 2436.

In some variants, some or all of components 2411-2413 may be borne in various data-handling elements—e.g., in one or more instances of storage devices 2443, in memories 2448 or volatile media, passing through linkage 2450 with network 2490 or other conduits 2442, in one or more registers or data-holding devices 2449, or the like. For example, such processing or configuration can occur in response to user data or the like received at input device 2438 or may be presented at output device 2436. Instances of input devices 2438 may (optionally) include one or more instances of cameras or other optical devices, hand-held systems or other portable systems, keypads, sensors, or the like as described herein. Output device(s) 2436 may likewise include one or more instances of image projection modules, touch screens, wrist-wearable systems or the like adapted to be worn while in use, headphones and speakers, eyewear, liquid crystal displays (LCDs), actuators, lasers, organic or other light-emitting diodes, phosphorescent elements, portions of (hybrid) input devices 2438, or the like.

A device-detectable implementation of variants described herein with reference to flow 200 for example, may be divided into several components 2411-2413 carried by one or more instances of active modules such as signal repeaters 2491, communication satellites 2493, servers 2494, processors 2495, routers 2497, or the like. For example, in some embodiments, component 2412 may be borne by an "upstream" module (e.g., repeater 2491 or the like) while or after component 2411 is borne in a "downstream" module (e.g., another instance of repeater 2491, communication satellite 2493, server 2494, or the like). Such downstream modules may "accept" such bits or other portions of implementation 2401 sequentially, for example, such as by amplifying, relaying, storing, checking, or otherwise processing what was received actively. Sensors and other "upstream" modules may likewise "accept" raw data, such as by measuring physical phenomena or accessing one or more databases.

In some embodiments, a medium bearing data (or other such event) may be "caused" (directly or indirectly) by one or more instances of prior or contemporaneous measurements, decisions, transitions, circumstances, or other causal determinants. Any such event may likewise depend upon one or more other prior, contemporaneous, or potential determinants, in various implementations as taught herein. In other words, such events can occur "in response" to both preparatory (earlier) events and triggering (contemporaneous) events in some contexts. Output 2402 may result from more than one component of implementations 2401 or more than one operation of flow 200, for example.

In some embodiments, such integrated circuits 2434 may comprise transistors, capacitors, amplifiers, latches, converters, or the like on a common substrate of a semiconductor material, operable to perform computational tasks or other transformations. An integrated circuit may be application-specific ("ASIC") in that it is designed for a particular use rather than for general purpose use. An integrated circuit may likewise include one or more instances of memory circuits, processors, field-programmable gate arrays (FPGA's), antennas, or other components, and may be referred to as a system-on-a-chip ("SoC").

In some embodiments, one or more instances of integrated circuits or other processors may be configured to perform auditory pattern recognition. In FIG. 24, for example, instances of the one or more input devices 2438 may include a microphone or the like operable to provide auditory samples in data 2421-2423. Some form or portion of such output may be provided remotely, for example, to one or more instances of neural networks or other configurations of remote processors 2495 operable to perform automatic or supervised speech recognition, selective auditory data retention or transmission, or other auditory pattern recognition, upon the samples. Alternatively or additionally such sound-related data may include annotative information relating thereto such as a capture time or other temporal indications, capture location or other source information, language or other content indications, decibels or other measured quantities, pointers to related data items or other associative indications, or other data aggregations or distillations as described herein.

In some embodiments, one or more instances of integrated circuits or other processors may be configured for optical image pattern recognition. In FIG. 24, for example, instances of lenses 2431 or other input devices 2438 may include optical sensors or the like operable to provide one or more of geometric, hue, or optical intensity information in data 2421-2423. Some form or portion of such output may be provided locally, for example, to one or more instances of optical character recognition software, pattern recognition processing resources, or other configurations of integrated circuits 2434 operable to perform automatic or supervised image recognition, selective optical data retention or transmission, or the like. Alternatively or additionally such image-related data may include annotative information relating thereto such as a capture time or other temporal indications, capture location or other source information, language or other content indications, pointers to related data items or other associative indications, or other data aggregations or distillations as described herein.

In some embodiments, one or more instances of integrated circuits or other processors may be configured to perform linguistic pattern recognition. In FIG. 24, for example, instances of input devices 2438 may include keys, pointing devices, microphones, sensors, reference data, or the like operable to provide spoken, written, or other symbolic expressions in data 2421-2423. Some form or portion of such output may be provided locally, for example, to one or more instances of translation utilities, compilers, or other configurations of integrated circuits 2434 operable to perform automatic or supervised programming or other language recognition, selective linguistic data retention or transmission, or the like. Alternatively or additionally such language-related data may include annotative information relating thereto such as a capture time or other temporal indications, capture location or other source information, language or other content indications, pointers to related data items or other associative indications, or other data classifications, aggregations, or distillations as described herein.

In some embodiments, one or more antennas 2435 or receivers 2433 may include a device that is the receiving end of a communication channel as described herein. For example, such a receiver may gather a signal from a dedicated conduit or from the environment for subsequent processing and/or retransmission. As a further example, such antennas or other receivers may include one or more instances of wireless antennas, radio antennas, satellite antennas, broadband receivers, digital subscriber line (DSL) receivers, modem receivers, transceivers, or configurations of two or more such devices for data reception as described herein or otherwise known.

In one variant, two or more respective portions of output data 2421-2423 may be sent from server 2494 through respective channels at various times, one portion passing through repeater 2491 and another through router 2497. Such channels may each bear a respective portion of a data aggregation or extraction, a publication, a comparative analysis or decision, a record selection, digital subscriber content, statistics or other research information, a resource status or potential allocation, an evaluation, an opportunity indication, a test or computational result, or some other output 2402 of possible interest. Such distributed media may be implemented as an expedient or efficient mode of bearing such portions of output data to a common destination such as interface 2430 or holding device 2449. Alternatively or additionally, some such data may be transported by moving a medium (carried on storage device 2443, for example) so that only a small portion (a purchase or other access authorization, for example, or a contingent or supplemental module) is transferred via linkage 2450.

In some embodiments, one or more instances of signal repeaters 2491 may include a device or functional implementation that receives a signal and transmits some or all of the signal with one or more of an altered strength or frequency, or with other modulation (e.g., an optical-electrical-optical amplification device, a radio signal amplifier or format converter, a wireless signal amplifier, or the like). A repeater may convert analog to digital signals or digital to analog signals, for example, or perform no conversion. Alternatively or additionally, a repeater may reshape, retime or otherwise reorder an output for transmission. A repeater may likewise introduce a frequency offset to an output signal such that the received and transmitted frequencies are different. A repeater also may include one or more instances of a relay, a translator, a transponder, a transceiver, an active hub, a booster, a noise-attenuating filter, or the like.

In some embodiments, such communication satellite(s) 2493 may be configured to facilitate telecommunications while in a geosynchronous orbit, a Molniya orbit, a low earth orbit, or the like. Alternatively or additionally, a communication satellite may receive or transmit, for example, telephony signals, television signals, radio signals, broadband telecommunications signals, or the like.

Figure 26:
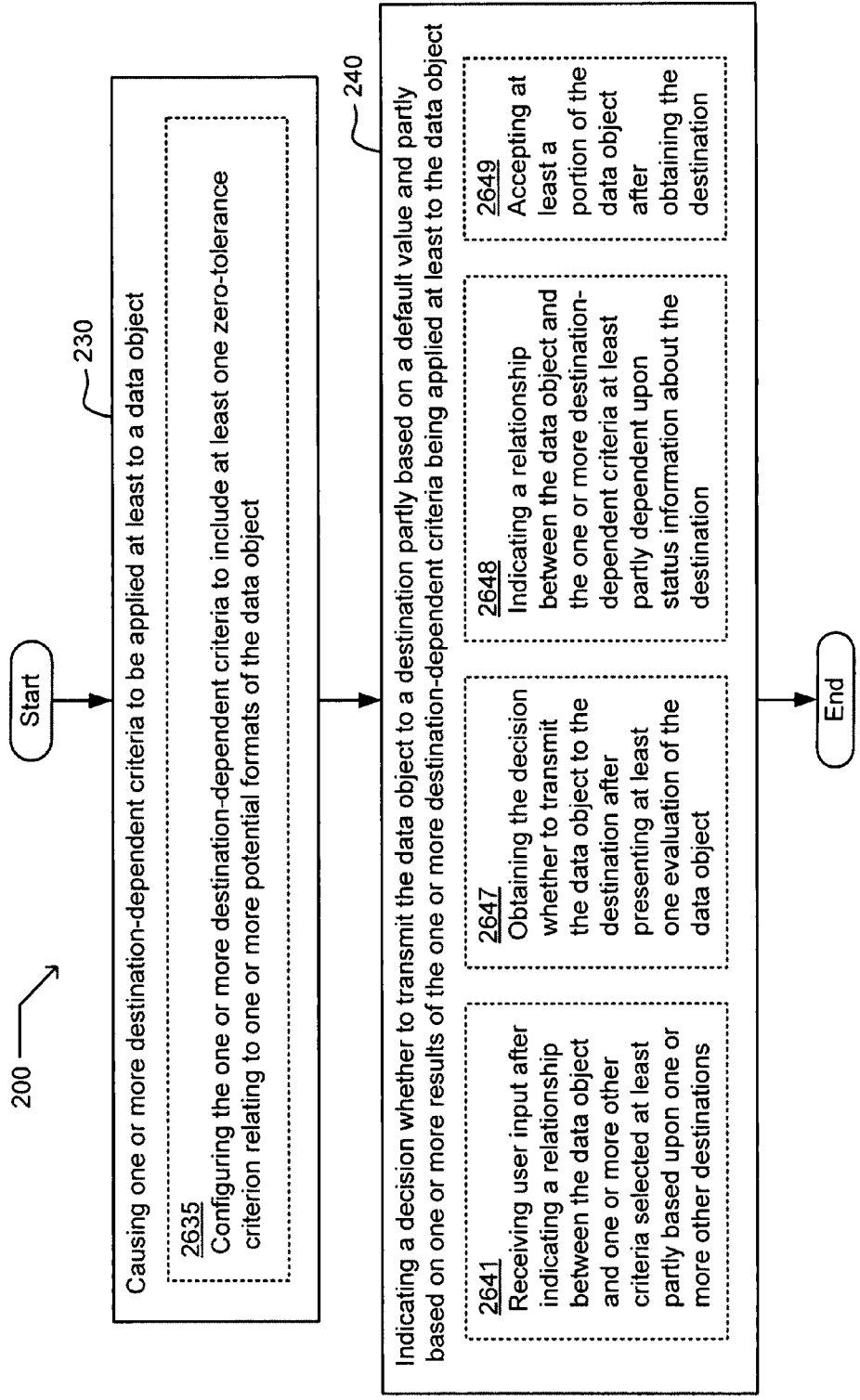
FIGS. 26-28 depict variants of the flow of FIG. 2.
Figure 27:
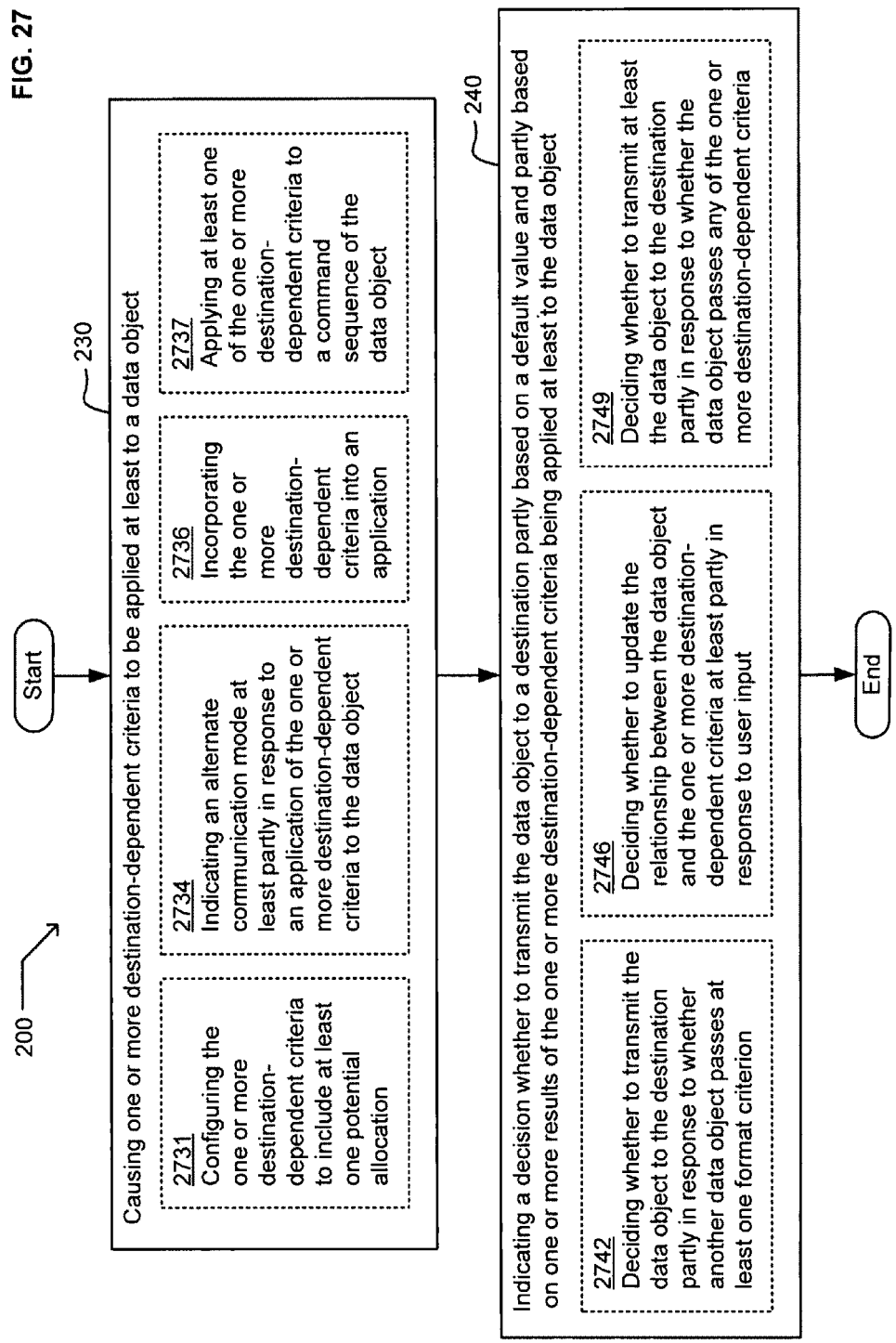

In some variants, processor 2495 or any components 2411-2413 of implementation 2401 may (optionally) be configured to perform flow variants as described herein with reference to FIGS. 26-27. An occurrence of such a variant may be expressed as a computation, a transition, or as one or more other items of data 2421-2423 described herein. Such output 2402 may be generated, for example, by depicted components of primary system 2400 or network 2490 including one or more features as described herein.

Figure 25:
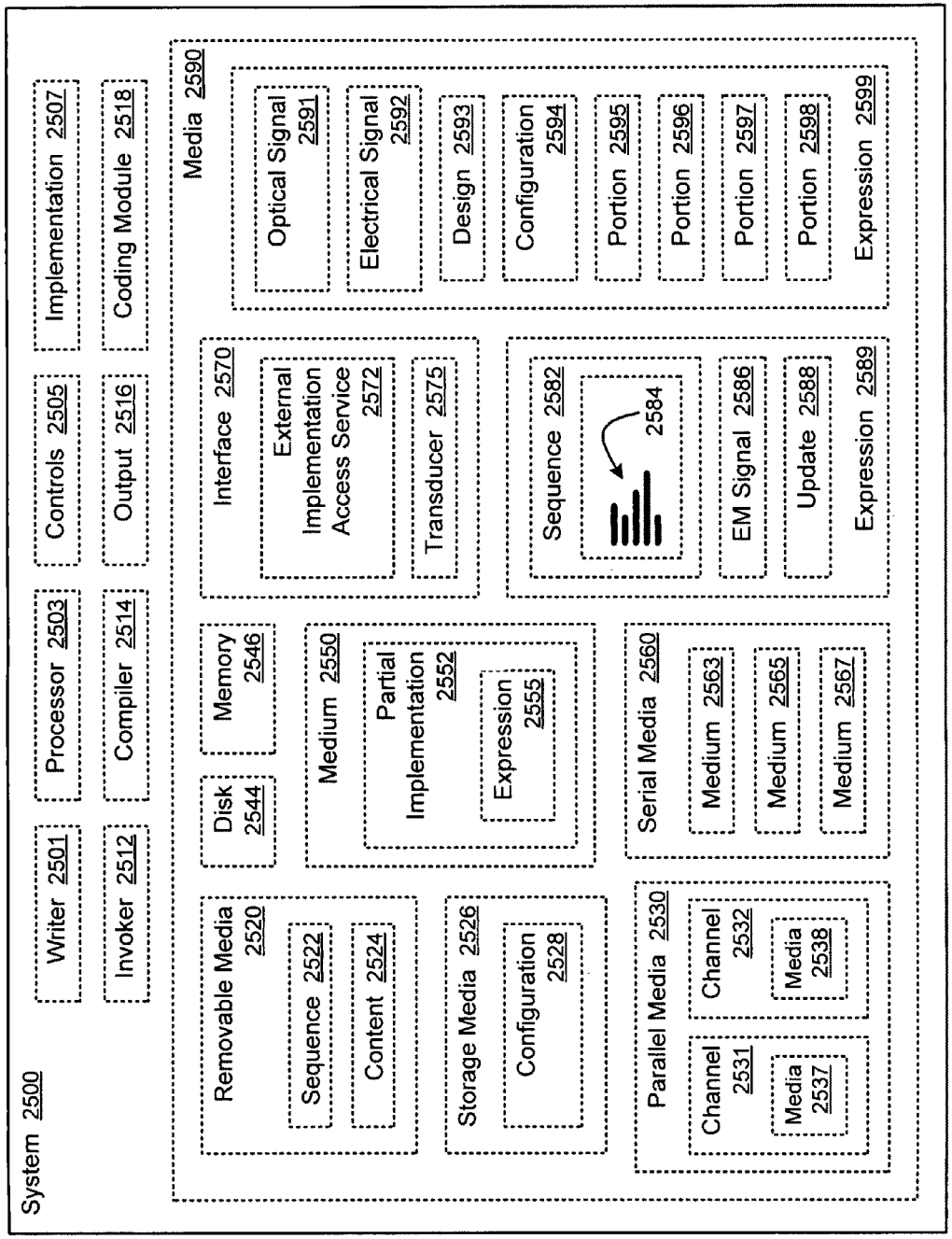

With reference now to FIG. 25, shown is an example of another system that may serve as a context for introducing one or more processes, systems or other articles described herein. As shown system 2500 comprises one or more instances of writers 2501, processors 2503, controls 2505, software or other implementations 2507, invokers 2512, compilers 2514, outputs 2516, coding modules 2518, or the like with one or more media 2590 bearing expressions or outputs thereof. In some embodiments, such media may include distributed media bearing a divided or otherwise distributed implementation or output. For example, in some embodiments, such media may include two or more physically distinct solid-state memories, two or more transmission media, a combination of such transmission media with one or more data-holding media configured as a data source or destination, or the like.

In some embodiments, transmission media may be "configured" to bear an output or implementation (a) by causing a channel in a medium to convey a portion thereof or (b) by constituting, adapting, addressing, or otherwise linking to such media in some other mode that depends upon one or more atypical traits of the partial or whole output or implementation. Data-holding elements of media may likewise be "configured" to bear an output or implementation portion (a) by holding the portion in a storage or memory location or (b) by constituting, adapting, addressing, or otherwise linking to such media in some other mode that depends upon one or more atypical traits of the partial or whole output or implementation. Such atypical traits may include a name, address, portion identifier, functional description, or the like sufficient to distinguish the output, implementation, or portion from a generic object.

In some embodiments described herein, "logic" and similar implementations may include software or other control structures operable to guide device operation. Electronic circuitry, for example, may manifest one or more paths of electrical current constructed and arranged to implement various logic functions as described herein. In some embodiments, one or more media are "configured to bear" a device-detectable implementation if such media hold or transmit a special-purpose device instruction set operable to perform a novel method as described herein. Alternatively or additionally, in some variants, an implementation may include special-purpose hardware or firmware components or general-purpose components executing or otherwise invoking special-purpose components. Specifications or other implementations may be transmitted by one or more instances of transmission media as described herein, optionally by packet transmission or otherwise by passing through distributed media at various times.

In some embodiments, one or more of the coding modules 2518 may be configured with circuitry for applying, imposing, or otherwise using a syntactic or other encoding constraint in forming, extracting, or otherwise handling respective portions of the device-detectable implementation or output. In encoding a software module or other message content, for example, compiler 2514 or coding module 2518 may implement one or more such constraints pursuant to public key or other encryption, applying error correction modes, certifying or otherwise annotating the message content, or implementing other security practices described herein or known by those skilled in the art. Alternatively or additionally, another instance of coding module 2518 may be configured to receive data (via receiver 2433, e.g.) and decode or otherwise distill the received data using one or more such encoding constraints. Compiler 2514 may, in some variants, convert one or more of components 2411-2413 from a corresponding source code form before the component(s) are transmitted across linkage 2450.

System 2500 may be implemented, for example, as one or more instances of stand-alone workstations, servers, vehicles, portable devices, removable media 2520, as components of primary system 2400 or network 2490 (of FIG. 24), or the like. Alternatively or additionally, media 2590 may include one or more instances of signal repeaters 2491, communication satellites 2493, servers 2494, processors 2495, routers 2497, portions of primary system 2400 as shown, or the like.

Media 2590 may include one or more instances of removable media 2520, tapes or other storage media 2526; parallel (transmission) media 2530; disks 2544; memories 2546; other data-handling media 2550; serial media 2560; interfaces 2570; or expressions 2589, 2599. Removable media 2520 may bear one or more device-detectable instances of instruction sequences 2522 or other implementations of flow 200, for example. Alternatively or additionally, in some embodiments, removable media 2520 may bear alphanumeric data, audio data, image data, structure-descriptive values, or other content 2524 in a context that indicates an occurrence of one or more flows 200. In some circumstances, transmission media may bear respective portions of implementations as described herein serially or otherwise non-simultaneously. In some variants in which two portions 2597, 2598 constitute a partial or complete software implementation or product of a novel method described herein, portion 2597 may follow portion 2598 successively through serial media 2563, 2565, 2567 (with transmission of portion 2597 partly overlapping in time with transmission of portion 2598 passing through medium 2563, for example). As shown, parallel channels 2531, 2532 are respectively implemented at least in media 2537, 2538 of a bus or otherwise effectively in isolation from one another. In some embodiments, a bus may be a system of two or more signal paths—not unified by a nominally ideal conduction path between them—configured to transfer data between or among internal or external computer components. For example, one data channel may include a power line (e.g., as medium 2565) operable for transmitting content of the device-detectable implementation as described herein between two taps or other terminals (e.g., as media 2563, 2567 comprising a source and destination). In another such configuration, one or more media 2537 of channel 2531 may bear portion 2597 before, while or after one or more other media 2538 of parallel channel 2532 bear portion 2598. In some embodiments, such a process can occur "while" another process occurs if they coincide or otherwise overlap in time substantially (by several clock cycles, for example). In some embodiments, such a process can occur "after" an event if any instance of the process begins after any instance of the event concludes, irrespective of other instances overlapping or the like.

In a variant in which a channel through medium 2550 bears an expression 2555 partially implementing an operational flow described herein, the remainder of the implementation may be borne (earlier or later, in some instances) by the same medium 2550 or by one or more other portions of media 2590 as shown. In some embodiments, moreover, one or more controls 2505 may configure at least some media 2590 by triggering transmissions as described above or transmissions of one or more outputs 2516 thereof.

In some embodiments, the one or more "physical media" may include one or more instances of conduits, layers, networks, static storage compositions, or other homogenous or polymorphic structures or compositions suitable for bearing signals. In some embodiments, such a "communication channel" in physical media may include a signal path between two transceivers or the like. A "remainder" of the media may include other signal paths intersecting the communication channel or other media as described herein. In some variants, another exemplary system comprises one or more physical media 2590 constructed and arranged to receive a special-purpose sequence 2582 of two or more device-detectable instructions 2584 for implementing a flow as described herein or to receive an output of executing such instructions. Physical media 2590 may (optionally) be configured by writer 2501, transmitter 2432, or the like.

In some embodiments, such a "special-purpose" instruction sequence may include any ordered set of two or more instructions directly or indirectly operable for causing multi-purpose hardware or software to perform one or more methods or functions described herein: source code, macro code, controller or other machine code, or the like. In some embodiments, an implementation may include one or more instances of special-purpose sequences 2582 of instructions 2584, patches or other implementation updates 2588, configurations 2594, special-purpose circuit designs 2593, or the like. Such "designs," for example, may include one or more instances of a mask set definition, a connectivity layout of one or more gates or other logic elements, an application-specific integrated circuit (ASIC), a multivariate transfer function, or the like.

Segments of such implementations or their outputs may (optionally) be manifested one or more information-bearing static attributes comprising the device-detectable implementation. Such attributes may, in some embodiments, comprise a concentration or other layout attribute of magnetic or charge-bearing elements, visible or other optical elements, or other particles in or on a liquid crystal display or other solid-containing medium. Solid state data storage modules or other such static media may further comprise one or more instances of laser markings, barcodes, human-readable identifiers, or the like, such as to indicate one or more attributes of the device-detectable implementation. Alternatively or additionally such solid state or other solid-containing media may include one or more instances of semiconductor devices or other circuitry, magnetic or optical digital storage disks, dynamic or flash random access memories (RAMs), or the like. Magnetoresistive RAMs may bear larger implementation or output portions or aggregations safely and efficiently, moreover, and without any need for motors or the like for positioning the storage medium.

Segments of such implementations or their outputs may likewise be manifested in electromagnetic signals 2586, laser or other optical signals 2591, electrical signals 2592, or the like. In some embodiments, for example, such electrical or electromagnetic signals may include one or more instances of static or variable voltage levels or other analog values, radio frequency transmissions or the like. In some embodiments, the above-mentioned "optical" signals may likewise include one or more instances of time- or position-dependent, device-detectable variations in hue, intensity, or the like. Alternatively or additionally, portions of such implementations or their outputs may manifest as one or more instances of magnetic, magneto-optic, electrostatic, or other physical configurations 2528 of nonvolatile storage media 2526 or as external implementation access services 2572.

In some embodiments, physical media may be configured by being "operated to bear" or "operated upon to bear" a signal. For example, they may include physical media that generate, transmit, conduct, receive, or otherwise convey or store a device-detectable implementation or output as described herein. Such conveyance or storing of a device-detectable implementation or output may be carried out in a distributed fashion at various times or locations, or such conveyance or storing of a device-detectable implementation or output may be done at one location or time. As discussed above, such physical media "operated to bear" or "operated upon to bear" may include physical media that are atypically constituted or adapted to facilitate methods or functions as described herein.

In some configurations, one or more output devices 2436 may present one or more results of indicating a decision whether to transmit the data object to a destination partly based on a default value and partly based on one or more results of the one or more destination-dependent criteria being applied at least to the data object in response to interface(s) 2430 receiving one or more invocations or outputs of an implementation of this function via linkage 2450. Such an "invocation" may, in some embodiments, comprise one or more instances of requests, hardware or software activations, user actions, or other determinants as described herein. Alternatively or additionally, in some embodiments, one or more input devices 2438 may later receive one or more invocations. In contexts like these, processor 2495 or other components of network 2490 may likewise constitute a secondary implementation having access to a primary instance of interface 2430 implementing methods like flow 200 as described herein.

Serial media 2560 comprises a communication channel of two or more media configured to bear a transition or other output increment successively. In some embodiments, for example, serial media 2560 may include a communication line or wireless medium (e.g., as medium 2565) between two signal-bearing conduits (e.g., terminals or antennas as media 2563, 2567). Alternatively or additionally, one or more lenses 2431 or other light-transmissive media may comprise a serial medium between a light-transmissive medium and a sensor or other light receiver 2433 or transmitter 2432. In some embodiments, such "light-transmissive" media may (optionally) comprise metamaterials or other media operable for bearing one or more instances of microwave signals, radio wave signals, visible light signals, or the like.

In some embodiments, such a lens may be an optical element that causes light to converge or diverge along one or more signal paths. Such a light-transmissive medium may include a signal-bearing conduit, glass, or other physical medium through which an optical signal may travel. More generally, a signal-bearing conduit may be an electrical wire, a telecommunications cable, a fiber-optic cable, or a mechanical coupling or other path for the conveyance of analog or digital signals.

Alternatively or additionally, system 2500 may likewise include one or more instances of media for handling implementations or their outputs: satellite dishes or other reflectors 2437, antennas 2435 or other transducers 2575, arrays of two or more such devices configured to detect or redirect one or more incoming signals, caching elements or other data-holding elements (e.g., disks 2544, memories 2546, or other media 2590), integrated circuits 2434, or the like. In some variants, one or more media may be "configured" to bear a device-detectable implementation as described herein by being constituted or otherwise specially adapted for that type of implementation at one or more respective times, overlapping or otherwise. Such "signal-bearing" media may include those configured to bear one or more such signals at various times as well as those currently bearing them.

In some embodiments, such caching elements may comprise a circuit or device configured to store data that duplicates original values stored elsewhere or computed earlier in time. For example, a caching element may be a temporary storage area where frequently-accessed data may be held for rapid access by a computing system. A caching element likewise may be machine-readable memory (including computer-readable media such as random access memory or data disks). In some embodiments, such caching elements may likewise comprise a latching circuit or device configured to store data that has been modified from original values associated with the data (held elsewhere or computed earlier in time, for example).

In one variant, respective portions 2595, 2596 of an expression 2599 of implementation 2507 may be sent through respective channels at various times. Invoker 2512 may request or otherwise attempt to activate a computer program or streaming media overseas via a telephone cable or other channel 2531. Meanwhile, output 2516 may attempt to trigger a session or other partial implementation 2552, success in which may be indicated by receiving expression 2555 into a visual display or other medium 2550. Such a program or other implementation may be made complete, for example, once both of these attempts succeed.

In some embodiments, transducer(s) 2575 may comprise one or more devices that convert a signal from one form to another form. For example, a transducer may be a cathode ray tube that transforms electrical signals into visual signals. Another example of a transducer comprises a microelectromechanical systems ("MEMS") device, which may be configured to convert mechanical signals into electrical signals (or vice versa).

With reference now to FIG. 26, there are shown several variants of the flow 200 of FIG. 2. Operation 230—causing one or more destination-dependent criteria to be applied at least to a data object—may include (one or more instances of) operation 2635. In some embodiments, various preparatory or other optional aspects or variants of operation 230 may be performed by processors 1290, 1590; configuration circuitry 1020; evaluation circuitry 1110, 1380; and/or other data-handling circuitry 1440 described herein. Other instances of operation 230 may likewise be performed by invocation circuitry 1340 invoking a local or remote resource, such as by contacting such resources in one or more accessible networks 190, 390, 1190, 1210, 1400, 2490 as described herein. Operation 240—indicating a decision whether to transmit the data object to a destination partly based on a default value and partly based on one or more results of the one or more destination-dependent criteria being applied at least to the data object—may include one or more of the following operations: 2641, 2647, 2648, or 2649. In some embodiments, various preparatory or other optional aspects or variants of operation 240 may be performed by one or more instances of processors 1290, 1590; configuration circuitry 1140; interfaces 1170, 1280, 1310; decision circuitry 1360; and/or other signal-bearing components exemplified herein. Other instances of operation 240 may likewise be performed by invocation circuitry 1430 invoking a local or remote resource, such as by contacting such resources in one or more accessible networks as described herein.

Operation 2635 describes configuring the one or more destination-dependent criteria to include at least one zero-tolerance criterion relating to one or more potential formats of the data object (e.g. invocation circuitry 1340 invoking module 1341 for obtaining one or more forbidden or other determinant patterns 1405, 1406 in one or more instances of evaluation circuitry 1030, 1380). This can occur, for example, in a context in which module 1341 implements or otherwise activates search logic 1410 to count instances of one or more patterns 1405, 1406 to generate one or more determinants suitable for comparison with one or more corresponding values of thresholds 1372, 1386-1388, 1451-1455 of zero or one, for example. Alternatively or additionally, module 1341 may be configured for determining a most preferred format in response to one or more gradational evaluations assigned to one or more instances of a pattern 1406 that occur in the data object. In some embodiments, for example, such evaluations may estimate a quantity of time or other allocation for each of several formats and/or routes.

In light of teachings herein, numerous existing techniques may be applied for implementing zero-tolerance or other criteria relating to text and other content formats as described herein without undue experimentation. See, e.g., U.S. Pat. No. 7,110,664 ("Methods and apparatus for indexing and archiving encoded audio-video data"); U.S. Pat. No. 7,089,256 ("Universal data editor"); U.S. Pat. No. 6,938,196 ("Node processors for use in parity check decoders"); U.S. Pat. No. 6,910,028 ("Conflict-handling assimilator service for exchange of rules with merging"); U.S. Pat. No. 6,430,573 ("Sequence generation using a constraint satisfaction problem formulation"); U.S. Pat. No. 6,377,953 ("Database having an integrated transformation engine using pickeling and unpickeling of data"); U.S. Pat. No. 6,081,816 ("Method for placing text around polygons and other constraints"); U.S. Pat. No. 6,074,787 ("Method of making mask pattern utilizing auxiliary pattern forbidden region"). Those skilled in the art will also recognize how to apply numerous existing techniques for taking provisional, alternate, overlapping, or completion actions relating to such decisions as exemplified herein without undue experimentation, in light of these teachings. Module 1341 may be configured to log an identifier of the data object only in response to an indication that a data object passes one or more criteria, for example, or to implement the converse. Alternatively or additionally, such functionality may likewise depend upon one or more other determinants in substantially any desired combination: upon whether any such criteria are superseded or otherwise waived, upon how many noncompliant or otherwise burdensome data objects come from a specific user or system, upon whether one or more temporary transmission restrictions are in effect, upon other state or timing factors as described herein, or upon other determinants such as are known in the art. Such combinations may each be effectuated by comparative, arithmetic, conjunctive, or other operators relating each pairing of determinants described herein, for example.

Operation 2641 describes receiving user input after indicating a relationship between the data object and one or more other criteria selected at least partly based upon one or more other destinations (e.g. recording device 1325 receiving keyed or other input 1322 after one or more screens 1172 or speakers 1334 give a warning or other indication 1338 that data object 1323 cannot exceed size threshold 1372). This can occur, for example, in a context in which primary system 1100 implements system 1300, in which one or more intermediaries 1191 or destinations 1198 specify one or more thresholds 1372 or other criteria, and in which such thresholds or other criteria are applied and reported upon to user 1101 without interface 1170 transmitting the one or more data objects 1323 to such intermediaries 1191 or destinations 1198. Alternatively or additionally, such criteria may be used, for example, for influencing a sequence in which two or more data objects are transmitted. In some embodiments, for example, interface 1310 transmits one or more such indications 1338 to user 1101 before or while transmitting other (compliant) data objects to destination 1198.

In light of teachings herein, numerous existing techniques may be applied for selecting criteria conditionally or otherwise based upon the destination(s) as described herein without undue experimentation. See, e.g., U.S. Pat. No. 7,155,430 ("Method for providing data inquiry service and data inquiry service system"); U.S. Pat. No. 7,130,850 ("Rating and controlling access to emails"); U.S. Pat. No. 7,058,684 ("Device, method, and storage medium to block junk email"); U.S. Pat. No. 7,072,948 ("Information retrieval system using an internet multiplexer to focus user selection"); U.S. Pat. No. 6,990,633 ("Providing a network-based personalized newspaper with personalized content and layout"); U.S. Pat. No. 6,829,591 ("Router instruction processor for a digital document delivery system"); U.S. Pat. No. 6,513,027 ("Automated category discovery for a terminological knowledge base"); U.S. Pat. No. 6,266,664 ("Method for scanning, analyzing and rating digital information content"); U.S. Pat. No. 6,195,657 ("Software, method and apparatus for efficient categorization and recommendation of subjects according to multidimensional semantics"); U.S. Pat. No. 6,061,058 ("Method and apparatus for transferring data by type according to data types available"). Those skilled in the art will also recognize how to apply numerous existing techniques for taking provisional, alternate, overlapping, or completion actions relating to such decisions as exemplified herein without undue experimentation, in light of these teachings. Interface 1310 may be configured to provide a progress indication to user 1101 only in response to a confirmed indication that destination 1198 will not accept a type and/or size of data object 1323, for example, or to implement the converse. Alternatively or additionally, such functionality may likewise depend upon one or more other determinants in substantially any desired combination: upon whether intermediary 1191 or destination 1198 apparently enforces its stated preferences strictly (based on a pattern of behavior, for example), upon how many recipients of destination 1198 will find the data object 1323 acceptable, upon whether a composer is still online and apparently available, upon other state or timing factors as described herein, or upon other determinants such as are known in the art. Such combinations may each be effectuated by comparative, arithmetic, conjunctive, or other operators relating each pairing of determinants described herein, for example.

Operation 2647 describes obtaining the decision whether to transmit the data object to the destination after presenting at least one evaluation of the data object (e.g. input device 1180 accepting one or more transmission decisions 1116 from user 1101 after output device 1174 presents one or more indications 1176 from evaluation circuitry 1110 that content 1160 or some other data object is apparently suitable for destinations 1117, 1118). This can occur, for example, in a context in which evaluation circuitry 1110 has at least determined a respective level 1111, 1115 of relationship between the data object(s) and each criterion 1151, 1152 selected by or for one or more tentative destinations. Alternatively or additionally, evaluation circuitry 1110 may be configured to respond to input device 1180 by causing other evaluation circuitry 1030 to perform some or all of such determinations remotely. In some embodiments, however, evaluation circuitry 1110 may be configured to propose, recommend, or otherwise generate one or more instances of such transmission decisions.

Operation 2648 describes indicating a relationship between the data object and the one or more destination-dependent criteria at least partly dependent upon status information about the destination (e.g. configuration circuitry 1020 invoking module 1035 for implementing threshold 1058 or other portions 1054, 1056 of linkage 1040 in a manner that depends partly upon status information 1062 relating to destination 1049 and partly upon static configuration data 1067 relating to destination 1049). This can occur, for example, in a context in which there is some value X that is only assigned to portion 1056 if status information 1062 includes a set bit 1063 and if configuration data 1067 includes a set bit 1068. Alternatively or additionally, there may be some value Y that is only assigned to portion 1052 if some other binary functional combination of bits 1063, 1068 exists: OR, NOR, NAND, or the like. Alternatively or additionally, one or more other modules 1033 may permit configuration circuitry 108A to perform operation 1038 in a manner that causes one or more portions 1052-1056 of linkage 1040 to depend partly on status information 1062 relating to one or more intermediaries or other destinations.

In some contexts, threshold 1058 or other such rules could be updated as an asynchronous or real-time response to changes in such current status information 1062. Such rules may emulate a potential recipient's express preference, behavior pattern, or other aspect of a policy 1211 having a feature 1212 that may be expressed, for example, as a message of the form "while I am working on a _____ document or have my status set as _____, I will accept at most messages per hour." Alternatively or additionally, policy 1211 may include a feature 1213 expressible as "while I am _____, I will not accept any messages larger than _____." Alternatively or additionally, policy 1211 may implement a feature 1214 expressible as "while I am _____, I will not accept any messages larger than _____." Alternatively or additionally, policy 1211 may include a feature 1215 defining respective exceptions to one or more such restrictive features that apply to identified senders, content types, transmission modules, or other parameters 1217. In some configurations and contexts of policy 1211, for example, such rules may generate a predictive message of the form "It is likely that _____ will not read this message until after _____."

Operation 2649 describes accepting at least a portion of the data object after obtaining the destination (e.g. data-handling circuitry 1440 invoking module 1447 for receiving one or more text values 1494, commands 1495, or other event-indicative data 1497 relating to message body 1488 or delivery module 1489, even after data-handling circuitry 1440 receives the one or more destinations 1251 to be used for message 1486). This can occur, for example, in a context in which one or more destination 1251 identify portions of network 1210 or other destinations 1499 and in which system 1420 implements linkage module 1220 or other portions of system 1200. Alternatively or additionally, one or more such destinations 1251 may be included within content 1489 or invocation circuitry 1430.

In light of teachings herein, numerous existing techniques may be applied for receiving content in association with one or more destinations thereof as described herein without undue experimentation. See, e.g., U.S. Pat. No. 7,237,010 ("Method, system and computer program product for generating and processing a disposable email address"); U.S. Pat. No. 7,162,515 ("Expanded addressee sort/listing"); U.S. Pat. No. 7,117,210 ("System and method of distributing a file by email"); U.S. Pat. No. 7,103,154 ("Automatic transmission of voice-to-text converted voice message"); U.S. Pat. No. 7,076, 533 ("Method and system for monitoring e-mail and website behavior of an e-mail recipient"); U.S. Pat. No. 7,058,688 ("Multi-stage email interception method"); U.S. Pat. No. 7,020,688 ("Methods and systems for archiving and verification of electronic communications"); U.S. Pat. No. 6,895,426 ("Addresses as objects for email messages"); U.S. Pat. No. 6,813,507 ("Unified messaging system having short message service command processor"); U.S. Pat. No. 6,614,551 ("Email capable fax machine and methods for using the same"). Those skilled in the art will also recognize how to apply numerous existing techniques for taking provisional, alternate, overlapping, or completion actions relating to such decisions as exemplified herein without undue experimentation, in light of these teachings. Module 1447 may be configured to provide a default destination only in response to an indication that such destination may accept the text value(s) 1494, for example, or not to provide any default destinations. Alternatively or additionally, such functionality may likewise depend upon one or more other determinants in substantially any desired combination: upon whether a last-entered portion of the data object contains more than just a few words, upon what certifications are present with regard to any items attached to the data object, upon whether an identified destination is a secure system, upon other state or timing factors as described herein, or upon other determinants such as are known in the art. Such combinations may each be effectuated by comparative, arithmetic, conjunctive, or other operators relating each pairing of determinants described herein, for example.

With reference now to FIG. 27, there are shown several variants of the flow 200 of FIG. 2 or FIG. 26. Operation 230—causing one or more destination-dependent criteria to be applied at least to a data object—may include one or more of the following operations: 2731, 2734, 2736, or 2737. Operation 240—indicating a decision whether to transmit the data object to a destination partly based on a default value and partly based on one or more results of the one or more destination-dependent criteria being applied at least to the data object—may include one or more of the following operations: 2742, 2746, or 2749.

Operation 2731 describes configuring the one or more destination-dependent criteria to include at least one potential allocation (e.g. processor 1590 invoking configuration module 1552 for implementing one or more minimum or maximum thresholds 1505, 1504 in evaluation circuitry 1030). This can occur, for example, in a context in which (the) thresholds 1505, 1504 relate to allocations of computational, memory, human, or other resources 1562, any of which may relate to content 1548 later provided to evaluation circuitry 1030.

Operation 2734 describes indicating an alternate communication mode at least partly in response to an application of the one or more destination-dependent criteria to the data object (e.g. module selector 1032 invoking or otherwise designating module 1037 in response to evaluation circuitry 1030 indicating that some or all of content 1094 may be unsuitable for transmission by module 1036). This can occur, for example, in a context in which such a selection will directly or indirectly cause processor 1090 to use module 1037 for transmitting content 1094. Alternatively or additionally, content 1094 may be configured to include one or more segments of message 140; content 1229, 1239; code 1250; or similar data objects as described herein.

In light of teachings herein, numerous existing techniques may be applied for indicating a communication module conditionally or otherwise in response to criteria applied to text or other content as described herein without undue experimentation. See, e.g., U.S. Pat. No. 6,947,068 ("Videoconferencing method and system for connecting a host with a plurality of participants"); U.S. Pat. No. 7,006,827 ("Mobile-service switching center, base station controller, multicall communication module supporting terminal and method of changing number of calls in multicall communication module"); U.S. Pat. No. 6,785,341 ("Method and apparatus for processing data in a multiple-input multiple-output (MIMO) communication system utilizing channel state information"); U.S. Pat. No. 6,629,635 ("Information recording medium, information processing method, information processing apparatus, and program recording medium"); U.S. Pat. No. 6,570,850 ("System and method for regulating message flow in a digital data network"); U.S. Pat. No. 6,564,321 ("Systems and methods for storing, delivering, and managing messages"); U.S. Pat. No. 6,546,005 ("Active user registry"); U.S. Pat. No. 6,014,716 ("System for recognizing bidirectional communication over parallel data lines by further sending data transmission request and notification indicating reverse direction transmission is possible to second device"). Those skilled in the art will also recognize how to apply numerous existing techniques for taking provisional, alternate, overlapping, or completion actions relating to such decisions as exemplified herein without undue experimentation, in light of these teachings. Module selector 1032 may be configured to designate module 1037 only in response to an indication that module 1036 has failed, for example, or to implement the converse. Alternatively or additionally, such functionality may likewise depend upon one or more other determinants in substantially any desired combination: upon whether module 1036 has succeeded, upon which other modalities are currently available, upon whether one or more users 301, 1101 respond to an override query, upon other state or timing factors as described herein, or upon other determinants such as are known in the art. Such combinations may each be effectuated by comparative, arithmetic, conjunctive, or other operators relating each pairing of determinants described herein, for example.

Operation 2736 describes incorporating the one or more destination-dependent criteria into an application (e.g. invocation circuitry 1340 supplementing or replacing one or more computational criteria 1346 of an application with one or more criteria 1351, 1352). This can occur, for example, in a context in which function 1345 implements (at least) criterion 1346, in which function 1348 implements criterion 1349, and in which invocation circuitry 1340 is operable to invoke a compiler 1353 or logic 1343 for updating function 1345 or otherwise effectively replacing an instance of function 1345 with function 1348. Alternatively or additionally, a program variable or other parameters 1357 may exist that embody a component of criterion 1321 to be changed, in which case operation 2736 may be performed, in some contexts, merely by changing the value(s) of such parameters 1357.

In light of teachings herein, numerous existing techniques may be applied for incorporating criteria into a software or other application as described herein without undue experimentation. See, e.g., U.S. Pat. No. 7,212,807 ("Method, apparatus and software program for processing and/or evaluating MMS-related messages"); U.S. Pat. No. 7,181,694 ("Software customization objects for programming extensions associated with a computer system"); U.S. Pat. No. 7,110,890 ("Auto-analysis framework for sequence evaluation"); U.S. Pat. No. 7,062,508 ("Method and computer-based system for non-probabilistic hypothesis generation and verification"); U.S. Pat. No. 6,910,033 ("Method for storing Boolean functions to enable evaluation, modification, reuse, and delivery over a network"); U.S. Pat. No. 6,868,427 ("Managing customizable settings in computer systems"); U.S. Pat. No. 6,725,229 ("Configuration utility"); U.S. Pat. No. 6,526,258 ("Methods and systems for presentation and evaluation of constructed responses assessed by human evaluators"); U.S. Pat. No. 6,378,128 ("System and method for dynamically modifying an install-set"); U.S. Pat. No. 6,266,675 ("System and method for using a relational database to enable the dynamic configuration of an application program"); U.S. Pat. No. 6,237,141 ("Method and apparatus for dynamically optimizing byte-coded programs"). Those skilled in the art will also recognize how to apply numerous existing techniques for taking provisional, alternate, overlapping, or completion actions relating to such decisions as exemplified herein without undue experimentation, in light of these teachings. Processor 2503 may be configured to invoke compiler 2514 only in response to an indication that one or more destinations have requested or otherwise triggered a software modification, for example, in response to a frequent invocation of a sub-optimally implemented filter configuration. Alternatively or additionally, such functionality may likewise depend upon one or more other determinants in substantially any desired combination: upon whether a routine software update embodies the one or more criteria being incorporated, upon how many destinations or data objects call for such criteria in a period of time, upon whether an instance of system 2500 has enough free resources to apply the one or more criteria, upon other state or timing factors as described herein, or upon other determinants such as are known in the art. Such combinations may each be effectuated by comparative, arithmetic, conjunctive, or other operators relating each pairing of determinants described herein, for example.

Operation 2737 describes applying at least one of the one or more destination-dependent criteria to a command sequence of the data object (e.g. evaluation circuitry 1380 invoking one or more modules 1381 for requiring command sequence 1382 to generate output 1384 smaller than threshold 1386, faster than threshold 1387, or using less of some other resource than threshold 1388). This can occur, for example, in an emulation or other environment 1389 within which a failure of one or more of these requirements may be detected. Alternatively or additionally, evaluation circuitry 1380 may comprise a compiler or syntax checker operable for generating one or more evaluations of a command sequence that may be present in the data object.

Operation 2742 describes deciding whether to transmit the data object to the destination partly in response to whether another data object passes at least one format criterion (e.g. filter 1153 causing transmitter 1171 to transmit some or all of content 1160 to destination 1198 only if one or more content segments 1155-1157 comply with one or more criteria 1151, 1152 and when module 1150 is in a transmit-ready state 1158). This can occur, for example, in a context in which criterion 1151 forbids one or more version numbers, graphical content, unidentified symbols, italicization, or other elements of form or substance. Alternatively or additionally, criterion 1152 may require a specific font, an "abstract" section header, line or page numbering, or other elements of content. In some embodiments, however, filter 1153 may be configured to activate transmitter 1171 only if module 1150 is not in a disabled state 1158. Alternatively or additionally, one or more filters 1153, 1139 may be configured to perform other functions as described herein.

Operation 2746 describes deciding whether to update the relationship between the data object and the one or more destination-dependent criteria at least partly in response to user input (e.g. update circuitry 1301 responding to local or remote input 1321 by changing one or both of a criterion and content that are mutually related). This can occur, for example, in a context in which at least system 1200 (of FIG. 12) implements system 1300; in which at least one linkage 1225 of content 1229 (to one or more criteria 1252 via one or more references 1226, for example) is changed; in which a destination of content is changed such that an update of one or more criteria 1259 results; or in many other contexts described herein. Alternatively or additionally, in an embodiment in which system 1300 implements primary system 1100, module 1342 may perform operation 240 by updating content 1145 or other, evaluated content such that a decision or other evaluation result 1119 thereof is no longer current. In some variants, moreover, operation 2746 may only be manifested when one or more other criteria are met: when one or more ports 1286 or other input devices 1284, 1320 are active, when a local or remote user who provided such input is authorized, when any other necessary security criteria 746P are satisfied, or when other circumstances described herein are detected.

In light of teachings herein, numerous existing techniques may be applied for maintaining filters for text or other content as described herein without undue experimentation. See, e.g., U.S. Pat. No. 7,240,355 ("Subscriber characterization system with filters"); U.S. Pat. No. 7,191,117 ("Generation of subtitles or captions for moving pictures"); U.S. Pat. No. 7,072,942 ("Email filtering methods and systems"); U.S. Pat. No. 7,072,901 ("Index generation method, index generation apparatus, index addition system, and program and storage medium thereof"); U.S. Pat. No. 7,027,645 ("Evaluating graphic image files for objectionable content"); U.S. Pat. No. 7,020,651 ("Similarity search engine for use with relational databases"); U.S. Pat. No. 6,937,766 ("Method of indexing and searching images of text in video"); U.S. Pat. No. 6,751,593 ("Data processing system with block attribute-based vocalization mechanism"); U.S. Pat. No. 6,389,475 ("Content-based filtering of multicast information"); U.S. Pat. No. 6,157,379 ("Apparatus and method of formatting a list for display on a touchscreen"). Those skilled in the art will also recognize how to apply numerous existing techniques for taking provisional, alternate, overlapping, or completion actions relating to such decisions as exemplified herein without undue experimentation, in light of these teachings. Update circuitry 1301 may be configured to update the relationship only in response to an indication that an intended recipient or other destination provided such user input, for example, or that a local user did. Alternatively or additionally, such functionality may likewise depend upon one or more other determinants in substantially any desired combination: upon whether the data object satisfies one or more standard protocols or other criteria shared among systems, upon how many prior send attempts have been made, upon whether a recipient indicates a deviation from a planned activity, upon other state or timing factors as described herein, or upon other determinants such as are known in the art. Such combinations may each be effectuated by comparative, arithmetic, conjunctive, or other operators relating each pairing of determinants described herein, for example.

Operation 2749 describes deciding whether to transmit at least the data object to the destination partly in response to whether the data object passes any of the one or more destination-dependent criteria (e.g. invocation circuitry 1430 invoking module 1432 for deriving such a decision 1437 as a result of determining whether picture 1471 satisfies criterion 1461, whether message 1472 satisfies criterion 1462, whether code segment 1473 satisfies criterion 1463, whether application data segment 1474 satisfies criterion 1464, whether sensor 1133 detects segment 1156, whether clip 1475 satisfies criterion 1465, or whether an evaluation-module-specific conjunctive relationship between any of these conditions exists). In various configurations and embodiments, for example, comparator 1445 may evaluate criterion 1461 by comparing threshold 1451 with a size or frequency attribute of picture 1471 and/or evaluate criterion 1462 by comparing threshold 1452 with a size or other quantifiable attribute of message 1472. Alternatively or additionally, comparator 1445 may be configured to apply one or more thresholds 1453, 1454, 1438 to one or more segments 1471, 1474 or clips 1475 to evaluate one or more respective criteria 1463, 1464, 1465.

Figure 28:
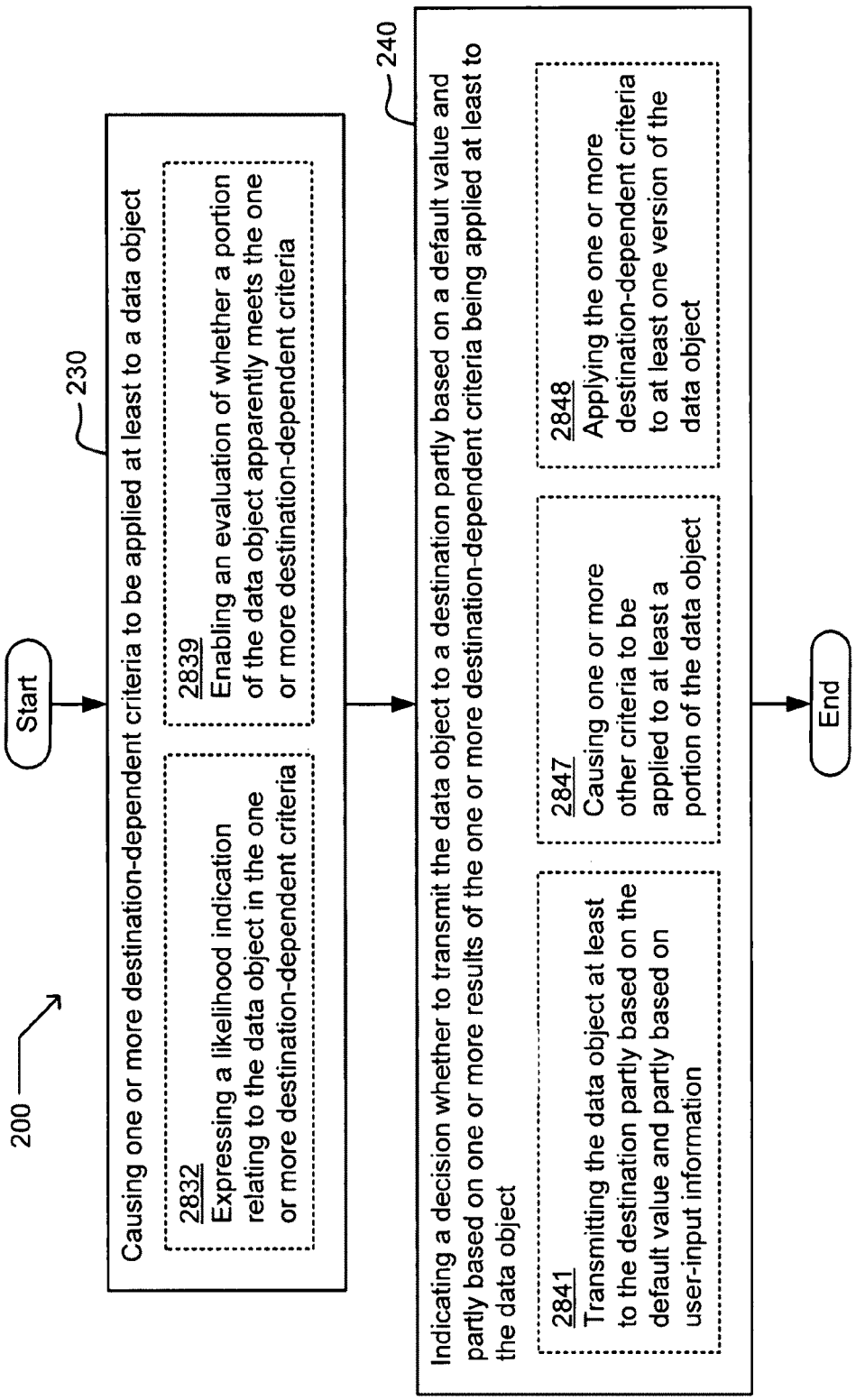

With reference now to FIG. 28, there are shown several variants of the flow 200 of FIG. 2, FIG. 26, or FIG. 27. Operation 230—causing one or more destination-dependent criteria to be applied at least to a data object—may include one or more of the following operations: 2832 or 2839. Operation 240—indicating a decision whether to transmit the data object to a destination partly based on a default value and partly based on one or more results of the one or more destination-dependent criteria being applied at least to the data object—may include one or more of the following operations: 2841, 2847 or 2848.

Operation 2832 describes expressing a likelihood indication relating to the data object in the one or more destination-dependent criteria (e.g. image generator 1595 invoking module 1551 for causing image 1591 to include "unlikely" or otherwise indicate that version 1581 is not very likely to be accepted or reviewed in the next hour or day). This can occur, for example, in a context in which evaluation logic 1590 generates a percentage or other such likelihood expression 1574 in response to one or more of a potential recipient's apparent availability as indicated by a received schedule 1532; an apparent incompatibility between a potential recipient's requirements 1531 and a format 1534, size 1535, or other indication of content 1538; or other such determinants 1539. Alternatively or additionally, image 1591 may include shapes or other graphical attributes indicating one or more problematic content portions 1536 that may warrant exclusion. Image 1591 may likewise include sliders, bars, icons, or other graphical expressions 1576 of categories, quantities, or other descriptive information. In some variants, actual or expected fault indications from evaluation logic 1570 may likewise cause one or more expressions 1577 to express go/no-go or other summary information, optionally conveyed through antennae 2435 or other output devices 2436.

In light of teachings herein, numerous existing techniques may be applied for expressing priority-indicative, progress-indicative, capability-indicative, or other likelihood-indicative symbols relating to text or other content as described herein without undue experimentation. See, e.g., U.S. Pat. No. 7,243,130 ("Notification platform architecture"); U.S. Pat. No. 7,133,880 ("Object views for relational data"); U.S. Pat. No. 7,038,680 ("System for graphical display and interactive exploratory analysis of data and data relationships"); U.S. Pat. No. 6,985,830 ("Method of measuring the probability of failure caused only by defects, method of measuring defect limited yield, and system using the same"); U.S. Pat. No. 6,934,916 ("Method and apparatus for improving a progress monitor during a long computer process"); U.S. Pat. No. 6,892,330 ("Cross-platform system-fault warning system and method"); U.S. Pat. No. 6,810,422 ("System and method for probabilistic quality of communication service determination"); U.S. Pat. No. 6700678 ("Methods and systems for increasing the likelihood of print job completions"); U.S. Pat. No. 6,418,136 ("Announced dynamic access probability protocol for shared bandwidth networks"); U.S. Pat. No. 6,219,731 ("Method and apparatus for improved multi-tap text input"). Those skilled in the art will also recognize how to apply numerous existing techniques for taking provisional, alternate, overlapping, or completion actions relating to such decisions as exemplified herein without undue experimentation, in light of these teachings. Module 1551 may be configured to express such a likelihood only in response to an indication that one or more similar data objects have been accepted by the destination and that others have not, for example, or to provide such a likelihood whenever suitable determinants are available. Alternatively or additionally, such functionality may likewise depend upon one or more other determinants in substantially any desired combination: upon whether a user has expressed a preference about such likelihood indications, upon which information the user requests most frequently, upon whether one or more preferable modes of communication are apparently available, upon other state or timing factors as described herein, or upon other determinants such as are known in the art. Such combinations may each be effectuated by comparative, arithmetic, conjunctive, or other operators relating each pairing of determinants described herein, for example.

Operation 2839 describes enabling an evaluation of whether a portion of the data object apparently meets the one or more destination-dependent criteria (e.g. invocation module 1564 triggering evaluation circuitry 1030 to determine whether text 1221 or some other content object is currently larger than a respective one of thresholds 1502, 1503). This can occur, for example, in a context in which a college professor specifies a maximum word count, a minimum diagram count, and/or a latest submission time. In some variants, for example, such criteria may be applied to a draft-in-progress as a direct response to specifying that the college professor is listed in destination 1546. Alternatively or additionally, such an application may be repeated occasionally from the time that the destination is specified until such time that a final composition is sent. In some embodiments, moreover, one or more late-breaking criteria modifications or parameters may be downloaded and applied in response to an indication that a draft is being finalized. In some variants, moreover, predictive or other rule articulations may be presented to a composer for any thresholds 1502, 1503 or other criteria for which compliance cannot be verified.

In light of teachings herein, numerous existing techniques may be applied for evaluating whether text or other content apparently meets criteria as described herein without undue experimentation. See, e.g., U.S. Pat. No. 7,206,778 ("Text search ordered along one or more dimensions"); U.S. Pat. No. 7,076,485 ("Method and system for finding similar records in mixed free-text and structured data"); U.S. Pat. No. 7,039,637 ("System and method for evaluating characters in an inputted search string against a character table bank comprising a predetermined number of columns that correspond to a plurality of pre-determined candidate character sets in order to provide enhanced full text search"); U.S. Pat. No. 6,941,513 ("System and method for text structuring and text generation"); U.S. Pat. No. 6,820,079 ("Method and apparatus for retrieving text using document signatures"); U.S. Pat. No. 6,813,043 ("Image processing device, image forming device incorporating the same, and storage medium for storing program used thereby"); U.S. Pat. No. 6,788,308 ("System and method for improving the readability of text"); U.S. Pat. No. 6,565,610 ("Method and system for text placement when forming maps"). Those skilled in the art will also recognize how to apply numerous existing techniques for taking provisional, alternate, overlapping, or completion actions relating to such decisions as exemplified herein without undue experimentation, in light of these teachings. Evaluation circuitry 1030 may be configured to evaluate some or all of content 1229 only in response to an authorization to transmit, for example, or to perform periodic or other event-responsive evaluations more frequently. Alternatively or additionally, such functionality may likewise depend upon one or more other determinants in substantially any desired combination: upon how a destination or service provider configures invocation module 1564 to decide whether or when to invoke such evaluations, upon whether an evaluation resource is available at such times of invocation, upon whether any such evaluations have previously generated one or more error messages, upon other state or timing factors as described herein, or upon other determinants such as are known in the art. Such combinations may each be effectuated by comparative, arithmetic, conjunctive, or other operators relating each pairing of determinants described herein, for example.

Operation 2841 describes transmitting the data object at least to the destination partly based on the default value and partly based on user-input information (e.g. router 1367 transmitting some or all of content 1376 to destination 1378). This can occur, for example, in a context in which in which primary system 1100 or network 1190 implements system 1300, in which the default value is null, and in which distribution list 1374 or destination 1199 identifies destination 1378. Alternatively or additionally, one or more intermediaries or nominal destinations may be configured to relay some or all of content 1376 to destination 1378. In some embodiments, for example, user 1101 configures interface 1170 to broadcast such content to whatever destinations are within a target virtual or physical region, which happens to include destination 1378.

In light of teachings herein, numerous existing techniques may be applied for transmitting text or other content in response to received input as described herein without undue experimentation. See, e.g., U.S. Pat. No. 7,242,493 ("Transmitting miniature versions of files to receiving devices"); U.S. Pat. No. 7,233,803 ("Method for providing a best guess for an intended recipient of a message"); U.S. Pat. No. 7,228,334 ("Systems methods to selectively control forwarding of electronic mail"); U.S. Pat. No. 7,224,778 ("Method and apparatus for managing subscription-type messages"); U.S. Pat. No. 7,143,140 ("Method and system for publishing an electronic file attached to an electronic mail message"); U.S. Pat. No. 7,139,825 ("Source-specific electronic message addressing"); U.S. Pat. No. 7,103,154 ("Automatic transmission of voice-to-text converted voice message"); U.S. Pat. No. 7,095,855 ("Message identification with confidentiality, integrity, and source authentication"); U.S. Pat. No. 6,981,023 ("Message routing"); U.S. Pat. No. 6,851,049 ("Method and apparatus for facilitating secure anonymous email recipients"); U.S. Pat. No. 6,839,777 ("System and method for transferring data over a communication medium using data transfer links"); U.S. Pat. No. 6,621,892 ("System and method for converting electronic mail text to audio for telephonic delivery"). Those skilled in the art will also recognize how to apply numerous existing techniques for taking provisional, alternate, overlapping, or completion actions relating to such decisions as exemplified herein without undue experimentation, in light of these teachings. Router 1367 may be configured to use a default destination value only in response to a specific instruction, for example, or to implement the converse. Alternatively or additionally, such functionality may likewise depend upon one or more other determinants in substantially any desired combination: upon whether one or more authorized users are offline, upon whether an administrator or composer has authorized unlimited distribution, upon whether destination 1378 subscribes to a distribution service, upon other state or timing factors as described herein, or upon other determinants such as are known in the art. Such combinations may each be effectuated by comparative, arithmetic, conjunctive, or other operators relating each pairing of determinants described herein, for example.

Operation 2847 describes causing one or more other criteria to be applied to at least a portion of the data object (e.g. invocation circuitry 1430 invoking module 1431 for requesting or otherwise triggering search logic 1410 to determine one or more locations 1409 or occurrence counts 1408 of one or more patterns 1405, 1406 in text 1481 or other content 1450). In some contexts, for example, module 1431 may cause a remote processor or other remote search logic 1410 to generate count 1408 of how many characters of text 1481 precede the first occurrence 1482 of pattern 1405, and/or to generate count 1450 of how many times pattern 1406 occurs in text 1481. This can occur, for example, in contexts in which some or all of message 1486 is transferred to network 1400 for evaluation. Alternatively or additionally, invocation circuitry 1430 may be configured to invoke one or more instances of similar search logic (not shown) that may be transferred to system 1420 (e.g. through communication tower 1417 and/or satellite 1418) or otherwise implemented locally to content 1450.

Operation 2848 describes applying the one or more destination-dependent criteria to at least one version of the data object (e.g. comparator 1088 determining whether a current version 1096 of content 1095 contains too much graphical data or not enough numerical data respectively relative to thresholds 1071, 1072). This can occur, for example, in a context in which such content attributes are suitably quantified in bits or rows, for example, and in which either of such conditions 1076, 1077 will trigger help logic 1070 to engage an application 1089 or user to modify version 1096. Alternatively or additionally, version 1096 may be configured to include one or more segments of message 140; content 1229, 1239; code 1250; or similar data objects as described herein.

In some embodiments, evaluation circuitry 1030 may be configured to apply comparator to more than one of these components of version 1096.

In light of teachings herein, numerous existing techniques may be applied for applying criteria to text or other content as described herein without undue experimentation. See, e.g., U.S. Pat. No. 7,191,252 ("Data security system and method adjunct to e-mail, browser or telecom program"); U.S. Pat. No. 7,119,923 ("Apparatus and method for image processing"); U.S. Pat. No. 6,704,905 ("Text classifying parameter generator and a text classifier using the generated parameter"); U.S. Pat. No. 6,621,892 ("System and method for converting electronic mail text to audio for telephonic delivery"); U.S. Pat. No. 6,574,744 ("Method of determining a uniform global view of the system status of a distributed computer network"); U.S. Pat. No. 6,496,600 ("Font type identification"); U.S. Pat. No. 6,308,148 ("Network flow data export"); U.S. Pat. No. 6,031,453 ("Monitoring method and observation system for monitoring an automation system and a technical process"); U.S. Pat. Pub. No. 20070078874A1 ("Select indexing in merged inverse query evaluations"); U.S. Pat. Pub. No. 20020069200A1 ("Efficient evaluation of rules"). Those skilled in the art will also recognize how to apply numerous existing techniques for taking provisional, alternate, overlapping, or completion actions relating to such decisions as exemplified herein without undue experimentation, in light of these teachings. Evaluation circuitry may be configured to apply one or more available thresholds only in response to an indication that such thresholds were received before the data object, for example, or always to request one or more local instances of thresholds to be updated in response to being invoked. Alternatively or additionally, such functionality may likewise depend upon one or more other determinants in substantially any desired combination: upon whether one or more other components or versions of the data object pass their respective one or more criteria; upon an urgency level, security level, or other determinants as described herein; upon whether a version includes an executable component; upon other state or timing factors as described herein, or upon other determinants such as are known in the art. Such combinations may each be effectuated by comparative, arithmetic, conjunctive, or other operators relating each pairing of determinants described herein, for example.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc), or (g) a wired/wireless services entity such as Sprint, Cingular, Nextel, etc.), etc.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

Although users 301, 401, 1101, 1701 are shown/described herein each as a single illustrated figure, those skilled in the art will appreciate that such users may be representative of a human user, a robotic user (e.g., computational entity), and/or substantially any combination thereof (e.g., a user may be assisted by one or more robotic agents). In addition, each such user, as set forth herein, although shown as a single entity may in fact be composed of two or more entities. Those skilled in the art will appreciate that, in general, the same may be said of "sender" and/or other entity-oriented terms as such terms are used herein.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably coupleable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method at least partially implemented using hardware, comprising:
    applying one or more destination-dependent criteria to a data object; and
    indicating a decision whether to transmit the data object to a destination partly based on a default value and partly based on one or more results of the one or more destination-dependent criteria being applied at least to the data object, wherein said indicating a decision comprises:
        indicating a relationship between the data object and the one or more destination-dependent criteria at least partly dependent upon status information about the destination;
        receiving user input after indicating the relationship between the data object and one or more other criteria;
        deciding whether to update the relationship between the data object and the one or more destination-dependent criteria at least partly in response to the user input; and
        deciding whether to transmit at least the data object to the destination after evaluating whether at least part of the data object passes any of the one or more destination-dependent criteria, and at least partly in response to whether the at least part of the data object passes any of the one or more destination-dependent criteria being applied to said data object.

2. A system at least partially implemented using hardware, comprising:
    means for applying one or more destination-dependent criteria to a data object; and
    means for indicating a decision whether to transmit the data object to a destination partly based on a default value and partly based on one or more results of the one or more destination-dependent criteria being applied to the data object, wherein said means for indicating a decision comprises:
        means for indicating a relationship between the data object and the one or more destination-dependent criteria at least partly dependent upon status information about the destination;
        means for receiving user input after indicating the relationship between the data object and one or more other criteria;
        means for deciding whether to update the relationship between the data object and the one or more destination-dependent criteria at least partly in response to the user input; and
        means for deciding whether to transmit at least the data object to the destination after evaluating whether at least part of the data object passes any of the one or more destination-dependent criteria, and at least partly in response to whether the at least part of the data object passes any of the one or more destination-dependent criteria being applied to said data object.

3. A system comprising:
    circuitry for applying one or more destination-dependent criteria to a data object; and
    circuitry for indicating a decision whether to transmit the data object to a destination partly based on a default value and partly based on one or more results of the one or more destination-dependent criteria being applied at least to the data object, wherein said circuitry for indicating a decision comprises:

circuitry for indicating a relationship between the data object and the one or more destination-dependent criteria at least partly dependent upon status information about the destination;

circuitry for receiving user input after indicating the relationship between the data object and one or more other criteria;

circuitry for deciding whether to update the relationship between the data object and the one or more destination-dependent criteria at least partly in response to the user input; and circuitry for deciding whether to transmit at least the data object to the destination after evaluating whether at least part of the data object passes any of the one or more destination-dependent criteria, and at least partly in response to whether the at least part of the data object passes any of the one or more destination-dependent criteria being applied to said data object.

4. The system of claim 3 in which the circuitry for applying one or more destination-dependent criteria to a data object comprises:

circuitry for configuring the one or more destination-dependent criteria to include at least one zero-tolerance criterion relating to one or more potential formats of the data object.

5. The system of claim 3 in which the circuitry for indicating a decision whether to transmit the data object to a destination partly based on a default value and partly based on one or more results of the one or more destination-dependent criteria being applied at least to the data object comprises:

circuitry for receiving user input operable at least after indicating a relationship between the data object and one or more other criteria selected at least partly based upon one or more other destinations.

6. The system of claim 3 in which the circuitry for indicating a decision whether to transmit the data object to a destination partly based on a default value and partly based on one or more results of the one or more destination-dependent criteria being applied at least to the data object comprises:

circuitry for obtaining the decision whether to transmit the data object to the destination operable at least after presenting at least one evaluation of the data object.

7. The system of claim 3 in which the circuitry for indicating a decision whether to transmit the data object to a destination partly based on a default value and partly based on one or more results of the one or more destination-dependent criteria being applied at least to the data object comprises:

circuitry for accepting at least a portion of the data object operable at least after obtaining the destination.

8. The system of claim 3 in which the circuitry for applying one or more destination-dependent criteria to a data object comprises:

circuitry for configuring the one or more destination-dependent criteria to include at least one potential allocation.

9. The system of claim 3 in which the circuitry for applying one or more destination-dependent criteria to a data object comprises:

circuitry for indicating an alternate communication mode at least partly in response to an application of the one or more destination-dependent criteria to the data object.

10. The system of claim 3 in which the circuitry for applying one or more destination-dependent criteria to a data object comprises:

circuitry for incorporating the one or more destination-dependent criteria into an application.

11. The system of claim 3 in which the circuitry for applying one or more destination-dependent criteria to a data object comprises:

circuitry for applying at least one of the one or more destination-dependent criteria to a command sequence of the data object.

12. The system of claim 3 in which the circuitry for indicating a decision whether to transmit the data object to a destination partly based on a default value and partly based on one or more results of the one or more destination-dependent criteria being applied at least to the data object comprises:

circuitry for deciding whether to transmit the data object to the destination partly in response to whether another data object passes at least one format criterion.

13. The system of claim 3 in which the circuitry for applying one or more destination-dependent criteria to a data object comprises:

circuitry for expressing a likelihood indication relating to the data object in the one or more destination-dependent criteria.

14. The system of claim 3 in which the circuitry for applying one or more destination-dependent criteria to a data object comprises:

circuitry for enabling an evaluation of whether a portion of the data object meets the one or more destination-dependent criteria.

15. The system of claim 3 in which the circuitry for indicating a decision whether to transmit the data object to a destination partly based on a default value and partly based on one or more results of the one or more destination-dependent criteria being applied at least to the data object comprises:

circuitry for transmitting the data object at least to the destination partly based on the default value and partly based on user-input information.

16. The system of claim 3 in which the circuitry for indicating a decision whether to transmit the data object to a destination partly based on a default value and partly based on one or more results of the one or more destination-dependent criteria being applied at least to the data object comprises:

circuitry for causing one or more other criteria to be applied to at least a portion of the data object.

17. The system of claim 3 in which the circuitry for applying one or more destination-dependent criteria to a data object comprises:

circuitry for configuring the one or more destination-dependent criteria to include at least one potential allocation and at least one zero-tolerance criterion relating to one or more potential formats of the data object;

circuitry for indicating an alternate communication mode at least partly in response to an application of the one or more destination-dependent criteria to the data object;

circuitry for accepting at least a portion of the data object operable at least after obtaining the destination; and circuitry for enabling an evaluation of whether a command sequence of the data object apparently meets the one or more destination-dependent criteria.

18. The system of claim 17 in which the circuitry for indicating a decision whether to transmit the data object to a destination partly based on a default value and partly based on one or more results of the one or more destination-dependent criteria being applied at least to the data object comprises:

circuitry for obtaining the decision whether to transmit the data object to the destination operable at least after presenting at least the evaluation of whether the command sequence of the data object apparently meets the one or more destination-dependent criteria; and circuitry for deciding whether to transmit the data object to the destination partly in response to whether another data object passes at least one format criterion.

19. One or more non-transitory computer-readable media bearing instructions that, when executed by one or more processing components, perform a method comprising:
- applying one or more destination-dependent criteria to a data object; and
- indicating a decision whether to transmit the data object to a destination partly based on a default value and partly based on one or more results of the one or more destination-dependent criteria being applied to the data object, wherein said indicating a decision comprises:
  - indicating a relationship between the data object and the one or more destination-dependent criteria at least partly dependent upon status information about the destination;
  - receiving user input after indicating the relationship between the data object and one or more other criteria;
  - deciding whether to update the relationship between the data object and the one or more destination-dependent criteria at least partly in response to the user input; and
  - deciding whether to transmit at least the data object to the destination after evaluating whether at least part of the data object passes any of the one or more destination-dependent criteria, and at least partly in response to whether the at least part of the data object passes any of the one or more destination-dependent criteria being applied to said data object.

20. An apparatus comprising:
one or more non-transitory media bearing a device-detectable output indicating an occurrence of:
- applying one or more destination-dependent criteria to a data object; and
- indicating a decision whether to transmit the data object to a destination partly based on a default value and partly based on one or more results of the one or more destination-dependent criteria being applied at least to the data object, wherein said indicating a decision comprises:
  - indicating a relationship between the data object and the one or more destination-dependent criteria at least partly dependent upon status information about the destination;
  - receiving user input after indicating the relationship between the data object and one or more other criteria;
  - deciding whether to update the relationship between the data object and the one or more destination-dependent criteria at least partly in response to the user input; and
  - deciding whether to transmit at least the data object to the destination after evaluating whether at least part of the data object passes any of the one or more destination-dependent criteria, and at least partly in response to whether the at least part of the data object passes any of the one or more destination-dependent criteria being applied to said data object.

\* \* \* \* \*